US012679855B2

(12) United States Patent
Muller et al.

(10) Patent No.: US 12,679,855 B2
(45) Date of Patent: Jul. 14, 2026

(54) INHIBITORS OF THE ENZYME ENOLASE FOR PRECISION ONCOLOGY

(71) Applicant: Board of Regents, The University of Texas System, Austin, TX (US)

(72) Inventors: Florian Muller, Houston, TX (US);
Victoria Yan, Houston, TX (US);
Kristine Yang, Houston, TX (US);
Elliot Ballato, Houston, TX (US);
Cong-dat Pham, Houston, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 17/425,472

(22) PCT Filed: Jan. 27, 2020

(86) PCT No.: PCT/US2020/015253
§ 371 (c)(1),
(2) Date: Jul. 23, 2021

(87) PCT Pub. No.: WO2020/154742
PCT Pub. Date: Jul. 30, 2020

(65) Prior Publication Data
US 2022/0089620 A1 Mar. 24, 2022

Related U.S. Application Data

(60) Provisional application No. 62/797,315, filed on Jan. 27, 2019.

(51) Int. Cl.
| | |
|---|---|
| *C07F 9/6506* | (2006.01) |
| *C07F 9/59* | (2006.01) |
| *C07F 9/655* | (2006.01) |
| *C07F 9/6553* | (2006.01) |
| *C07F 9/6571* | (2006.01) |

(52) U.S. Cl.
CPC .............. *C07F 9/6506* (2013.01); *C07F 9/59* (2013.01); *C07F 9/65515* (2013.01); *C07F 9/655345* (2013.01); *C07F 9/657181* (2013.01)

(58) Field of Classification Search
CPC .................................................. C07F 9/6506
See application file for complete search history.

(56) References Cited

U.S. PATENT DOCUMENTS

| | | | |
|---|---|---|---|
| 10,363,261 B2 * | 7/2019 | Muller .................... | A61P 35/00 |
| 2009/0203697 A1 | 8/2009 | Kimura et al. | |
| 2009/0270623 A1 | 10/2009 | Shimomura et al. | |
| 2018/0147219 A1 | 5/2018 | Muller et al. | |

FOREIGN PATENT DOCUMENTS

WO      WO 2016-145113      9/2016

OTHER PUBLICATIONS

Peng "Discovery of an Orally Active and Liver-Targeted Prodrug of 5-Fluoro-2'-Deoxyuridine for the Treatment of Hepatocellular Carcinoma." Journal of Medicinal Chemistry, 59(8), 3661-3670, 2016.*
Meier, "cyclo-Sal-2',3'-dideoxy-2',3'-didehydrothymidine Monophosphate (cyclo-Sal-d4TMP): Synthesis and Antiviral Evaluation of a New d4TMP Delivery System." Journal of Medicinal Chemistry, 1998, 41(9), 1417-1427.*
Hecker "Prodrugs of Phosphates and Phosphonates" J. Med. Chem. 2008, 51, 2328-2345.*
Youcef Mehellou "The ProTide Prodrug Technology: From the Concept to the Clinic" J. Med. Chem. 2018, 61, 2211-2226.*
Smith "Relevance of Half-Life in Drug Design Miniperspective" J. Med. Chem. 2018, 61, 4273-4282.*
Borch et al., "Synthesis and evaluation of nitroheterocyclic phosphoramidates as hypoxia-selective alkylating agents," *J. Med. Chem.*, 43:2258-2265, 2000.
Jung et al., "A unique small molecule inhibitor of enolase clarifies its role in fundamental biological processes," *ACS Chem. Biol.*, 8:1271-1282, 2013.
Leonard et al., "SF2312 is a natural phosphonate inhibitor of enolase," *Nat. Chem. Biol.*, 12:1053-1058, 2016.
Lin et al., "Eradication of ENO1-deleted glioblastoma through collateral lethality," *bioRxiv*, doi:10.1101/331538, 2018.
Muller et al., "In vitro enzymatic activity assay for ENOLASE in mammalian cells in culture," *Protoc. Exch.*, doi:10.1038/protex.2012.040, 2012.
Muller et al., "Passenger deletions generate therapeutic vulnerabilities in cancer," *Nature*, 488:337-343, 2012.
Muller et al., "Synthesis of mixed, hypoxia-activated phosphoramidate esters for the inhibition of Enolase in ENO1-deleted glioblastoma," In: Proceedings of the American Association for Cancer Research Annual Meeting 2019; *Cancer Res*, 79(13_Supplement): Abstract 984, 2019.
O'Connor et al., "Design synthesis and evaluation of molecularly targeted hypoxia-activated prodrugs," *Nat. Protoc.*, 11:781-794, 2016.
Olbryt et al., "Global gene expression profiling in three tumor cell lines subjected to experimental cycling and chronic hypoxia," *PLoS One*, 9:e105104, 2014.
PCT International Preliminary Report on Patentability issued in International Application No. PCT/US2020/015253, mailed Aug. 5, 2021.
PCT International Search Report and Written Opinion issued in International Application No. PCT/US2020/015253, mailed May 21, 2020.
Satani et al., "ENOblock does not inhibit the activity of the glycolytic enzyme enolase," *PLoS One*, 11:e0168739, 2016.
(Continued)

*Primary Examiner* — David K O'Dell

(74) *Attorney, Agent, or Firm* — PH IP Law

(57) ABSTRACT

Provided herein are compounds of the formula: wherein the variables are defined herein. The present disclosure also provides pharmaceutical compositions comprising the compounds disclosed herein as well as methods of treatment using the compounds and/or compositions disclosed herein. Such compounds and compositions may be used, for example, for the inhibition of enolase enzymes.

3 Claims, 26 Drawing Sheets

(56) References Cited

OTHER PUBLICATIONS

Wiemer et al., "Prodrugs of phosphonates and phosphates: crossing the membrane barrier," *Top Curr Chem.*, 360:115-160, 2015.

Yan et al., "Potent, non-carboxylesterase-labile pro-drugs of the Enolase inhibitor HEX for the treatment of ENO1-deleted glioblastoma," Abstract, MEDI 159, Division of Medicinal Chemistry Scientific Abstracts, 257th National Meeting and Exposition, Mar. 31-Apr. 3, 2019.

Zhou et al., "Safety and pharmacokinetics of IDX184, a liver-targeted nucleotide polymerase inhibitor of hepatitis C virus, in healthy subjects," *Antimicrob. Agents Chemother.*, 55:76-81, 2011.

Lin, Y-H. et al., "An enolase inhibitor for the targeted treatment of ENO1-deleted cancers," *Nature Metabolism*, 2 (2020): 1413-1426.

Yan, C. C et al., "Prodrugs of a 1-Hydroxy-2-oxopiperidin-3-yl Phosphonate Enolase Inhibitor for the Treatment of ENO1-Deleted Cancers," *Journal of Medicinal Chemistry*, 65 (2022): 13813-13832.

* cited by examiner

A

| Media | T1/2 (min) |
|---|---|
| Mouse Plasma, 37°C | 0.4 |
| De-activated Mouse Plasma, 37°C | 88 |
| Mouse Plasma/ACN (1/1), 4°C | 578 |
| Human Blood | 8.6 |

B

| Sample | POMHEX (ng/mL) | HemiPOMHEX (µM) | HEX (µM) |
|---|---|---|---|
| Brain (POMHEX) | BQL | BQL | BQL |
| Liver (POMHEX) | BQL | BQL | BQL |
| Kidney (POMHEX) | BQL | BQL | 1.21 |
| Spleen (POMHEX) | BQL | BQL | 4.57 |
| Heart (POMHEX) | BQL | BQL | 13.31 |
| Lung (POMHEX) | BQL | BQL | 0.71 |

FIG. 3A–D

| POMHEX | IC50 (nM) | Stdev | (N) |
|---|---|---|---|
| D423 (ENO1-deleted) | 35 | 19 | 12 |
| D423 (ENO1-rescued) | 2,261 | 941 | 6 |
| LN319 (ENO1-WT) | 1,328 | 355 | 8 |
| U343 (ENO1-Heterozygous) | 559 | 335 | 6 |
| D502 (ENO1-Heterozygous) | 82 | 30.3 | 6 |

| HEX | IC50 (nM) | Stdev | (N) |
|---|---|---|---|
| | 1,875 | 431 | 6 |
| | 163,943 | 56,412 | 3 |
| | 229,037 | 57,772 | 7 |
| | 19,723 | 10,675 | 7 |
| | 28,756 | 9,568 | 6 |

| Ratio IC50 POMHEX/HEX |
|---|
| 53 |
| 72 |
| 172 |
| 35 |
| 347 |

FIG. 6

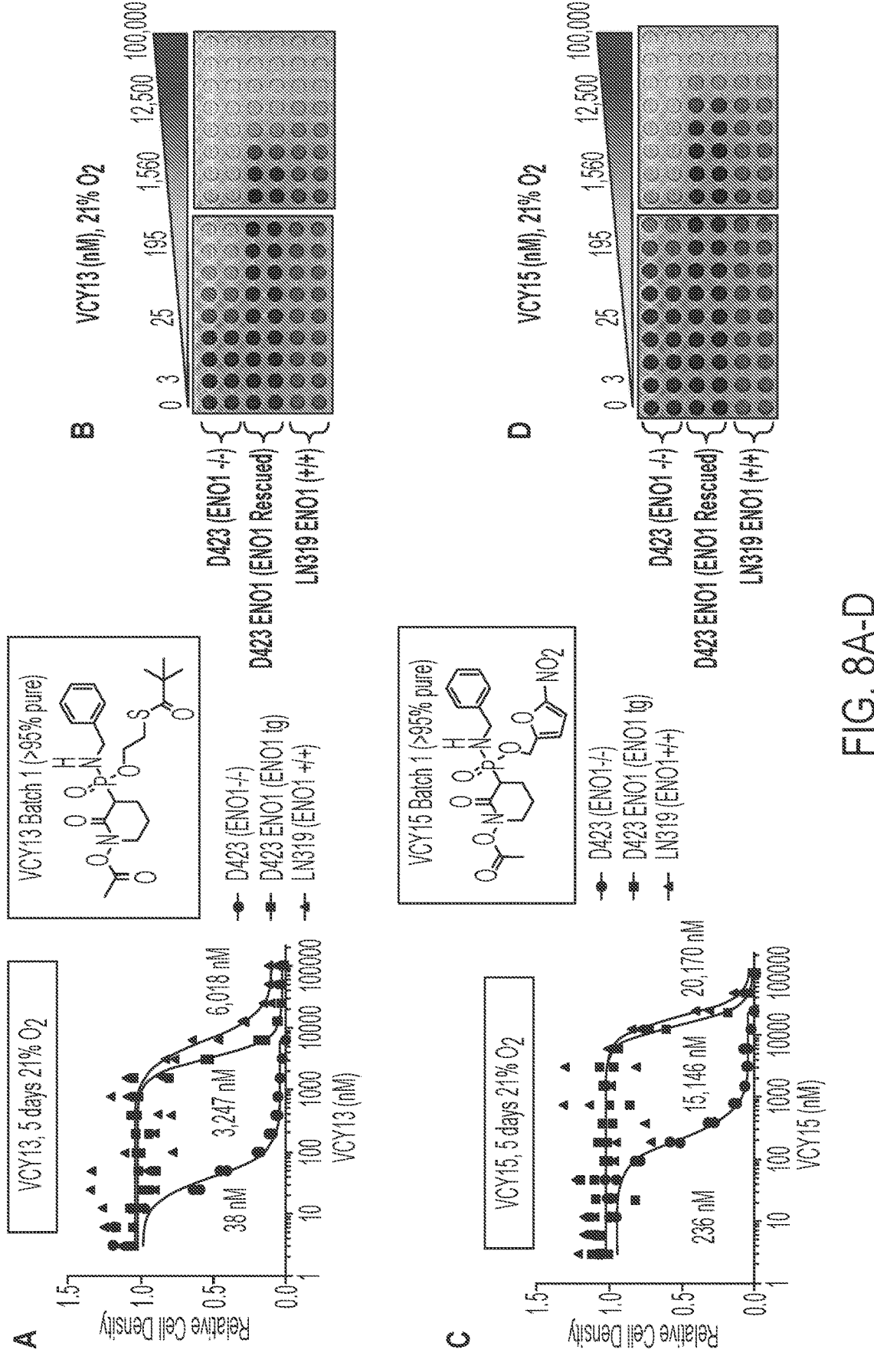
FIG. 8A-D

| | POMHEX | | | HEX | | | Ratio IC50 POMHEX/HEX |
|---|---|---|---|---|---|---|---|
| | IC50 (nM) | Stdev | n | IC50 (nM) | Stdev | n | |
| D423 (ENO1-deleted) | 35 | 19 | 12 | 1,875 | 431 | 6 | 53 |
| D423 (ENO1-rescued) | 2,261 | 941 | 6 | 163,943 | 56,412 | 3 | 72 |
| LN319 (ENO1-WT) | 1,328 | 355 | 8 | 229,037 | 57,772 | 7 | 172 |
| U343 (ENO1-Heterozygous) | 559 | 335 | 6 | 19,723 | 10,675 | 7 | 35 |
| D502 (ENO1-Heterozygous) | 82 | 30.3 | 6 | 28,756 | 9,568 | 6 | 347 |

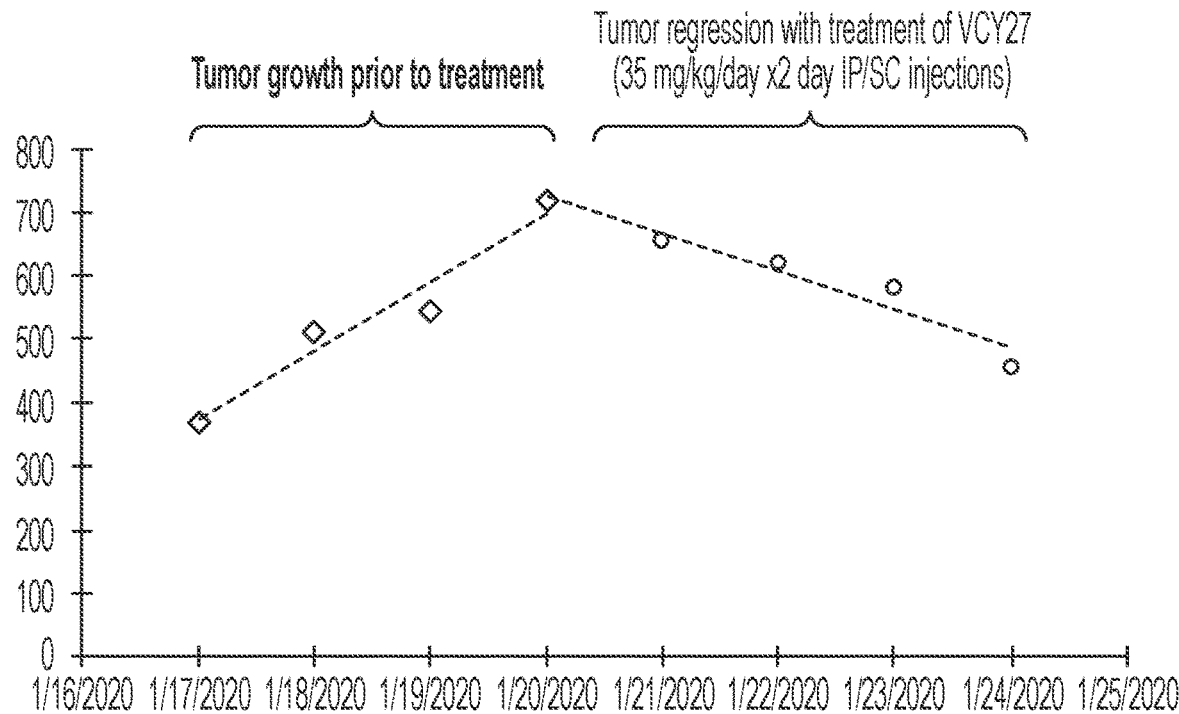
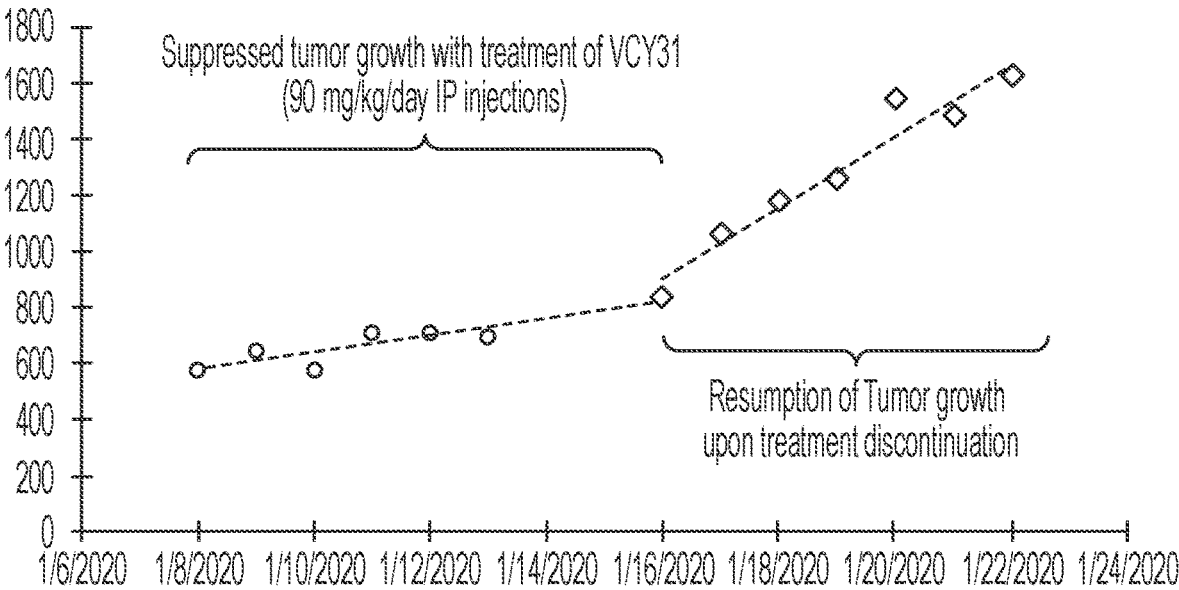
FIG. 23

INHIBITORS OF THE ENZYME ENOLASE FOR PRECISION ONCOLOGY

This application is a national phase application under 35 U.S.C. § 371 of International Application No. PCT/US2020/015253, filed Jan. 27, 2020, which claims the benefit of priority to U.S. Provisional Application No. 62/797,315, filed on Jan. 27, 2019, the entire contents of each of which are hereby incorporated by reference.

BACKGROUND OF THE INVENTION

1. Field of the Invention

The present disclosure relates generally to the field of therapeutics, chemotherapeutics, and chemistry. In some embodiments, the present disclosure relates to compounds which may be used as inhibitors of enolase, chemotherapeutic agents, or as antibiotics.

2. Description of Related Art

Enolase is the penultimate enzyme in the glycolysis pathway. It converts 2-phosphoglycerate to phospho-enolpyruvate and is therefore very important in the production of ATP. As such, this enzyme has arisen as a target for chemotherapeutic development (Capello et al., 2011). Three major forms of enolase are known to exist in humans, with enolase 1 (alpha-enolase) being the dominant form present in most tissues. Enolase 2 is present in brain tissue and neurons.

Several cancer subtypes have mutations or deletions in genes that affect the activity of enolase 1 (Muller, et al., 2012; US 2014/0378529; WO 2013/0909732). Cancers harboring the deletion of ENO1 are dramatically sensitized to inhibition of its redundant paralog, ENO2.

Compounds and compositions that can exploit this sensitization may be useful as chemotherapeutic agents. Desirable properties include reduced toxicity to normal cells vis-à-vis cancer cells and/or an improved pharmacokinetic profile. In view of the continuing unmet medical needs related to cancer and other cell-proliferative diseases, new compounds and compositions having such desirable properties as well as other beneficial activity profiles are needed.

SUMMARY OF THE INVENTION

In some aspects, the present disclosure provides compounds of the formula:

$$\text{(IA)}$$

wherein:

X is —O— or —NR$_a$—, wherein:
R$_a$ is hydrogen, alkyl$_{(C\le12)}$, or substituted alkyl$_{(C\le12)}$;
R$_1$ is hydrogen, acyl$_{(C\le12)}$, or substituted acyl$_{(C\le12)}$;
R$_2$ is hydrogen; or
alkyl$_{(C\le12)}$, acyl$_{(C\le12)}$, aralkyl$_{(C\le12)}$, heteroaralkyl$_{(C\le12)}$, or a substituted version of any of these groups; or -L$_1$-R$_4$; wherein:
L$_1$ is alkanediyl$_{(C\le8)}$ or substituted alkanediyl$_{(C\le8)}$; and
R$_4$ is acyl$_{(C\le12)}$, acyloxy$_{(C\le12)}$, acylthio$_{(C\le12)}$, —C(O)-alkoxy$_{(C\le12)}$, —OC(O)-heterocycloalkanediyl$_{(C\le12)}$-heterocycloalkyl$_{(C\le12)}$, or a substituted version of any of these groups; or
R$_2$ and R$_3$ are taken together as defined below;
R$_3$ is aralkyl$_{(C\le12)}$, heteroaralkyl$_{(C\le12)}$, -alkanediyl$_{(C\le12)}$-alkoxy$_{(C\le18)}$, cycloalkyl$_{(C\le12)}$, -alkanediyl$_{(C\le12)}$-cycloalkyl$_{(C\le12)}$, or a substituted version of any of these groups; or
R$_3$ and R$_2$ are taken together as defined below;
R$_2$ and R$_3$ are taken together and are -alkanediyl$_{(C\le12)}$-arenediyl$_{(C\le12)}$- or substituted -alkanediyl$_{(C\le12)}$-arenediyl$_{(C\le12)}$—;
or a pharmaceutically acceptable salt thereof.

In some embodiments, the compound is further defined as:

$$\text{(I)}$$

wherein:
R$^1$ is hydrogen, acyl$_{(C\le12)}$, or substituted acyl$_{(C\le12)}$;
R$_2$ is hydrogen; or
alkyl$_{(C\le12)}$, acyl$_{(C\le12)}$, aralkyl$_{(C\le12)}$, heteroaralkyl$_{(C\le12)}$, or a substituted version of any of these groups; or
-L$_1$-R$_4$; wherein:
L$_1$ is alkanediyl$_{(C\le8)}$ or substituted alkanediyl$_{(C\le8)}$; and
R$_4$ is acyl$_{(C\le12)}$, acyloxy$_{(C\le12)}$, acylthio$_{(C\le12)}$, —C(O)-alkoxy$_{(C\le12)}$, or a substituted version of any of these groups; and
R$_3$ is aralkyl$_{(C\le12)}$, substituted aralkyl$_{(C\le12)}$, heteroaralkyl$_{(C\le12)}$, or substituted heteroaralkyl$_{(C\le12)}$;
or a pharmaceutically acceptable salt thereof.

In some embodiments, the compound is further defined as:

$$\text{(I)}$$

wherein:
R$_1$ is hydrogen, acyl$_{(C\le12)}$, or substituted acyl$_{(C\le12)}$;
R$_2$ is hydrogen; or
alkyl$_{(C\le12)}$, acyl$_{(C\le12)}$, aralkyl$_{(C\le12)}$, heteroaralkyl$_{(C\le12)}$, or a substituted version of any of these groups; or
-L$_1$-R$_4$; wherein:
L$_1$ is alkanediyl$_{(C\le8)}$ or substituted alkanediyl$_{(C\le8)}$; and
R$_4$ is acyl$_{(C\le12)}$, acyloxy$_{(C\le12)}$, acylthio$_{(C\le12)}$, —C(O)-alkoxy$_{(C\le12)}$, or a substituted version of any of these groups; and
R$_3$ is aralkyl$_{(C\le12)}$ or substituted aralkyl$_{(C\le12)}$;
or a pharmaceutically acceptable salt thereof.

In some embodiments, the compound is further defined as:

(II)

wherein:

R$_1$ is hydrogen, acyl$_{(C\leq12)}$, or substituted acyl$_{(C\leq12)}$; and
R$_2$ is hydrogen; or
  alkyl$_{(C\leq12)}$, acyl$_{(C\leq12)}$, aralkyl$_{(C\leq12)}$, heteroaralkyl$_{(C\leq12)}$, or a substituted version of any of these groups; or
  -L$_1$-R$_4$; wherein:
    L$_1$ is alkanediyl$_{(C\leq8)}$ or substituted alkanediyl$_{(C\leq8)}$; and
    R$_4$ is acyl$_{(C\leq12)}$, acyloxy$_{(C\leq12)}$, acylthio$_{(C\leq12)}$, —C(O)-alkoxy$_{(C\leq12)}$, or a substituted version of any of these groups;
or a pharmaceutically acceptable salt thereof.

In some embodiments, X is —O—. In other embodiments, R$_a$ is hydrogen. In some embodiments, R$_1$ is acyl$_{(C\leq12)}$ or substituted acyl$_{(C\leq12)}$. In further embodiments, R$_1$ is acyl$_{(C\leq12)}$, such as acetyl. In other embodiments, R$_1$ is hydrogen. In some embodiments, R$_2$ is hydrogen. In other embodiments, R$_2$ is aralkyl$_{(C\leq12)}$, substituted aralkyl$_{(C\leq12)}$, heteroaralkyl$_{(C\leq12)}$, or substituted heteroaralkyl$_{(C\leq12)}$. In further embodiments. R$_2$ is heteroaralkyl$_{(C\leq12)}$ or substituted heteroaralkyl$_{(C\leq12)}$. In still further embodiments, R$_2$ is substituted heteroaralkyl$_{(C\leq12)}$, such as (5-nitrofuran-2-yl) methyl, (1-methyl-2-nitro-1H-imidazol-5-yl)methyl, or (5-nitrothiophen-2-yl)methyl. In other embodiments, R$_2$ is alkyl$_{(C\leq12)}$ or substituted alkyl$_{(C\leq12)}$. In further embodiments, R$_2$ is substituted alkyl$_{(C\leq12)}$, such as 2-cyanoethyl.

In some embodiments, R$_4$ is acyloxy$_{(C\leq12)}$, substituted acyloxy$_{(C\leq12)}$, acylthio$_{(C\leq12)}$, or substituted acylthio$_{(C\leq12)}$. In further embodiments, R$_4$ is acyloxy$_{(C\leq12)}$ or substituted acyloxy$_{(C\leq12)}$. In still further embodiments, R$_4$ is acyloxy$_{(C\leq12)}$, such as —OC(O)C(CH$_3$)$_3$. In other embodiments, R$_4$ is acylthio$_{(C\leq12)}$ or substituted acylthio$_{(C\leq12)}$. In further embodiments, R$_4$ is acylthio$_{(C\leq12)}$, such as —SC(O) C(CH$_3$)$_3$. In other embodiments, R$_4$ is —OC(O)-heterocycloalkanediyl$_{(C\leq12)}$-heterocycloalkyl$_{(C\leq12)}$ or substituted —OC(O)-heterocycloalkanediyl$_{(C\leq12)}$-heterocycloalkyl$_{(C\leq12)}$. In further embodiments, R$_4$ is —OC(O)-heterocycloalkanediyl$_{(C\leq12)}$-heterocycloalkyl$_{(C\leq12)}$, such as:

In some embodiments, L$_1$ is alkanediyl$_{(C\leq8)}$ or substituted alkanediyl$_{(C\leq8)}$. In further embodiments, L$_1$ is alkanediyl$_{(C\leq8)}$, such as methanediyl or ethanediyl. In some embodiments, R$_3$ is aralkyl$_{(C\leq12)}$, heteroaralkyl$_{(C\leq12)}$, -alkanediyl$_{(C\leq12)}$-alkoxy$_{(C\leq18)}$, cycloalkyl$_{(C\leq12)}$, -alkanediyl$_{(C\leq12)}$-cycloalkyl$_{(C\leq12)}$, or a substituted version of any of these groups. In further embodiments, R$_3$ is -alkanediyl$_{(C\leq12)}$-alkoxy$_{(C\leq18)}$ or substituted -alkanediyl$_{(C\leq12)}$-alkoxy$_{(C\leq18)}$. In still further embodiments, R$_3$ is -alkanediyl$_{(C\leq12)}$-alkoxy$_{(C\leq18)}$, such as —CH$_2$CH$_2$CH$_2$—O (CH$_2$)$_{15}$CH$_3$. In other embodiments, R$_3$ is -alkanediyl$_{(C\leq12)}$-cycloalkyl$_{(C\leq12)}$ or substituted -alkanediyl$_{(C\leq12)}$-cycloalkyl$_{(C\leq12)}$. In further embodiments, R$_3$ is -alkanediyl$_{(C\leq12)}$-cycloalkyl$_{(C\leq12)}$, such as —CH$_2$-cyclopropyl or —CH$_2$-cyclohexyl. In still other embodiments, R$_3$ is cycloalkyl$_{(C\leq12)}$ or substituted cycloalkyl$_{(C\leq12)}$. In further embodiments, R$_3$ is cycloalkyl$_{(C\leq12)}$, such as cyclobutyl. In yet other embodiments, R$_3$ is heteroaralkyl$_{(C\leq12)}$ or substituted heteroaralkyl$_{(C\leq12)}$. In further embodiments, heteroaralkyl$_{(C\leq12)}$, such as pyridin-2-ylmethyl. In other embodiments. R$_3$ is aralkyl$_{(C\leq12)}$ or substituted aralkyl$_{(C\leq12)}$. In other embodiments, R$_3$ is aralkyl$_{(C\leq12)}$, such as benzyl. In still other embodiments, substituted aralkyl$_{(C\leq12)}$, such as 4-fluorobenzyl, 3-fluorobenzyl, 3,4-difluorobenzyl, 2,4-difluorobenzyl, 2,6-difluorobenzyl. In yet other embodiments, R$_2$ and R$_3$ are taken together and are -alkanediyl$_{(C\leq12)}$-arenediyl$_{(C\leq12)}$- or substituted -alkanediyl$_{(C\leq12)}$-arenediyl$_{(C\leq12)}$—. In further embodiments, R$_2$ and R$_3$ are taken together and are -alkanediyl$_{(C\leq12)}$-arenediyl$_{(C\leq12)}$—, such as:

In some embodiments, the compound is further defined as:

5

-continued

6

-continued or a pharmaceutically acceptable salt thereof.

In some embodiments, the compound is further defined as:

-continued or a pharmaceutically acceptable salt thereof.

In another aspect, the present disclosure provides pharmaceutical compositions comprising (a) a compound of the present disclosure; and (b) an excipient. In some embodiments, the composition is formulated for administration: orally, intraadiposally, intraarterially, intraarticularly, intracranially, intradermally, intralesionally, intramuscularly, intranasally, intraocularly, intrapericardially, intraperitoneally, intrapleurally, intraprostatically, intrarectally, intrathecally, intratracheally, intratumorally, intraumbilically, intravaginally, intravenously, intravesicularlly, intravitreally, liposomally, locally, mucosally, parenterally, rectally, subconjunctival, subcutaneously, sublingually, topically, transbuccally, transdermally, vaginally, in crèmes, in lipid compositions, via a catheter, via a lavage, via continuous infusion, via infusion, via inhalation, via injection, via local delivery, or via localized perfusion.

In still another aspect, the present disclosure provides methods of treating or preventing a disease or disorder in a patient in need thereof comprising administering to the patient a therapeutically effective amount of a compound or composition of the present disclosure. In some embodiments, the disease or disorder is cancer. In further embodiments, cancer is a carcinoma, sarcoma, lymphoma, leukemia, melanoma, mesothelioma, multiple myeloma, or seminoma. In still further embodiments, the cancer is a malignant glioma, a glioblastoma, a neuroblastoma, an ependymoma, or an oligodendroglioma. In yet further embodiments, the cancer is a malignant glioma or a glioblastoma. In some embodiments, the cancer is of the bladder, blood, bone, brain, breast, central nervous system, cervix, colon, endometrium, esophagus, gall bladder, gastrointestinal tract, genitalia, genitourinary tract, head, kidney, larynx, liver, lung, muscle tissue, neck, oral or nasal mucosa, ovary, pancreas, prostate, skin, spleen, small intestine, large intestine, stomach, testicle, or thyroid. In further embodiments, the cancer is of the brain.

In some embodiments, the cancer comprises a 1p36 gene deletion. In some embodiments, the cancer comprises a mutated ENO1 gene. In some embodiments, the cancer comprises a deletion of ENO1. In some embodiments, the deletion of ENO1 is a homozygous deletion. In some embodiments, the deletion of ENO1 is a heterozygous deletion. In some embodiments, the mutated ENO1 gene results in an enolase 1 protein which exhibits greater than a 25% decrease in catalytic activity. In some embodiments, the protein exhibits a greater than 50% decrease in catalytic activity. In some embodiments, the deletion of the ENO1 gene results in the cancer cell which exhibits less than 25% of the wild type activity of enolase 1. In some embodiments, the cancer cells exhibit less than 10% of the wild type activity of enolase 1. In some embodiments, the cancer exhibits hypoxia.

In some embodiments, the compound is administered in conjunction with a second therapeutic modality. In some embodiments, the second therapeutic modality is a chemotherapeutic agent, surgery, radiotherapy, or immunotherapy. In some embodiments, the patient is a mammal, such as a human.

In yet another aspect, the present disclosure provides methods of inhibiting enolase comprising (a) obtaining a compound of the present disclosure; and (b) contacting enolase with a sufficient amount of the compound to inhibit enolase. In some embodiments, the enolase is enolase 1. In some embodiments, the enolase is enolase 2. In some embodiments, the method comprises inhibiting enolase in vitro. In some embodiments, the method comprises inhibiting enolase in vivo. In some embodiments, the method comprises administering the compound to a patient. In further embodiments, the patient is a mammal, such as a human. In some embodiments, inhibiting enolase is sufficient to block glycolysis. In some embodiments, inhibiting enolase is sufficient to induce apoptosis in a cell.

In another aspect, the present disclosure provides methods of treating or preventing an infection comprising administering to a patient in need thereof a therapeutically effective amount of a compound or composition of the present disclosure. In some embodiments, the infection is a bacterial infection. In some embodiments, the bacterial infection is caused by a bacteria species which is an obligate anaerobe. In some embodiments, bacteria is of a bacterial species selected from *Actinomyces, Bacteroides, Bifidobacterium, Bilophilia, Clostridium, Eubacterium, Fusobacterium, Lactobacillus, Peptostreptococcus, Propionibacterium, Porphyromonas, Prevotella, Sutterella,* and *Veillonella.* In further embodiments, bacteria is a *Clostridium* species, such as *Clostridium difficile.* In some embodiments, the bacterial infection further comprises an infection caused by a second bacteria. In some embodiments, the infection is a parasitic infection. In further embodiments, the parasitic infection is a *Trypanosoma* parasite. In some embodiments, the parasitic infection is a parasite infection selected from: *Trypanosoma brucei* and *Trypanosoma cruzi.* In some embodiments, the parasitic infection results in African sleeping sickness and Chagas' disease.

In some embodiments, the method further comprises administering a second therapeutic agent. In some embodiments, the second therapeutic agent is a second antibiotic. In some embodiments, the second therapeutic agent is an anti-parasitic agent. In some embodiments, the patient is a mammal, such as a human.

Other objects, features and advantages of the present disclosure will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description. Note that simply because a particular compound is ascribed to one particular generic formula doesn't mean that it cannot also belong to another generic formula.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

(FIG. 3A) Ex-vivo half-life of POMHEX in biological fluids. POMHEX has a half-life of ~30 seconds in mouse plasma. The degradation may be prevented by heat inactivation or de-proteinatization with acetonitrile. In human blood, POMHEX is at least 20-times more stable. (FIG. 3B) Plasma concentration of HEX and HemiPOMHEX following a single intravenous injection of POMHEX, as a function of time. Mice were injected IV with 10 mg/kg POMHEX and sacrificed at the indicated time points. Each data point represents a single animal. Note, POMHEX itself was below the detection limit (100 nM) even at the earliest time point.

It is believed that this may not be reflective of the physiological state as separation of plasma from hematocrit is required for the measurements, which adds approximately 6 minutes of processing time during which POMHEX may be degraded to HemiPOMHEX. (FIG. 3C) The results of the same experiment but performed with an intraperitoneal injection of POMHEX, at a dose of 40 mg/kg. (FIG. 3D) Quantification of POMHEX and its metabolites in mouse organs 24 hrs. after a single intravenous injection of 10 mg/kg POMHEX. POMHEX and HemiPOMHEX were below the quantification limit (BQL) of the assay in all samples tested.

FIG. 6 shows $IC_{50}$ values for the pro-drug Enolase inhibitor POMHEX and the non-pro-drug, HEX in glioma cell lines with different ENO1-deletion status. Enolase inhibitor sensitivity experiments were performed, using DMEM containing 10% FBS cell culture media. $IC_{50}$ (expressed in nM) were calculated based on terminal cell density measured by crystal violet after 7 days of growth. Data for two additional cell lines are shown: D502 and U343 are two ENO1-heterozygously deleted cell lines with a roughly 50% decrease in total Enolase. Left table: POMHEX. Middle table: HEX. Right table: Ratio of sensitivity to POMHEX versus HEX for each cell line. ENO1-homozygous deletion conferred the greatest sensitivity to HEX, with ENO1-heterozygous cell lines showing intermediate sensitivity. This is consistent with previous reports for the pan-Enolase inhibitors phosphonoacetohydroxamate and SF2312. Sensitivity arises from the roughly 50% reduction in total Enolase in ENO1-heterozygous deleted cell lines. These cells thus require less Enolase inhibitor to block glycolysis below toxic threshold. ENO1-heterozygous deleted glioma cell lines exhibit preferential sensitivity to HEX through preferential inhibition of ENO2. Right table: The potency of POMHEX is, on average, ~75-fold greater than HEX though with substantial variation across cell lines. This difference noticeable for the D502 and U343 cell lines. D502 is considerably more sensitive to POMHEX than U343 (IC50 82 vs 559 nM), yet U343 is more sensitive to HEX than D502 (IC50 19,723 nM vs 28,756 nM). Without wishing to be bound by any theory, it is hypothesized that higher levels of expression of pro-drug activating enzymes (carboxylesterases/phosphodiesterases) in the D502 glioma cell line result in greater sensitivity to POMHEX as compared to U343. Identification of the specific genes responsible, and their expression may be used for patient stratification, expanding the utility of Enolase inhibitors beyond those with ENO1-homozygous deletions.

(FIG. 7A) Plate showing treated cells after crystal violet staining. (FIG. 7B) Graph of the absorbances from each well. FLM37 displays selective killing towards D423 cells, with an IC50 of 63 nM.

FIGS. 8A-8D show Enolase inhibitors pro-drug attachments that are thioesterase-labile (VCY13) or nitroreductase-labile (VCY15) exhibit selective killing of ENO1-homozygous deleted glioma cells. HPLC purified stocks of VCY13 and VCY15 (structures indicated) were applied to glioma cells in culture differing in ENO1-deletion status. After 5 days of incubation at 21% $O_2$, cells were fixed and stained with crystal violet (FIGS. 8B & 8D) and quantified spectroscopically (FIGS. 8A & 8C). Cell density as measured by crystal violet were plotted as a function of inhibitor (FIGS. 8A & 8C) for ENO1-deleted (D423 glioma cells), ENO1-rescued (D423 cells with ectopic expression of ENO1) and ENO1-intact (LN319 glioma cells, which carry a 1p36 deletion that does not include ENO). $IC_{50}$ values are indicated in the graphs (FIGS. 8A & 8C). Both VCY13 and VCY15 displayed selective toxicity against ENO1-deleted as compared to ENO1-rescued or otherwise intact glioma cells. VCY13 was similar in potency to POMHEX while VCY15 was less so (FIG. 8, 12 see Table 1).

(FIG. 14A) Structural basis of various nitroheterocycles for the ease of reduction under hypoxic conditions. (FIG. 14B) General reduction scheme for nitroimidazole. Because the reverse reaction is oxygen dependent, bioactivation proceeds faster the lower the $O_2$ tension. (FIG. 14C) Proposed bioreduction mechanism for cleavage of the nitroimidazole moiety in VCY17, yielding FLM38 which is then converted to active Enolase inhibitor by phosphoramidase activity. De-acetylation of the hydroxamate may occur at any stage and is accomplished by highly abundant de-acetylase enzymes.

(FIG. 16A) High levels of carboxylesterase in ex vivo mouse plasma results in rapid hydrolysis of the first POM pro-dug group, as indicated by greatly increased half-life of POMHEX in de-activated mouse plasma. Lower levels of carboxylesterase in human blood results in a longer half-life of POMHEX. (FIG. 16B) Dramatically higher drug exposure in non-human primates as compared to mice following IV injections of POMHEX. Mice (n=3; pooled) and monkeys (n=3; pooled) were injected IV with POMHEX at 10 mg/kg and 2.5 mg/kg, respectively. The lower dose in monkey was in anticipation of potentially higher toxicity (which did not materialize). POMHEX was undetectable (<50 nM) even at the earliest time point, in both monkey and mouse experiments; at 98 nM, POMHEX was detectable 1-minute post-injection, but at no time thereafter. The half-lives of Hemi-POMHEX and HEX are both longer in monkey (open circles) compared to mouse (shaded circles). HEX and HemiPOMHEX were not measured at concentrations higher than 10 mg/kg due to the hazards associated with the derivatization agent, trimethylsilyl-diazomethane in hexane (TMS-DAM). (FIG. 16C) Schematic of POMHEX in circulation when administered IP or IV in mice. Due to high levels of plasma carboxylesterase, a gradient decrease in POMHEX away from the site of injection is accompanied by a concurrent increase in HemiPOMHEX.

(FIG. 18A) Proposed bioactivation mechanism for phosphonoamidate pro-drugs. Phosphoramidases cleave P—N bonds on anionic molecules and can thus serve as second pro-drug deprotecting enzymes. (FIG. 18B) The relationship between amine structure and pro-drug efficacy can be evaluated in cell-based screening. (Left) Structures of amine pro-drugs of the Enolase inhibitor, HEX, and corresponding $IC_{50}$ against D423 (ENO1-deleted) cells. (Middle) Crystal violet cell proliferation assay evidences greater cell killing against D423 cells by aliphatic amine pro-drugs compared to benzylamine. Cells were incubated with pro-drug inhibitor for 5 days. Then, cells were fixed and stained with crystal violet and quantified spectroscopically. Cell density as measured by crystal violet were plotted as a function of inhibitor. (Right) Comparison of the $IC_{50}$ values between model aromatic (FLM37) and aliphatic (VCY32) pro-drugs. While both pro-drugs are selective for ENO1-deleted cells, VCY32 exhibits 10-fold greater potency compared to FLM37 ($IC_{50}$=22 nM versus 244 nM).

(FIG. 19A) ENO1-deleted (D423, red), ENO1-isogenically rescued (D423 ENO1, blue), and ENO1-WT (LN319, grey) cells were treated POMHEX in RPMI media under the same experimental conditions used for NCI-60 screening. Note that the sensitivity to POMHEX was ~3-fold greater in RPMI as compared to DMEM media. The relative terminal cell density of the mean+/−S.D. of 60 cells lines screened by the NCI-60 shown in green (data replotted from NSC784584). (FIG. 19B) Sensitivity of ENO1-heterozygously deleted glioma cell lines to the Enolase inhibitors POMHEX and HEX. $IC_{50}$ (expressed in nM) were calculated based on terminal cell density measured by crystal violet. D502 and U343 are ENO1-heterozygous deleted cell lines (~50% total Enolase). Consistent with our previous reports for pan-Enolase inhibitors, ENO1-homozygous deletion conferred the greatest sensitivity to HEX, with ENO1-heterozygous cell lines showing intermediate sensitivity. The potency of POMHEX is, on average, ~75-fold greater than HEX though with substantial variation across cell lines. D502 is considerably more sensitive to POMHEX than U343 ($IC_{50}$ 82 vs 559 nM), yet U343 is more sensitive to HEX than D502 ($IC_{50}$ 19,723 nM vs 28,756 nM). This may be explained by higher levels of expression of pro-drug activating enzymes (carboxylesterases/phosphodiesterases) in the D502 glioma cell line result in greater sensitivity to POMHEX as compared to U343. Identification of the specific genes responsible, and their expression could be used for patient stratification, expanding the utility of Enolase inhibitors beyond those with ENO1-homozygous deletions.

(FIG. 20A) VCY13 exhibits dose-dependent selectivity for ENO1-deleted cells, with an $IC_{50,D423}$=38 nM. (FIG. 20B) VCY31 is a structurally similar pro-drug that uses 2-picolylamine, rather than benzylamine, as a second pro-drug leave group. VCY31 also exhibits dose-dependent selectivity for ENO1-deleted cells $ICs_{50,D423}$=59 nM. (FIG. 20C) Thioesterase-labile pro-drugs exhibit high stability in biological fluids. 4 mM VCY31 was dissolved in 80% human plasma, 20% $D_2O$ and monitored by $^{31}P$ NMR (121 MHz) for 15 hours. Intact VCY31 has a $^{31}P$ NMR shift of 33 ppm. Hydrolysis of the thioester begins to occur after 2 hours, as indicated by the emergence of a peak at ~16 ppm. However, full hydrolysis does not occur even after 15 hours.

(FIG. 21A) Structures of nitroheterocycle phosphonoamidates synthesized thus far. (FIG. 21B, left side) Representative dose-response treatments to VCY15 at 21% $O_2$ and 1% $O_2$. ENO1-deleted (D423, red), ENO1-isogenically rescued (D423 ENO1, blue), and ENO1-WT (LN319, grey) cells were treated with either of the nitroheterocycle pro-drugs in (FIG. 21A). (FIG. 21B, right side) Summary of $IC_{50}$ values against ENO1-deleted cells for compounds in FIG. 21A at 21% $O_2$ and 1% $O_2$. All nitroheterocycle phosphonoamidates exhibit greater potency under hypoxic conditions.

FIG. 23 shows anti-tumor activity in pre-clinical models. Two HEX pro-drugs from different classes were tested for anti-tumor efficacy in xenografted tumor (D423 ENO1-homozygously deleted cell line) pre-clinical models (the standard immunodeficient Foxn1 nude mice). Tumor volumes (y-axis) were measured at the indicated dates (x-axis). Without treatment, tumors grow inexorably. VCY27 treatment (1 IP and 1 SC injection, at 35 mg/kg/day each) lead to an immediate abrogation of tumor growth and eventual tumor regression. VCY31 treatment (90 mg/kg/day IP) led to suppressed tumor growth, which immediately resumed upon drug discontinuation. These data suggest that VCY27 induces frank tumor regression, which is a very high bar for pre-clinical drugs and testifies to the robustness of the approach. Of note, while it appears that VCY27 is not particularly potent in vitro (~500 nM) but unlike VCY31 (~59 nM), does not require esterase bioactivation. This is notable because of the high esterase activity in mouse plasma, rodents are a sub-optimal model for pre-clinical efficacy evaluation of esterase-labile pro-drugs. The greater potency of VCY27 in the mouse model as compared to VCY31 can be explained by the fact that VCY27 does not suffer from this drawback.

DESCRIPTION OF ILLUSTRATIVE EMBODIMENTS

Figure 1:
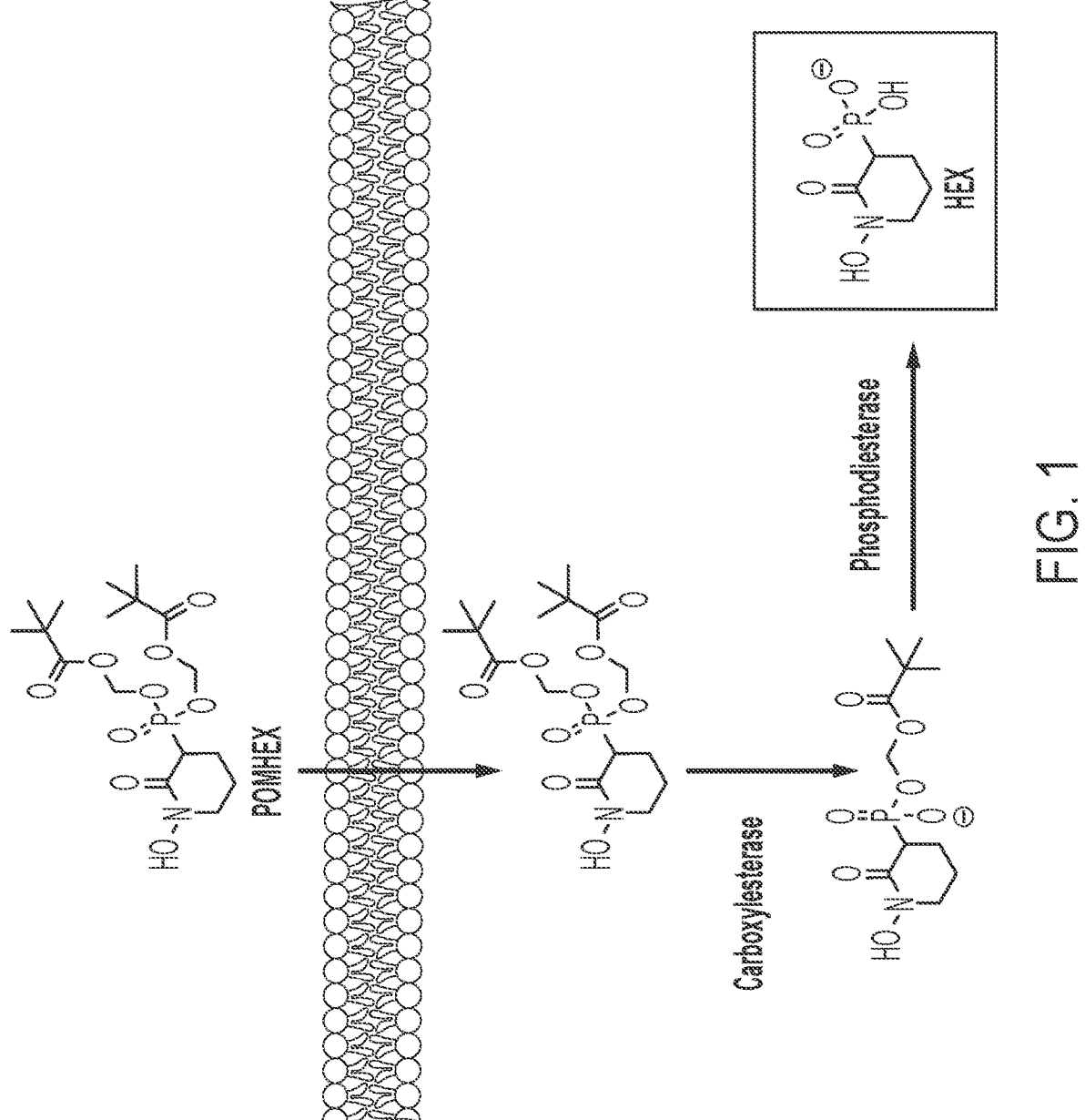
FIG. 1 shows a possible bioactivation pathway for POMHEX. Without wishing to be bound by any theory, the first POM group would be cleaved intracellularly through carboxylesterase. Cleavage of the second POM group would occur through phosphodiesterase.

In some aspects, the present disclosure provides compounds that may be used as enolase inhibitors. The compounds and compositions provided herein may be used, for example, for the treatment of cancer or bacterial infections. In some embodiments, the cancer is deficient in the enolase 1 enzyme. For example, inhibition of enolase may be used to block glycolysis and lead to cellular apoptosis. In some embodiments, the compounds and compositions provided herein preferentially inhibit enolase 2 over enolase 1.

I. Compounds and Synthetic Methods

In some aspects, the present disclosure provides compounds of the formula:

(IA)

wherein:

X is —O— or —NR$_a$—, wherein:

R$_a$ is hydrogen, alkyl$_{(C\leq12)}$, or substituted alkyl$_{(C\leq12)}$;

R$_1$ is hydrogen, acyl$_{(C\leq12)}$, or substituted acyl$_{(C\leq12)}$;

R$_2$ is hydrogen; or alkyl$_{(C\leq12)}$, acyl$_{(C\leq12)}$, aralkyl$_{(C\leq12)}$, heteroaralkyl$_{(C\leq12)}$, or a substituted version of any of these groups; or -L$_1$-R$_4$; wherein:

L$_1$ is alkanediyl$_{(C\leq8)}$ or substituted alkanediyl$_{(C\leq8)}$; and

R$_4$ is acyl$_{(C\leq12)}$, acyloxy$_{(C\leq12)}$, acylthio$_{(C\leq12)}$, —C(O)-alkoxy$_{(C\leq12)}$, —OC(O)-heterocycloalkanediyl$_{(C\leq12)}$-heterocycloalkyl$_{(C\leq12)}$, or a substituted version of any of these groups; or R$_2$ and R$_3$ are taken together as defined below;

R$_3$ is aralkyl$_{(C\leq12)}$, heteroaralkyl$_{(C\leq12)}$, -alkanediyl$_{(C\leq12)}$-alkoxy$_{(C\leq18)}$, cycloalkyl$_{(C\leq12)}$, -alkanediyl$_{(C\leq12)}$-cycloalkyl$_{(C\leq12)}$, or a substituted version of any of these groups; or R$_3$ and R$_2$ are taken together as defined below;

R$_2$ and R$_3$ are taken together and are -alkanediyl$_{(C\leq12)}$-arenediyl$_{(C\leq12)}$- or substituted -alkanediyl$_{(C\leq12)}$-arenediyl$_{(C\leq12)}$—;

or a pharmaceutically acceptable salt thereof.

TABLE 1

| Examples of Compounds Provided Herein | |
| --- | --- |
| Compound ID | Structure |
| FLM37 | |
| FLM38 | |

TABLE 1-continued

Examples of Compounds Provided Herein

| Compound ID | Structure |
|---|---|
| VCY13 | |
| VCY15 | |
| VCY16 | |
| VCY17 | |
| VCY22 | |

TABLE 1-continued

Examples of Compounds Provided Herein

| Compound ID | Structure |
| --- | --- |
| VCY26 | |
| VCY27 | |
| VCY31 | |
| VCY32 | |
| VCY34 | |
| VCY19 | |

TABLE 1-continued

| | |
|---|---|
| Examples of Compounds Provided Herein | |

| Compound ID | Structure |
|---|---|
| CDP9 | |
| CDP12 | |
| CDP13 | |
| CDP14 | |
| CDP18 | |

TABLE 1-continued

Examples of Compounds Provided Herein

| Compound ID | Structure |
| --- | --- |
| CDP19 | |
| KY9 | |
| ESB7 | |

The compounds of the present invention (also referred to as "compounds of the present disclosure") are shown, for example, above, in the summary of the invention section, and in the claims below. They may be made using the synthetic methods outlined in the Examples section. These methods can be further modified and optimized using the principles and techniques of organic chemistry as applied by a person skilled in the art. Such principles and techniques are taught, for example, in Smith, *March's Advanced Organic Chemistry: Reactions, Mechanisms, and Structure*, (2013), which is incorporated by reference herein. In addition, the synthetic methods may be further modified and optimized for preparative, pilot- or large-scale production, either batch or continuous, using the principles and techniques of process chemistry as applied by a person skilled in the art. Such principles and techniques are taught, for example, in Anderson, *Practical Process Research & Development—A Guide for Organic Chemists* (2012), which is incorporated by reference herein.

All the compounds of the present invention may in some embodiments be used for the prevention and treatment of one or more diseases or disorders discussed herein or otherwise. In some embodiments, one or more of the compounds characterized or exemplified herein as an intermediate, a metabolite, and/or prodrug, may nevertheless also be useful for the prevention and treatment of one or more diseases or disorders. As such unless explicitly stated to the contrary, all the compounds of the present invention are deemed "active compounds" and "therapeutic compounds" that are contemplated for use as active pharmaceutical ingredients (APIs). Actual suitability for human or veterinary use is typically determined using a combination of clinical trial protocols and regulatory procedures, such as those administered by the Food and Drug Administration (FDA). In the United States, the FDA is responsible for protecting the public health by assuring the safety, effectiveness, quality, and security of human and veterinary drugs, vaccines and other biological products, and medical devices.

In some embodiments, the compounds of the present invention have the advantage that they may be more efficacious than, be less toxic than, be longer acting than, be more potent than, produce fewer side effects than, be more easily absorbed than, more metabolically stable than, more lipophilic than, more hydrophilic than, and/or have a better pharmacokinetic profile (e.g., higher oral bioavailability and/or lower clearance) than, and/or have other useful pharmacological, physical, or chemical properties over, compounds known in the prior art, whether for use in the indications stated herein or otherwise.

Compounds of the present invention may contain one or more asymmetrically-substituted carbon or nitrogen atom and may be isolated in optically active or racemic form. Thus, all chiral, diastereomeric, racemic form, epimeric form, and all geometric isomeric forms of a chemical formula are intended, unless the specific stereochemistry or isomeric form is specifically indicated. Compounds may occur as racemates and racemic mixtures, single enantiomers, diastereomeric mixtures and individual diastereomers. In some embodiments, a single diastereomer is obtained. The chiral centers of the compounds of the present invention can have the S or the R configuration. In some embodiments, the present compounds may contain two or more atoms which have a defined stereochemical orientation.

Chemical formulas used to represent compounds of the present invention will typically only show one of possibly several different tautomers. For example, many types of ketone groups are known to exist in equilibrium with corresponding enol groups. Similarly, many types of imine groups exist in equilibrium with enamine groups. Regardless of which tautomer is depicted for a given compound, and regardless of which one is most prevalent, all tautomers of a given chemical formula are intended.

In addition, atoms making up the compounds of the present invention are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include 13C and 14C.

In some embodiments, compounds of the present invention function as prodrugs or can be derivatized to function as prodrugs. Since prodrugs are known to enhance numerous desirable qualities of pharmaceuticals (e.g., solubility, bioavailability, manufacturing, etc.), the compounds employed in some methods of the invention may, if desired, be delivered in prodrug form. Thus, the invention contemplates prodrugs of compounds of the present invention as well as methods of delivering prodrugs. Prodrugs of the compounds employed in the invention may be prepared by modifying functional groups present in the compound in such a way that the modifications are cleaved, either in routine manipulation or in vivo, to the parent compound. Accordingly, prodrugs include, for example, compounds described herein in which a hydroxy, amino, or carboxy group is bonded to any group that, when the prodrug is administered to a patient, cleaves to form a hydroxy, amino, or carboxylic acid, respectively.

In some embodiments, compounds of the present invention exist in salt or non-salt form. With regard to the salt form(s), in some embodiments the particular anion or cation forming a part of any salt form of a compound provided herein is not critical, so long as the salt, as a whole, is pharmacologically acceptable. Additional examples of pharmaceutically acceptable salts and their methods of preparation and use are presented in Handbook of Pharmaceutical Salts: Properties, and Use (2002), which is incorporated herein by reference.

It will be appreciated that many organic compounds can form complexes with solvents in which they are reacted or from which they are precipitated or crystallized. These complexes are known as "solvates." Where the solvent is water, the complex is known as a "hydrate." It will also be appreciated that many organic compounds can exist in more than one solid form, including crystalline and amorphous forms. All solid forms of the compounds provided herein, including any solvates thereof are within the scope of the present invention.

II. Mixed Pro-Drug Scaffolds

Figure 2:
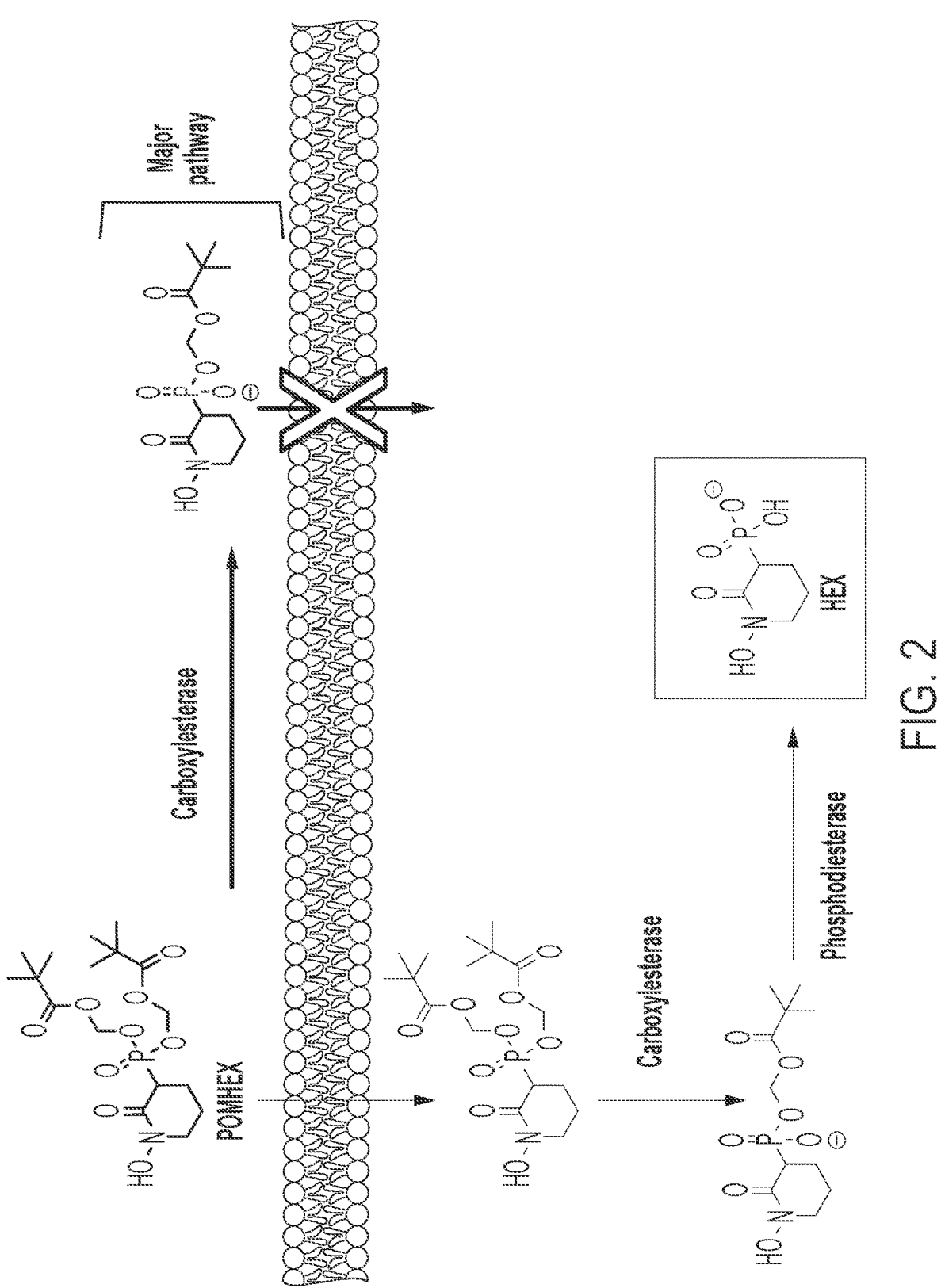
FIG. 2 shows the actual bioactivation pathway for POMHEX. Without wishing to be bound by any theory, high levels of extracellular carboxylesterases may lead to extracellular hydrolysis of the first POM group. The exposed negative charge on the drug thus may confer poor cell permeability.
Figure 3:
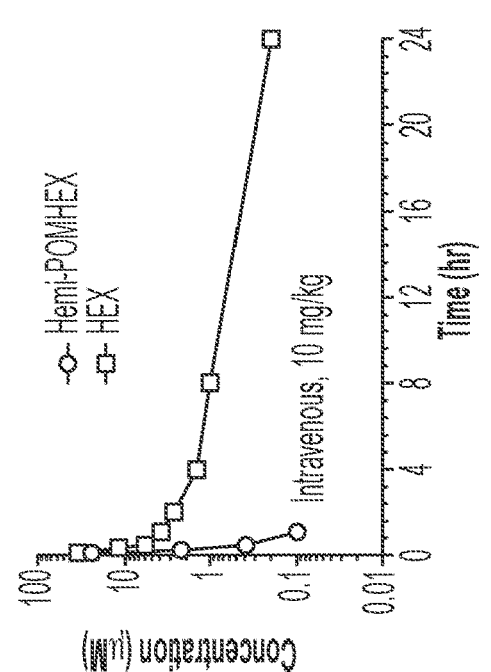
FIGS. 3A-3D show the ex-vivo half-life of POMHEX in biological fluids may limit its clinical utility.

In some embodiments, the present disclosure provides Enolase inhibitors having the attachment of mixed phosphonate/phosphoramidate pro-drug scaffolds to the previously described pharmacore, HEX. See US 2018-0147219, which is incorporated by reference herein. The preparation of pivaloyloxymethyl (POM) prodrugs of HEX was previously described and termed POMHEX (US 2018-0147219). While POMHEX has shown efficacy in vitro, further investigation of its pharmacological profile in vivo has revealed limitations related to the use of the POM group for shielding the anionic phosphate moiety on HEX. See Lin et al., 2018, which is incorporated by reference herein. It was hypothesized that bioactivation of POMHEX to the active agent, HEX, may occur through intracellular cleavage of each POM group through sequential action of carboxylesterase and then phosphodiesterase (FIG. 1). However, extensive in vivo characterization of POMHEX evidences rapid, extracellular cleavage of the first POM group due to high, extracellular carboxylesterase activity in plasma (FIGS. 2 & 3). This first deprotection event exposes the anionic phosphonate monoester, portending poor blood-brain barrier (BBB) penetration and cellular permeability.

Figure 4:
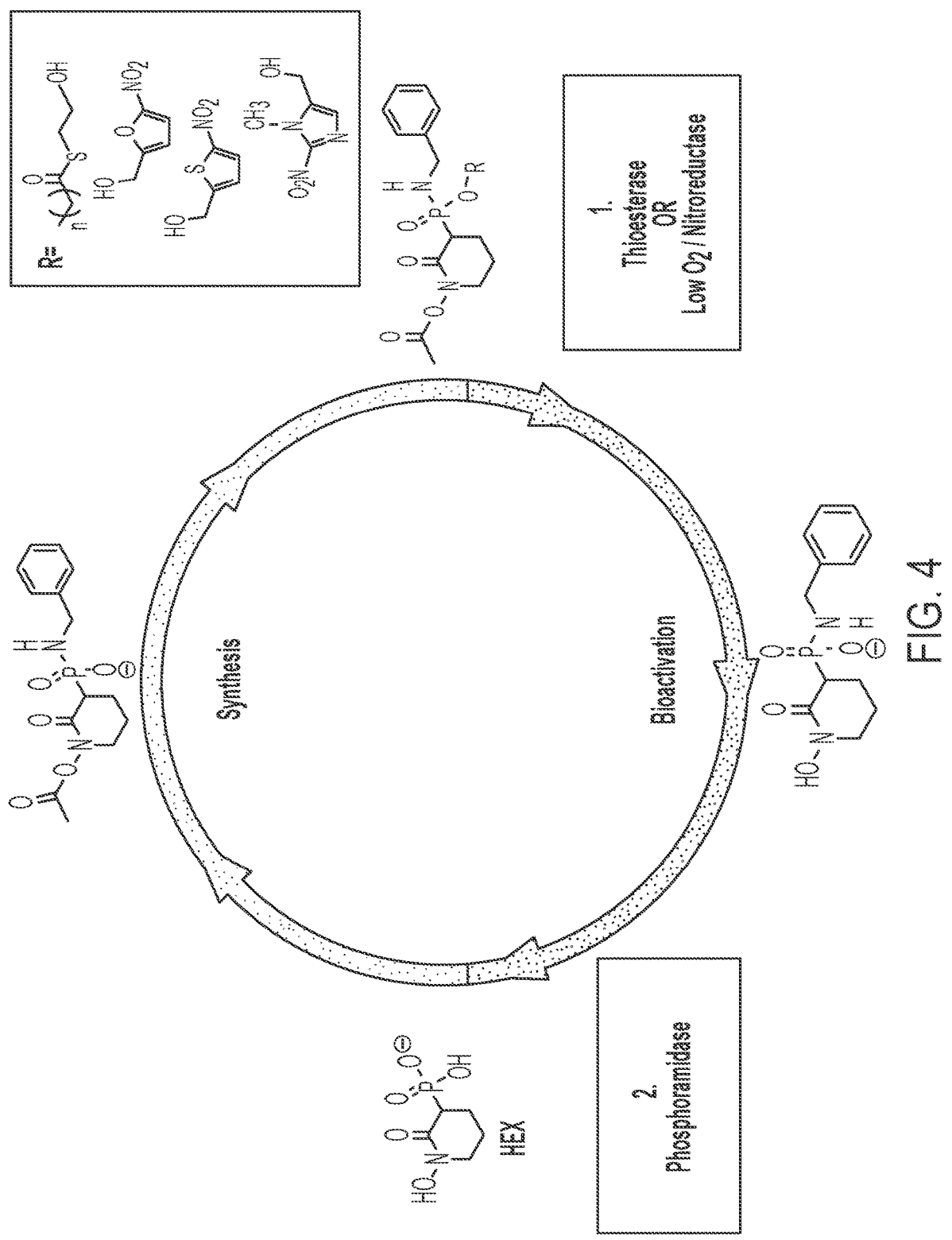
FIG. 4 shows the general pro-drug attachment strategy for intracellular drug release. Benzylamine is an efficient second leave group, as mediated by phosphoramidase cleavage. In some embodiments, the identity of the first leave group may be more variable: non-limiting examples of chemical moieties suited for enhanced pharmacokinetics are thioester, nitrofuran, and nitroimidazole derivatives. These protecting groups are cleaved by thioesterase or nitroreductase, respectively. The acetyl group on the hydroxamate may be rapidly removed by ubiquitous de-acetylase enzymes.

Retrometabolic analysis of suitable pro-drug moieties has led to the identification of a general pro-drug attachment strategy shaped by the substrate requirements for the enzymes involved in phosphonate bioactivation (FIG. 4). The polyprotic nature of phosphates warrants the attachment of two protecting groups for efficient cellular permeability. In general, it is noted that cleavage of the first pro-drug moiety can be accomplished through various enzymes which can act on uncharged substrates. Cleavage of the second pro-drug moiety of the compounds, however, may be to enzymes which require and can tolerate the presence of an anionic substrate for hydrolytic activity. Through biochemical evaluation of the many HEX derivatives synthesized, suitable substrates for the first and second pro-drug attachments has been probed.

Figure 5:
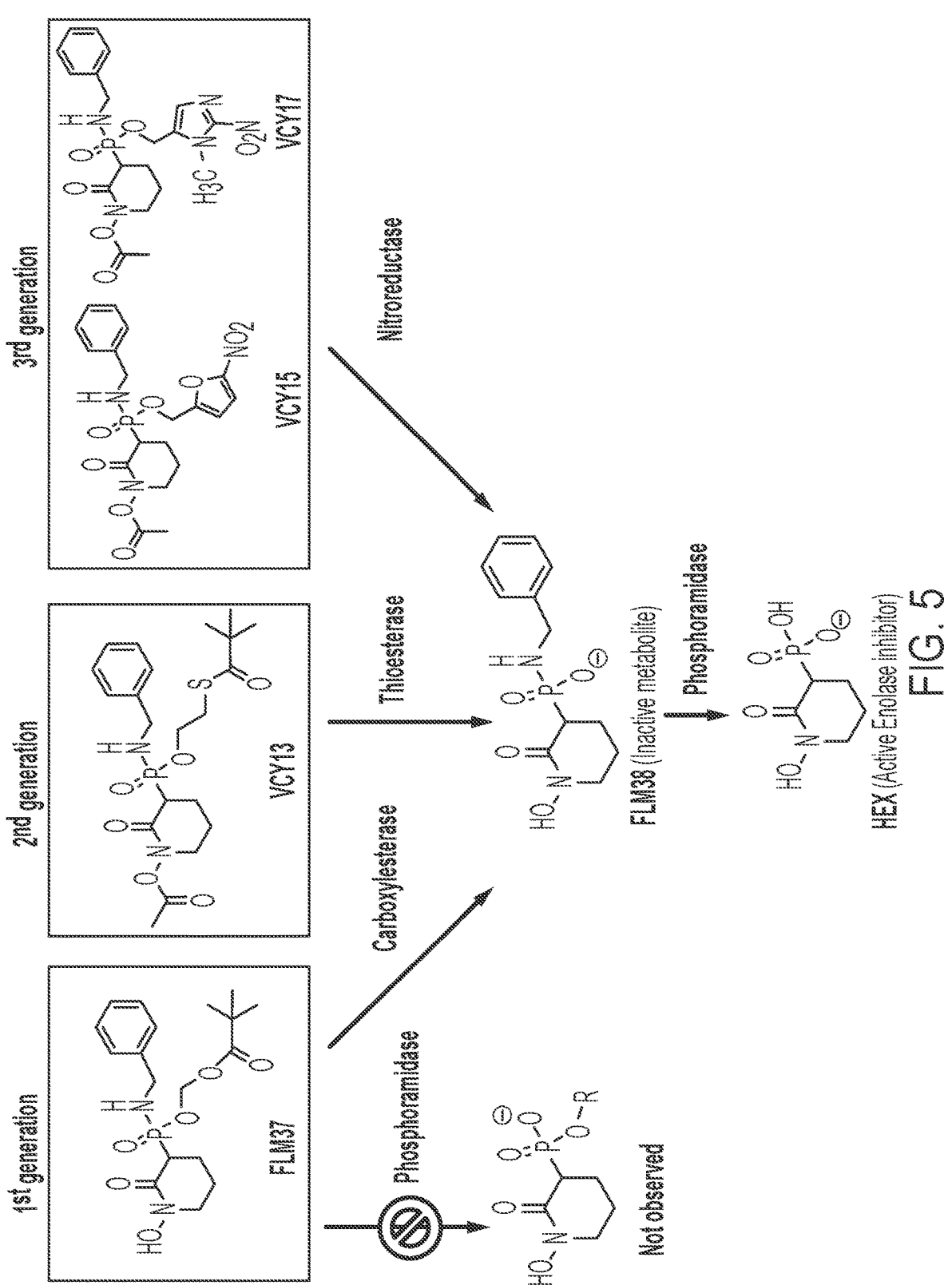
FIG. 5 shows bioactivation of first, second, and third-generation pro-drug compounds to the active inhibitor, HEX. (Left) FLM37 is a carboxylesterase-labile pro-drug that provided proof-of-concept for the viability of benzylamine as a second leave group. (Middle) VCY13 is a second-generation pro-drug that is first cleaved by thioesterases. (Right) VCY15 and VCY17 are representative third-generation pro-drugs which use nitroreductases for first cleavage. In all generations, removal of the first leave group (the moiety attached to the phosphorus atom through an oxygen-phosphorus bond) converge to FLM38. Without wishing to be bound by any theory, phosphoramidases can convert mono-phosphoramidate ester to free phosphonates but are inactive on di-esters. FLM38 can be converted to active HEX; however, without wishing to be bound by any theory, phosphoramidases only work on substrate with one free —OH. This may reflect the aqueous stability of phosphoramidastes in the chemical setting: such compounds are stable to both acid and base, but monoesters are sensitive to acid hydrolysis.

First, the results of this evaluation indicate that benzylamine and other benzylic amines are efficient second leave groups for cleavage via phosphoramidases. Without wishing to be bound by any theory, the hydrolytic activity of phosphoramidases is contingent upon the presence of a negative charge on the target substrate. Among the many benzylic amines tested for efficient hydrolysis, it has been found that, in some embodiments, benzylamine balances the molecular weight constraints imposed by BBB passage with productive phosphoramidase cleavage. Incorporation of benzylamine onto HEX thus may serve as the "anchor" for subsequent protection of the other free hydroxyl moiety (FIG. 5).

The use of benzylamine as a pro-drug moiety for phosphates was previously thought to be incapable of removal save for in the context of liver cancer cells. However, the present disclosure illustrates the application of this pro-drug moiety may enable and enhance the treatment of malignant glioma and other non-liver cancer cells.

Second, the results of the biochemical evaluation of the many HEX derivatives indicates that nitroheterocyclic phosphoramidites and thioester phosphoramidites, comprise two broad classes of first leave groups with improved pharmacokinetic properties over the POM group. Analysis of the pharmacokinetics (PK) of POMHEX evidences the ephemeral nature of the wholly intact molecule, which has a half-life of approximately 30 seconds in mouse plasma (Lin et al., 2018; FIG. 3). Without wishing to be bound by any theory, this rapid degradation of the protected molecule may be attributed to high levels of extracellular carboxylesterases. To circumvent this issue, non-carboxylesterase labile pro-drug moieties were employed to serve as the first leave group. Of the many enzymes which act on uncharged phosphonate diesters, a number of chemical moieties susceptible to thioesterase or nitroreductase cleavage have been identified as beneficial for improved PK (FIG. 5). The pivalic thioester serves a suitable moiety for thioesterase cleavage, while the nitrofuran serves as a suitable moiety for nitroreductase activity. Studies have also presented nitroimidazole as a suitable substrate for nitroreductase with enhanced potency under hypoxic conditions. Additionally, it was found that cyanoethanol can be used as a first pro-drug leave group (see Table 1, compound VCY26), which is likely hydrolyzed by nucleophile-catalyzed beta-elimination.

Distinct from phosphoramidase-labile pro-drugs, it was also found that oxidation-labile and lipase-labile pro-drugs are also efficacious pro-drug strategies to deliver HEX. Attachment of 2-(hydroxymethyl)phenol ("cyclosal") onto phosphonates was found to improve the delivery of HEX under hyperoxic conditions (see Table 2) which, to the best of our knowledge, has not previously been described in the literature. Another pro-drug moiety that forgoes a phosphonoamidate-containing intermediate entirely is a 3-(hexadecyloxy)propan-1-ol, a long-chain (C19), lipid-like phosphonate ester (see Table 1, compound ESB7), which has also proven to be effective at delivering HEX. At present, the proposed mechanism of intracellular delivery and bioactivation revolves around the structural resemblance of the long-chain HEX monoester to a phospholipid. Without wishing to be bound by any particular theory, transport may be mediated by flippases and hydrolysis may be achieved through lipases.

Also described herein are synthesized phosphonate pro-drugs that forgo the use of phosphoramidases or esterases to release the active pharmacophore. These moieties include the attachment of 2-(hydroxymethyl)phenol (VCY27) and 3-(hexadecyloxy)propan-1-ol (ESB7). Both VCY27 and ESB7 have demonstrated robust stability under various pH conditions and in biological fluids while exhibiting selective killing against ENO1-deleted cells. Cyclosal pro-drugs have previously been described for protecting phosphate-containing antiviral nucleotides; however, it was herein discovered that its delivery efficacy can be enhanced under high $O_2$ conditions—a previously unknown finding. Separately, the 3-(hexadecyloxy)propan-1-ol is a pro-drug that has been applied to the antiviral nucleotide Brincidofovir (CMX-001). Appending the long chain ester to HEX may facilitate the pro-drug moiety to be used for the treatment of malignant glioma.

The concept of collateral lethality primarily capitalizes on metabolic vulnerabilities conferred through homozygous deletion of core housekeeping genes with a redundant paralog. However, proof-of-principle studies on Enolase has revealed that ENO1-heterozygous deleted cancers may also be sensitive to Enolase inhibition. This concurs with the basic premise that, in general and without wishing to be bound by any theory, cancers with reduced levels of ENO1 are susceptible to inhibition of ENO2. Examining the effects of POMHEX against ENO1-heterozygous deleted cells has shown 10-fold specificity towards the heterozygous deleted cells compared to normal tissue (FIG. 6). Yet this distinction may not be sufficient to achieve a meaningful therapeutic window due to accumulation of the hydrolyzed monoester at concentrations 100-fold greater in certain normal tissue compared to the tumor.

In some embodiments, the non-carboxylesterase labile prodrugs described herein have improved half-lives over POMHEX. Accordingly, the slower rate of bioactivation for the presently disclosed Enolase inhibitors alleviates the issue of off-target accumulation, and may create a more meaningful therapeutic window. In tandem with their utility against ENO1-homozygous deleted cancers, these non-carboxylesterase-labile prodrugs of HEX may also be used for the treatment of ENO1-heterozygous deleted cancers.

The present disclosure provides compounds having enhanced PK properties compared with POMHEX, as they forgo carboxylesterase bioactivation. In some embodiments, the compounds of the present disclosure exhibit longer half-life of the fully protected molecule which may allow for greater BBB penetration and cell permeability, in addition to creating a therapeutic window suitable for treating ENO1-heterozygous deleted cancers, which is a consideration in terms of the number of patients who may benefit from collateral lethality as a therapeutic strategy.

In some embodiments, the present disclosure provides compounds comprising first and second pro-drug groups that act as modular units that can be switched for selectivity and ADME effects. In some embodiments, that removal of phosphonamidate pro-drugs may require first formation of a phospho-free hydroxyl group, which means that in a mixed phosphonoamidate ester, the amidate may be removed first. This mechanism is supported by $^{31}P$ NMR studies in biological fluids. This allows a modular approach to be taken with respects to first and second leaving groups, which can be mixed and matched, based on desired bioactivation pathways, as well as ADME properties.

Without wishing to be bound by any particular theory, phosphoamidates may be removed across broad cell types. Whilst the IDX184 utilized benzylamine in its pro-drug structure, this drug was specifically directed at hepatocytes, and no evidence was forthcoming that it would be a pro-drug moiety applicable for glioblastoma or other cancer drug delivery. The present disclosure provides compounds that exhibit activity in a range of cell lines. For example, FLM37 has been submitted to the NCI-60 screening (NSC: D-813202). All cancer cell lines were affected at concentrations of FLM37 above 10 µM, some with as little as 1 µM. These results are consistent with the overall targeting hypothesis, which is that ENO1-deletion confers sensitivity (D423 ENO1-deleted have IC50~150 nM for FLM37, None of the NCI-60 cell lines are ENO1-deleted). It further indicates that across diverse cancer types, the benzylamine moiety is removable. More generally, this means that the amine as a second leaving group is applicable as a universal second leaving group for the delivery of phosphonate/phosphate containing bioactive compounds.

III. Treatment Methods

In one aspect, the present disclosure provides compounds and compositions that may be used as inhibitors of enolase enzymes. Such compounds include those compounds described above.

Three enolase subunits (α, β, and γ) are known to assemble as five different enolase isoenzymes. Some non-limiting isoenzymes are enolase 1 (α), enolase 2 (γ), and enolase 3 (β). Enolase 2 is expressed at low levels in many cell types, but at high levels in neurons and neural tissues, while enolase 3 is primarily found in muscle tissue, and enolase 1 is expressed at varying levels in all tissue. As noted previously, enolases catalyze the conversion of 2-phosphoglycerate to phosphoenolpyruvate in glycolysis. While the sequence of the enolase enzyme and its subunits are highly conserved, in some embodiments, the inhibitors can preferentially inhibit one or more subunit or isoenzyme of enolase.

Precision oncology is currently restricted to activated oncogenes as drug targets, with tumor suppressor deletions remaining largely in-actionable. In some embodiments, there are provided herein novel enolase inhibitors with improved pharmacokinetic properties over previously described compound, POMHEX, the pivaloyloxymethyl (POM)-prodrug of the Enolase inhibitor, HEX. While POMHEX has shown to be an effective inhibitor in vitro, in vivo utility is challenged by rapid extracellular cleavage of the first POM group. This compromises meaningful tissue and blood-brain-barrier (BBB) passage and cell permeability due to the exposed negative charge. In some embodiments, there are provided herein novel prodrugs of enolase inhibitors having improved efficiency with respect to BBB passage and/or cell permeability and/or improved selectivity for cells having various gene mutations, such as ENO1 deletion.

Cancers harboring the homozygous deletion of 1p36-localized ENO1 remain metabolically active and viable through redundant action of its paralogue, ENO2. Inhibition of ENO2 in cancer cells harboring ENO1-homozygous deletion may be used to discriminately kill ENO1-deleted cells. In some embodiments, the present disclosure provides compounds, compositions and methods for discriminately killing ENO1-deleted cells. In some embodiments, the present disclosure also provides prodrugs of the pharmacophore HEX that exhibit enhanced pharmacokinetic properties, such as efficient BBB passage and cell permeability. In some embodiments, the pro-drugs disclosed herein result in selective killing of ENO1-deleted cells in an oxygen-dependent manner. Thus, unlike POMHEX, these pro-drugs will in some embodiments result in selective delivery of active enolase inhibitor to hypo-oxygenated (hypoxic) tumors. The pharmacokinetic properties endowed by these more robust pro-drug moieties enable in some embodiments a therapeutic window amenable to applications beyond ENO1-homozygous deleted tumors, including but not limited to ENO1-heterozygous deleted cancers. The Enolase inhibitors disclosed herein may be used to expand the therapeutic reach of collateral lethality in some embodiments. In further embodiments, the enolase inhibitors provided herein may be used to treat or prevent a wide variety of diseases and disorders, including those discussed below.

A. Bacterial Infections

In another aspect of the present disclosure, the compounds, compositions, and methods disclosed herein may be used to treat bacterial infections. While humans contain numerous different bacteria on and inside their bodies, an imbalance in bacterial levels or the introduction of pathogenic bacteria can cause a symptomatic bacterial infection. Pathogenic bacteria cause a variety of different diseases including but not limited to numerous foodborne illness, typhoid fever, tuberculosis, pneumonia, syphilis, and leprosy.

Additionally, different bacteria have a wide range of interactions with body and those interactions can modulate ability of the bacteria to cause an infection. For example, bacteria can be conditionally pathogenic such that they only cause an infection under specific conditions. For example, *Staphylococcus* and *Streptococcus* bacteria exist in the normal human bacterial biome, but these bacteria when they are allowed to colonize other parts of the body causing a skin infection, pneumonia, or sepsis. Other bacteria are known as opportunistic pathogens and only cause diseases in a patient with a weakened immune system or another disease or disorder.

Some bacteria function as intracellular pathogens that can grow and reproduce within the cells of the host organism. Such bacteria can be divided into two major categories as either obligate intracellular parasites or facultative intracellular parasites. Obligate intracellular parasites require the host cell in order to reproduce and include such bacteria as but are not limited to *Chlamydophila, Rickettsia,* and *Ehrli-*

*chia* which are known to cause pneumonia, urinary tract infections, typhus, and Rocky Mountain spotted fever. Facultative intracellular parasites can reproduce either intracellular or extracellular. Some non-limiting examples of facultative intracellular parasites include *Salmonella, Listeria, Legionella, Mycobacterium,* and *Brucella* which are known to cause food poisoning, typhoid fever, sepsis, meningitis, Legionnaire's disease, tuberculosis, leprosy, and brucellosis.

B. Parasitic Infections

In another aspect, the compounds, compositions, and methods disclosed herein may be used to treat parasitic infections, including, for example, *Trypanosoma brucei* or *Trypanosoma cruzi.* African trypanosomiasis is a disease caused by the *Trypanosoma brucei* parasite and generally spread by the tsetse fly. The disease is transmitted when a person is bitten by the tsetse fly and is infected by one of two different subspecies of *Trypanosoma brucei*: a *Trypanosoma brucei rhodesiense* infection or a *Trypanosoma brucei gambiense* infection. The *rhodesiense* infection is typically an acute infection which last for a few weeks to several months while the *gambiense* infection is typically chronic and can last several years including long periods of time when the patient is asymptomatic. Typical symptoms of the disease include headaches, fever, weakness, itchiness, pain in the joints, and stiffness. After time, the disease can spread to the brain and cause damage to the central nervous system leading to such complications as psychiatric disorders, trouble sleeping, tremor, paralysis, seizures, and coma before finally leading causing death. If untreated, the disease is fatal.

Chagas disease is an infection by the parasite *Trypanosoma cruzi* and is spread by the triatomine bugs. The initial infection does not result in significant symptoms but after years, the chronic infection can result in severe symptoms. Some of these severe symptoms include abnormal heart rhythms, heart failures, gastrointestinal issues such as constipation and difficulty swallowing, and death.

C. Cancer and Other Hyperproliferative Diseases

In another aspect, the compounds, compositions, and methods disclosed herein may be used to treat cancer or other hyperproliferative diseases. While hyperproliferative diseases can be associated with any disease which causes a cell to begin to reproduce uncontrollably, the prototypical example is cancer. One of the elements of cancer is that the cell's normal apoptotic cycle is interrupted. As such, agents that interrupt the growth of the cells are important as therapeutic agents for treating these diseases. In this disclosure, the compounds of the present disclosure thereof may be used to lead to decreased cell counts and may be used to treat a variety of types of cancer lines. In some embodiments, the compounds of the present disclosure inhibit enolase and thus glycolysis. In some embodiments, the compounds are efficacious against cancers which contain a mutation or deletion of the one or more enolase genes such as the gene which encodes for enolase 1. In some embodiments, the mutation is a deletion of enolase 1. In some embodiments, the deletion is a heterozygous ENO1 deletion. In other embodiments, the deletion is a homozygous ENO1 deletion. In some embodiments, the compounds are efficacious against cancers that exhibit hypoxia.

Cancer cells that may be treated with the compounds of the present disclosure include, but are not limited to, bladder, blood, bone, bone marrow, brain, breast, colon, esophagus, gastrointestine, gum, head, kidney, liver, lung, nasopharynx, neck, ovary, prostate, skin, stomach, pancreas, testis, tongue, cervix, and uterus cells.

In certain embodiments regarding methods of treating cancer in a subject, comprising administering to the subject a pharmaceutically effective amount of a compound of the present disclosure, the pharmaceutically effective amount is 0.1-1000 mg/kg. In certain embodiments, the pharmaceutically effective amount is administered in a single dose per day. In certain embodiments, the pharmaceutically effective amount is administered in two or more doses per day. The compound may be administered by contacting a tumor cell during ex vivo purging, for example. The method of treatment may comprise any one or more of the following: a) inducing cytotoxicity in a tumor cell; b) killing a tumor cell; c) inducing apoptosis in a tumor cell; d) inducing differentiation in a tumor cell; or e) inhibiting growth in a tumor cell. The tumor cell may be any type of tumor cell, such as a brain cell. Other types of cells include, for example, a bladder cancer cell, a breast cancer cell, a lung cancer cell, a colon cancer cell, a prostate cancer cell, a liver cancer cell, a pancreatic cancer cell, a stomach cancer cell, a testicular cancer cell, a brain cancer cell, an ovarian cancer cell, a lymphatic cancer cell, a skin cancer cell, a brain cancer cell, a bone cancer cell, or a soft tissue cancer cell.

IV. Pharmaceutical Compositions and Routes of Administration

In another aspect, for administration to a patient in need of such treatment, pharmaceutical formulations (also referred to as a pharmaceutical preparations, pharmaceutical compositions, pharmaceutical products, medicinal products, medicines, medications, or medicaments) comprise a therapeutically effective amount of a compound disclosed herein formulated with one or more excipients and/or drug carriers appropriate to the indicated route of administration. In some embodiments, the compounds disclosed herein are formulated in a manner amenable for the treatment of human and/or veterinary patients. In some embodiments, formulation comprises admixing or combining one or more of the compounds disclosed herein with one or more of the following excipients: lactose, sucrose, starch powder, cellulose esters of alkanoic acids, cellulose alkyl esters, talc, stearic acid, magnesium stearate, magnesium oxide, sodium and calcium salts of phosphoric and sulfuric acids, gelatin, acacia, sodium alginate, polyvinylpyrrolidone, and/or polyvinyl alcohol. In some embodiments. e.g., for oral administration, the pharmaceutical formulation may be tableted or encapsulated. In some embodiments, the compounds may be dissolved or slurried in water, polyethylene glycol, propylene glycol, ethanol, corn oil, cottonseed oil, peanut oil, sesame oil, benzyl alcohol, sodium chloride, and/or various buffers. In some embodiments, the pharmaceutical formulations may be subjected to pharmaceutical operations, such as sterilization, and/or may contain drug carriers and/or excipients such as preservatives, stabilizers, wetting agents, emulsifiers, encapsulating agents such as lipids, dendrimers, polymers, proteins such as albumin, nucleic acids, and buffers.

Pharmaceutical formulations may be administered by a variety of methods, e.g., orally or by injection (e.g. subcutaneous, intravenous, and intraperitoneal). Depending on the route of administration, the compounds disclosed herein may be coated in a material to protect the compound from the action of acids and other natural conditions which may inactivate the compound. To administer the active compound by other than parenteral administration, it may be necessary to coat the compound with, or co-administer the compound with, a material to prevent its inactivation. In some embodiments, the active compound may be administered to a patient in an appropriate carrier, for example, liposomes, or a diluent. Pharmaceutically acceptable diluents include saline and aqueous buffer solutions. Liposomes include water-in-oil-in-water CGF emulsions as well as conventional liposomes.

The compounds disclosed herein may also be administered parenterally, intraperitoneally, intraspinally, or intracerebrally. Dispersions can be prepared in glycerol, liquid polyethylene glycols, and mixtures thereof and in oils. Under ordinary conditions of storage and use, these preparations may contain a preservative to prevent the growth of microorganisms.

Pharmaceutical compositions suitable for injectable use include sterile aqueous solutions (where water soluble) or dispersions and sterile powders for the extemporaneous preparation of sterile injectable solutions or dispersion. The carrier can be a solvent or dispersion medium containing, for example, water, ethanol, polyol (such as, glycerol, propylene glycol, and liquid polyethylene glycol, and the like), suitable mixtures thereof, and vegetable oils. The proper fluidity can be maintained, for example, using a coating such as lecithin, by the maintenance of the required particle size in the case of dispersion and by the use of surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, sodium chloride, or polyalcohols such as mannitol and sorbitol, in the composition. Prolonged absorption of the injectable compositions can be brought about by including in the composition an agent which delays absorption, for example, aluminum monostearate or gelatin.

The compounds disclosed herein can be administered orally, for example, with an inert diluent or an assimilable edible carrier. The compounds and other ingredients may also be enclosed in a hard or soft-shell gelatin capsule, compressed into tablets, or incorporated directly into the patient's diet. For oral therapeutic administration, the compounds disclosed herein may be incorporated with excipients and used in the form of ingestible tablets, buccal tablets, troches, capsules, elixirs, suspensions, syrups, wafers, and the like. The percentage of the therapeutic compound in the compositions and preparations may, of course, be varied. The amount of the therapeutic compound in such pharmaceutical formulations is such that a suitable dosage will be obtained.

The therapeutic compound may also be administered topically to the skin, eye, ear, or mucosal membranes. Administration of the therapeutic compound topically may include formulations of the compounds as a topical solution, lotion, cream, ointment, gel, foam, transdermal patch, or tincture. When the therapeutic compound is formulated for topical administration, the compound may be combined with one or more agents that increase the permeability of the compound through the tissue to which it is administered. In other embodiments, it is contemplated that the topical administration is administered to the eye. Such administration may be applied to the surface of the cornea, conjunctiva, or sclera. Without wishing to be bound by any theory, it is believed that administration to the surface of the eye allows the therapeutic compound to reach the posterior portion of the eye. Ophthalmic topical administration can be formulated as a solution, suspension, ointment, gel, or emulsion. Finally, topical administration may also include administration to the mucosa membranes such as the inside of the mouth. Such administration can be directly to a particular location within the mucosal membrane such as a tooth, a sore, or an ulcer. Alternatively, if local delivery to the lungs is desired the therapeutic compound may be administered by inhalation in a dry-powder or aerosol formulation.

In some embodiments, it may be advantageous to formulate parenteral compositions in dosage unit form for ease of administration and uniformity of dosage. Dosage unit form as used herein refers to physically discrete units suited as unitary dosages for the patients to be treated; each unit containing a predetermined quantity of therapeutic compound calculated to produce the desired therapeutic effect in association with the required pharmaceutical carrier. In some embodiments, the specification for the dosage unit forms of the invention are dictated by and directly dependent on (a) the unique characteristics of the therapeutic compound and the particular therapeutic effect to be achieved, and (b) the limitations inherent in the art of compounding such a therapeutic compound for the treatment of a selected condition in a patient. In some embodiments, active compounds are administered at a therapeutically effective dosage sufficient to treat a condition associated with a condition in a patient. For example, the efficacy of a compound can be evaluated in an animal model system that may be predictive of efficacy in treating the disease in a human or another animal.

In some embodiments, the effective dose range for the therapeutic compound can be extrapolated from effective doses determined in animal studies for a variety of different animals. In some embodiments, the human equivalent dose (HED) in mg/kg can be calculated in accordance with the following formula (see, e.g., Reagan-Shaw et al., *FASEB J.*, 22(3):659-661, 2008, which is incorporated herein by reference):

$$\text{HED (mg/kg)} = \text{Animal dose (mg/kg)} \times (\text{Animal } K_m/\text{Human } K_m)$$

Use of the $K_m$ factors in conversion results in HED values based on body surface area (BSA) rather than only on body mass. $K_m$ values for humans and various animals are well known. For example, the $K_m$ for an average 60 kg human (with a BSA of 1.6 m$^2$) is 37, whereas a 20 kg child (BSA 0.8 m$^2$) would have a $K_m$ of 25. $K_m$ for some relevant animal models are also well known, including: mice $K_m$ of 3 (given a weight of 0.02 kg and BSA of 0.007); hamster $K_m$ of 5 (given a weight of 0.08 kg and BSA of 0.02); rat $K_m$ of 6 (given a weight of 0.15 kg and BSA of 0.025) and monkey $K_m$ of 12 (given a weight of 3 kg and BSA of 0.24).

Precise amounts of the therapeutic composition depend on the judgment of the practitioner and are specific to each individual. Nonetheless, a calculated HED dose provides a general guide. Other factors affecting the dose include the physical and clinical state of the patient, the route of administration, the intended goal of treatment and the potency, stability and toxicity of the particular therapeutic formulation.

The actual dosage amount of a compound of the present disclosure or composition comprising a compound of the present disclosure administered to a patient may be determined by physical and physiological factors such as type of animal treated, age, sex, body weight, severity of condition, the type of disease being treated, previous or concurrent therapeutic interventions, idiopathy of the patient and on the route of administration. These factors may be determined by a skilled artisan. The practitioner responsible for administration will typically determine the concentration of active ingredient(s) in a composition and appropriate dose(s) for the individual patient. The dosage may be adjusted by the individual physician in the event of any complication.

In some embodiments, the therapeutically effective amount typically will vary from about 0.001 mg/kg to about 1000 mg/kg, from about 0.01 mg/kg to about 750 mg/kg, from about 100 mg/kg to about 500 mg/kg, from about 1 mg/kg to about 250 mg/kg, from about 10 mg/kg to about 150 mg/kg in one or more dose administrations daily, for one or several days (depending of course of the mode of administration and the factors discussed above). Other suitable dose ranges include 1 mg to 10,000 mg per day, 100 mg to 10,000 mg per day, 500 mg to 10.000 mg per day, and 500 mg to 1,000 mg per day. In some embodiments, the amount is less than 10,000 mg per day with a range of 750 mg to 9,000 mg per day.

In some embodiments, the amount of the active compound in the pharmaceutical formulation is from about 2 to about 75 weight percent. In some of these embodiments, the amount if from about 25 to about 60 weight percent.

Single or multiple doses of the agents are contemplated. Desired time intervals for delivery of multiple doses can be determined by one of ordinary skill in the art employing no more than routine experimentation. As an example, patients may be administered two doses daily at approximately 12-hour intervals. In some embodiments, the agent is administered once a day.

The agent(s) may be administered on a routine schedule. As used herein a routine schedule refers to a predetermined designated period of time. The routine schedule may encompass periods of time which are identical, or which differ in length, as long as the schedule is predetermined. For instance, the routine schedule may involve administration twice a day, every day, every two days, every three days, every four days, every five days, every six days, a weekly basis, a monthly basis or any set number of days or weeks there-between. Alternatively, the predetermined routine schedule may involve administration on a twice daily basis for the first week, followed by a daily basis for several months, etc. In other embodiments, the invention provides that the agent(s) may be taken orally and that the timing of which is or is not dependent upon food intake. Thus, for example, the agent can be taken every morning and/or every evening, regardless of when the patient has eaten or will eat.

V. Definitions

When used in the context of a chemical group: "hydrogen" means —H; "hydroxy" means —OH; "oxo" means =O; "carbonyl" means —C(=O)—; "carboxy" means —C(=O)OH (also written as —COOH or —CO2H); "halo" means independently —F, —Cl, —Br or —I, "amino" means —NH2; "hydroxyamino" means —NHOH; "nitro" means —NO$_2$; imino means =NH; "cyano" means —CN; "isocyanyl" means —N=C=O; "azido" means —N3; in a monovalent context "phosphate" means —OP(O)(OH)2 or a deprotonated form thereof; in a divalent context "phosphate" means —OP(O)(OH)O— or a deprotonated form thereof; "mercapto" means —SH; and "thio" means =S; "sulfonyl" means —S(O)2-; and "sulfinyl" means —S(O)—.

In the context of chemical formulas, the symbol "—" means a single bond, "=" means a double bond, and "≡" means triple bond. The symbol "- - - -" represents an optional bond, which if present is either single or double.

The symbol " ⹀ " represents a single bond or a double bond. Thus, the formula covers, for example, And it is understood that no one such ring atom forms part of more than one double bond. Furthermore, it is noted that the covalent bond symbol "—", when connecting one or two stereogenic atoms, does not indicate any preferred stereochemistry. Instead, it covers all stereoisomers as well as mixtures thereof. The symbol " ⌇ ", when drawn perpendicularly across a bond (e.g., for methyl) indicates a point of attachment of the group. It is noted that the point of attachment is typically only identified in this manner for larger groups in order to assist the reader in unambiguously ◢ identifying a point of attachment. The symbol " ◢ " means a single bond where the group attached to the thick end of the wedge is "out of the page." The symbol " ◺ " a single bond where the group attached to the thick end of the wedge is "into the page". The symbol " ⌇ " means a single bond where the geometry around a double bond (e.g., either E or Z) is undefined. Both options, as well as combinations thereof are therefore intended. Any undefined valency on an atom of a structure shown in this application implicitly represents a hydrogen atom bonded to that atom. A bold dot on a carbon atom indicates that the hydrogen attached to that carbon is oriented out of the plane of the paper.

When a variable is depicted as a "floating group" on a ring system, for example, the group "R" in the formula:

then the variable may replace any hydrogen atom attached to any of the ring atoms, including a depicted, implied, or expressly defined hydrogen, so long as a stable structure is formed. When a variable is depicted as a "floating group" on a fused ring system, as for example the group "R" in the formula:

then the variable may replace any hydrogen attached to any of the ring atoms of either of the fused rings unless specified otherwise. Replaceable hydrogens include depicted hydrogens (e.g., the hydrogen attached to the nitrogen in the formula above), implied hydrogens (e.g., a hydrogen of the formula above that is not shown but understood to be present), expressly defined hydrogens, and optional hydrogens whose presence depends on the identity of a ring atom (e.g., a hydrogen attached to group X, when X equals —CH—), so long as a stable structure is formed. In the example depicted, R may reside on either the 5-membered or the 6-membered ring of the fused ring system. In the formula above, the subscript letter "y" immediately following the R enclosed in parentheses, represents a numeric variable. Unless specified otherwise, this variable can be 0, 1, 2, or any integer greater than 2, only limited by the maximum number of replaceable hydrogen atoms of the ring or ring system.

For the chemical groups and compound classes, the number of carbon atoms in the group or class is as indicated as follows: "Cn" or "C=n" defines the exact number (n) of carbon atoms in the group/class. "C≤n" defines the maximum number (n) of carbon atoms that can be in the group/class, with the minimum number as small as possible for the group/class in question. For example, it is understood that the minimum number of carbon atoms in the groups "alkyl$_{(C≤8)}$", "cycloalkanediyl$_{(C≤8)}$", "heteroaryl$_{(C≤8)}$", and "acyl$_{(C≤8)}$" is one, the minimum number of carbon atoms in the groups "alkenyl$_{(C≤8)}$", "alkynyl$_{(C≤8)}$", and "heterocycloalkyl$_{(C≤8)}$" is two, the minimum number of carbon atoms in the group "cycloalkyl$_{(C≤8)}$" is three, and the minimum number of carbon atoms in the groups "aryl$_{(C≤8)}$" and "arenediyl$_{(C≤8)}$" is six. "Cn-n'" defines both the minimum (n) and maximum number (n') of carbon atoms in the group. Thus, "alkyl$_{(C2-10)}$" designates those alkyl groups having from 2 to 10 carbon atoms. These carbon number indicators may precede or follow the chemical groups or class it modifies and it may or may not be enclosed in parenthesis, without signifying any change in meaning. Thus, the terms "C5 olefin", "C5-olefin", "olefin$_{(C5)}$", and "olefin$_{C5}$" are all synonymous. Except as noted below, every carbon atom is counted to determine whether the group or compound falls with the specified number of carbon atoms. For example, the group dihexylamino is an example of a dialkylamino$_{(C=12)}$ group; however, it is not an example of a dialkylamino$_{(C=6)}$ group. Likewise, phenylethyl is an example of an aralkyl$_{(C=8)}$ group. When any of the chemical groups or compound classes defined herein is modified by the term "substituted", any carbon atom in the moiety replacing the hydrogen atom is not counted. Thus methoxyhexyl, which has a total of seven carbon atoms, is an example of a substituted alkyl$_{(C1-6)}$. Unless specified otherwise, any chemical group or compound class listed in a claim set without a carbon atom limit has a carbon atom limit of less than or equal to twelve.

The term "saturated" when used to modify a compound or chemical group means the compound or chemical group has no carbon-carbon double and no carbon-carbon triple bonds, except as noted below. When the term is used to modify an atom, it means that the atom is not part of any double or triple bond. In the case of substituted versions of saturated groups, one or more carbon oxygen double bond or a carbon nitrogen double bond may be present. And when such a bond is present, then carbon-carbon double bonds that may occur as part of keto-enol tautomerism or imine/enamine tautomerism are not precluded. When the term "saturated" is used to modify a solution of a substance, it means that no more of that substance can dissolve in that solution.

The term "aliphatic" signifies that the compound or chemical group so modified is an acyclic or cyclic, but non-aromatic compound or group. In aliphatic compounds/groups, the carbon atoms can be joined together in straight chains, branched chains, or non-aromatic rings (alicyclic). Aliphatic compounds/groups can be saturated, that is joined by single carbon-carbon bonds (alkanes/alkyl), or unsaturated, with one or more carbon-carbon double bonds (alkenes/alkenyl) or with one or more carbon-carbon triple bonds (alkynes/alkynyl).

The term "aromatic" signifies that the compound or chemical group so modified has a planar unsaturated ring of atoms with $4n+2$ electrons in a fully conjugated cyclic $\pi$ system. An aromatic compound or chemical group may be depicted as a single resonance structure-however, depiction of one resonance structure is taken to also refer to any other resonance structure. For example:

is also taken to refer to

Aromatic compounds may also be depicted using a circle to represent the delocalized nature of the electrons in the fully conjugated cyclic $\pi$ system, two non-limiting examples of which are shown below:

The term "alkyl" refers to a monovalent saturated aliphatic group with a carbon atom as the point of attachment, a linear or branched acyclic structure, and no atoms other than carbon and hydrogen. The groups —CH3 (Me), —CH2CH3 (Et), —CH2CH2CH3 (n-Pr or propyl), —CH(CH3)2 (i-Pr, iPr or isopropyl), —CH2CH2CH2CH3 (n-Bu), —CH(CH3)CH2CH3 (sec-butyl), —CH2CH(CH3)2 (isobutyl), —C(CH3)3 (tert-butyl, t-butyl, t-Bu or tBu), and —CH2C(CH3)3 (neo-pentyl) are non-limiting examples of alkyl groups. The term "alkanediyl" refers to a divalent saturated aliphatic group, with one or two saturated carbon atom(s) as the point(s) of attachment, a linear or branched acyclic structure, no carbon-carbon double or triple bonds, and no atoms other than carbon and hydrogen. The groups –CH2- (methylene), –CH2CH2-, —CH2C(CH3)2CH2-, and —CH2CH2CH2- are non-limiting examples of alkanediyl groups. The term "alkylidene" refers to the divalent group =CRR' in which R and R' are independently hydrogen or alkyl. Non-limiting examples of alkylidene groups include: =CH2, =CH(CH2CH3), and =C(CH3)2. An "alkane" refers to the class of compounds having the formula H—R, wherein R is alkyl as this term is defined above.

The term "aryl" refers to a monovalent unsaturated aromatic group with an aromatic carbon atom as the point of attachment, said carbon atom forming part of a one or more aromatic ring structures, each with six ring atoms that are all carbon, and wherein the group consists of no atoms other than carbon and hydrogen. If more than one ring is present, the rings may be fused or unfused. Unfused rings are connected with a covalent bond. As used herein, the term aryl does not preclude the presence of one or more alkyl groups (carbon number limitation permitting) attached to the first aromatic ring or any additional aromatic ring present. Non-limiting examples of aryl groups include phenyl (Ph), methylphenyl, (dimethyl)phenyl, —C6H4CH2CH3 (ethylphenyl), naphthyl, and a monovalent group derived from biphenyl (e.g., 4-phenylphenyl). The term "arenediyl" refers to a divalent aromatic group with two aromatic carbon atoms as points of attachment, said carbon atoms forming part of one or more six-membered aromatic ring structures, each with six ring atoms that are all carbon, and wherein the divalent group consists of no atoms other than carbon and hydrogen. As used herein, the term arenediyl does not preclude the presence of one or more alkyl groups (carbon number limitation permitting) attached to the first aromatic ring or any additional aromatic ring present. If more than one ring is present, the rings may be fused or unfused. Unfused rings are connected with a covalent bond. Non-limiting examples of arenediyl groups include:

An "arene" refers to the class of compounds having the formula H—R, wherein R is aryl as that term is defined above. Benzene and toluene are non-limiting examples of arenes.

The term "aralkyl" refers to the monovalent group -alkanediyl-aryl, in which the terms alkanediyl and aryl are each used in a manner consistent with the definitions provided above. Non-limiting examples are: phenylmethyl (benzyl, Bn) and 2-phenyl-ethyl.

The term "heteroaryl" refers to a monovalent aromatic group with an aromatic carbon atom or nitrogen atom as the point of attachment, said carbon atom or nitrogen atom forming part of one or more aromatic ring structures, each with three to eight ring atoms, wherein at least one of the ring atoms of the aromatic ring structure(s) is nitrogen, oxygen or sulfur, and wherein the heteroaryl group consists of no atoms other than carbon, hydrogen, aromatic nitrogen, aromatic oxygen and aromatic sulfur. If more than one ring is present, the rings are fused; however, the term heteroaryl does not preclude the presence of one or more alkyl or aryl groups (carbon number limitation permitting) attached to one or more ring atoms. Non-limiting examples of heteroaryl groups include benzoxazolyl, benzimidazolyl, furanyl, imidazolyl (Im), indolyl, indazolyl (Im), isoxazolyl, methylpyridinyl, oxazolyl, oxadiazolyl, phenylpyridinyl, pyridinyl (pyridyl), pyrrolyl, pyrimidinyl, pyrazinyl, quinolyl, quinazolyl, quinoxalinyl, triazinyl, tetrazolyl, thiazolyl, thienyl, and triazolyl. The term "N-heteroaryl" refers to a heteroaryl group with a nitrogen atom as the point of attachment. A "heteroarene" refers to the class of compounds having the formula H—R, wherein R is heteroaryl. Pyridine and quinoline are non-limiting examples of heteroarenes.

The term "heteroaralkyl" refers to the monovalent group -alkanediyl-heteroaryl, in which the terms alkanediyl and heteroaryl are each used in a manner consistent with the definitions provided above. Non-limiting examples are: pyridinylmethyl and 2-quinolinyl-ethyl.

The term "acyl" refers to the group —C(O)R, in which R is a hydrogen, alkyl, cycloalkyl, or aryl as those terms are defined above. The groups, —CHO, —C(O)CH₃ (acetyl, Ac), —C(O)CH₂CH₃, —C(O)CH(CH₃)₂, —C(O)CH(CH₂)₂, —C(O)C₆H₅, and —C(O)C₆H₄CH₃ are non-limiting examples of acyl groups. A "thioacyl" is defined in an analogous manner, except that the oxygen atom of the group —C(O)R has been replaced with a sulfur atom, —C(S)R. The term "aldehyde" corresponds to an alkyl group, as defined above, attached to a —CHO group.

The term "cycloalkyl" refers to a monovalent saturated aliphatic group with a carbon atom as the point of attachment, said carbon atom forming part of one or more non-aromatic ring structures, no carbon-carbon double or triple bonds, and no atoms other than carbon and hydrogen. Non-limiting examples include: —CH(CH₂)₂ (cyclopropyl), cyclobutyl, cyclopentyl, or cyclohexyl (Cy). As used herein, the term does not preclude the presence of one or more alkyl groups (carbon number limitation permitting) attached to a carbon atom of the non-aromatic ring structure. The term "cycloalkanediyl" refers to a divalent saturated aliphatic group with two carbon atoms as points of attachment, no carbon-carbon double or triple bonds, and no atoms other than carbon and hydrogen. The group is a non-limiting example of cycloalkanediyl group. A "cycloalkane" refers to the class of compounds having the formula H—R, wherein R is cycloalkyl as this term is defined above.

The term "heterocycloalkyl" refers to a monovalent non-aromatic group with a carbon atom or nitrogen atom as the point of attachment, said carbon atom or nitrogen atom forming part of one or more non-aromatic ring structures, each with three to eight ring atoms, wherein at least one of the ring atoms of the non-aromatic ring structure(s) is nitrogen, oxygen or sulfur, and wherein the heterocycloalkyl group consists of no atoms other than carbon, hydrogen, nitrogen, oxygen and sulfur. If more than one ring is present, the rings are fused. As used herein, the term does not preclude the presence of one or more alkyl groups (carbon number limitation permitting) attached to one or more ring atoms. Also, the term does not preclude the presence of one or more double bonds in the ring or ring system, provided that the resulting group remains non-aromatic. Non-limiting examples of heterocycloalkyl groups include aziridinyl, azetidinyl, pyrrolidinyl, piperidinyl, piperazinyl, morpholinyl, thiomorpholinyl, tetrahydrofuranyl, tetrahydrothiofuranyl, tetrahydropyranyl, pyranyl, oxiranyl, and oxetanyl. The term "N-heterocycloalkyl" refers to a heterocycloalkyl group with a nitrogen atom as the point of attachment. N-pyrrolidinyl is an example of such a group. The term "heterocycloalkanediyl" refers to a divalent cyclic group, with two carbon atoms, two nitrogen atoms, or one carbon atom and one nitrogen atom as the two points of attachment, said atoms forming part of one or more ring structure(s) wherein at least one of the ring atoms of the non-aromatic ring structure(s) is nitrogen, oxygen or sulfur, and wherein the divalent group consists of no atoms other than carbon, hydrogen, nitrogen, oxygen and sulfur. If more than one ring is present, the rings are fused. As used herein, the term heterocycloalkanediyl does not preclude the presence of one or more alkyl groups (carbon number limitation permitting) attached to one or more ring atoms. Also, the term does not preclude the presence of one or more double bonds in the ring or ring system, provided that the resulting group remains non-aromatic. Non-limiting examples of heterocycloalkanediyl groups include:

The term "alkoxy" refers to the group —OR, in which R is an alkyl, as that term is defined above. Non-limiting examples include: —OCH₃ (methoxy), —OCH₂CH₃ (ethoxy), —OCH₂CH₂CH₃, —OCH(CH₃)₂ (isopropoxy), or —OC(CH₃)₃ (tert-butoxy). The terms "cycloalkoxy", "alkenyloxy", "alkynyloxy", "aryloxy", "aralkoxy", "heteroaryloxy", "heterocycloalkoxy", and "acyloxy", when used without the "substituted" modifier, refers to groups, defined as —OR, in which R is cycloalkyl, alkenyl, alkynyl, aryl, aralkyl, heteroaryl, heterocycloalkyl, and acyl, respectively. The term "alkylthio" and "acylthio" refers to the group —SR, in which R is an alkyl and acyl, respectively. The term "alcohol" corresponds to an alkane, as defined above, wherein at least one of the hydrogen atoms has been replaced with a hydroxy group. The term "ether" corresponds to an alkane, as defined above, wherein at least one of the hydrogen atoms has been replaced with an alkoxy group.

When a chemical group is used with the "substituted" modifier, one or more hydrogen atom has been replaced, independently at each instance, by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$ OH, or —S(O)$_2$NH$_2$. For example, the following groups are non-limiting examples of substituted alkyl groups: —CH$_2$OH, —CH$_2$Cl, —CF$_3$, —CH$_2$CN, —CH$_2$C(O)OH, —CH$_2$C(O)OCH$_3$, —CH$_2$C(O)NH$_2$, —CH$_2$C(O)CH$_3$, —CH$_2$OCH$_3$, —CH$_2$OC(O)CH$_3$, —CH$_2$NH$_2$, —CH$_2$N (CH$_3$)$_2$, and —CH$_2$CH$_2$Cl. The term "haloalkyl" is a subset of substituted alkyl, in which the hydrogen atom replacement is limited to halo (i.e. —F, —Cl, —Br, or —I) such that no other atoms aside from carbon, hydrogen and halogen are present. The group, —CH$_2$Cl is a non-limiting example of a haloalkyl. The term "fluoroalkyl" is a subset of substituted alkyl, in which the hydrogen atom replacement is limited to fluoro such that no other atoms aside from carbon, hydrogen and fluorine are present. The groups —CH$_2$F, —CF$_3$, and —CH$_2$CF$_3$ are non-limiting examples of fluoroalkyl groups. Non-limiting examples of substituted aralkyls are: (3-chlorophenyl)-methyl, and 2-chloro-2-phenyl-eth-1-yl. The groups, —C(O)CH$_2$CF$_3$, —CO$_2$H (carboxyl), —CO$_2$CH$_3$ (methylcarboxyl), —CO$_2$CH$_2$CH$_3$, —C(O)NH$_2$ (carbamoyl), and —CON(CH$_3$)$_2$, are non-limiting examples of substituted acyl groups. The groups —NHC(O)OCH$_3$ and —NHC(O)NHCH$_3$ are non-limiting examples of substituted amido groups.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects or patients.

An "active ingredient" (AI) or active pharmaceutical ingredient (API) (also referred to as an active compound, active substance, active agent, pharmaceutical agent, agent, biologically active molecule, or a therapeutic compound) is the ingredient in a pharmaceutical drug that is biologically active.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result. "Effective amount," "Therapeutically effective amount" or "pharmaceutically effective amount" when used in the context of treating a patient or subject with a compound means that amount of the compound which, when administered to a subject or patient, is sufficient to effect such treatment or prevention of the disease as those terms are defined below.

An "excipient" is a pharmaceutically acceptable substance formulated along with the active ingredient(s) of a medication, pharmaceutical composition, formulation, or drug delivery system. Excipients may be used, for example, to stabilize the composition, to bulk up the composition (thus often referred to as "bulking agents," "fillers," or "diluents" when used for this purpose), or to confer a therapeutic enhancement on the active ingredient in the final dosage form, such as facilitating drug absorption, reducing viscosity, or enhancing solubility. Excipients include pharmaceutically acceptable versions of antiadherents, binders, coatings, colors, disintegrants, flavors, glidants, lubricants, preservatives, sorbents, sweeteners, and vehicles. The main excipient that serves as a medium for conveying the active ingredient is usually called the vehicle. Excipients may also be used in the manufacturing process, for example, to aid in the handling of the active substance, such as by facilitating powder flowability or non-stick properties, in addition to aiding in vitro stability such as prevention of denaturation or aggregation over the expected shelf life. The suitability of an excipient will typically vary depending on the route of administration, the dosage form, the active ingredient, as well as other factors.

The term "hydrate" when used as a modifier to a compound means that the compound has less than one (e.g., hemihydrate), one (e.g., monohydrate), or more than one (e.g., dihydrate) water molecules associated with each compound molecule, such as in solid forms of the compound.

As used herein, the term "IC$_{50}$" refers to an inhibitory dose which is 50% of the maximum response obtained. This quantitative measure indicates how much of a particular drug or other substance (inhibitor) is needed to inhibit a given biological, biochemical or chemical process (or component of a process, i.e. an enzyme, cell, cell receptor or microorganism) by half.

An "isomer" of a first compound is a separate compound in which each molecule contains the same constituent atoms as the first compound, but where the configuration of those atoms in three dimensions differs.

As used herein, the term "patient" or "subject" refers to a living mammalian organism, such as a human, monkey, cow, sheep, goat, dog, cat, mouse, rat, guinea pig, or transgenic species thereof. In certain embodiments, the patient or subject is a primate. Non-limiting examples of human patients are adults, juveniles, infants and fetuses.

As generally used herein "pharmaceutically acceptable" refers to those compounds, materials, compositions, and/or dosage forms which are, within the scope of sound medical judgment, suitable for use in contact with the tissues, organs, and/or bodily fluids of human beings and animals without excessive toxicity, irritation, allergic response, or other problems or complications commensurate with a reasonable benefit/risk ratio.

"Pharmaceutically acceptable salts" means salts of compounds disclosed herein which are pharmaceutically acceptable, as defined above, and which possess the desired pharmacological activity. Such salts include acid addition salts formed with inorganic acids such as hydrochloric acid, hydrobromic acid, sulfuric acid, nitric acid, phosphoric acid, and the like; or with organic acids such as 1,2-ethanedisulfonic acid, 2-hydroxyethanesulfonic acid, 2-naphthalenesulfonic acid, 3-phenylpropionic acid, 4,4'-methylenebis(3-hydroxy-2-ene-1-carboxylic acid), 4-methylbicyclo[2.2.2] oct-2-ene-1-carboxylic acid, acetic acid, aliphatic mono- and dicarboxylic acids, aliphatic sulfuric acids, aromatic sulfuric acids, benzenesulfonic acid, benzoic acid, camphorsulfonic acid, carbonic acid, cinnamic acid, citric acid, cyclopentanepropionic acid, ethanesulfonic acid, fumaric acid, glucoheptonic acid, gluconic acid, glutamic acid, glycolic acid, heptanoic acid, hexanoic acid, hydroxynaphthoic acid, lactic acid, laurylsulfuric acid, maleic acid, malic acid, malonic acid, mandelic acid, methanesulfonic acid, muconic acid, o-(4-hydroxybenzoyl)benzoic acid, oxalic acid, p-chlorobenzenesulfonic acid, phenyl-substituted alkanoic acids, propionic acid, p-toluenesulfonic acid, pyruvic acid, salicylic acid, stearic acid, succinic acid, tartaric acid, tertiarybutylacetic acid, trimethylacetic acid, and the like. Pharmaceutically acceptable salts also include base addition salts which may be formed when acidic protons present are capable of reacting with inorganic or organic bases. Acceptable inorganic bases include sodium hydroxide, sodium carbonate, potassium hydroxide, aluminum hydroxide and calcium hydroxide. Acceptable organic bases include ethanolamine, diethanolamine, triethanolamine, tromethamine, N-methylglucamine and the like. It should be recognized that the particular anion or cation forming a part of any salt of this invention is not critical, so long as the salt, as a whole, is pharmacologically acceptable. Additional examples of pharmaceutically acceptable salts and their methods of preparation and use are presented in *Handbook of Pharmaceutical Salts: Properties, and Use* (P. H. Stahl & C. G. Wermuth eds., Verlag Helvetica Chimica Acta, 2002).

A "pharmaceutically acceptable carrier," "drug carrier," or simply "carrier" is a pharmaceutically acceptable substance formulated along with the active ingredient medication that is involved in carrying, delivering and/or transporting a chemical agent. Drug carriers may be used to improve the delivery and the effectiveness of drugs, including for example, controlled-release technology to modulate drug bioavailability, decrease drug metabolism, and/or reduce drug toxicity. Some drug carriers may increase the effectiveness of drug delivery to the specific target sites. Examples of carriers include: liposomes, microspheres (e.g., made of poly(lactic-co-glycolic) acid), albumin microspheres, synthetic polymers, nanofibers, protein-DNA complexes, protein conjugates, erythrocytes, virosomes, and dendrimers.

A "pharmaceutical drug" (also referred to as a pharmaceutical, pharmaceutical preparation, pharmaceutical composition, pharmaceutical formulation, pharmaceutical product, medicinal product, medicine, medication, medicament, or simply a drug, agent, or preparation) is a composition used to diagnose, cure, treat, or prevent disease, which comprises an active pharmaceutical ingredient (API) (defined above) and optionally contains one or more inactive ingredients, which are also referred to as excipients (defined above).

"Prevention" or "preventing" includes: (1) inhibiting the onset of a disease in a subject or patient which may be at risk and/or predisposed to the disease but does not yet experience or display any or all of the pathology or symptomatology of the disease, and/or (2) slowing the onset of the pathology or symptomatology of a disease in a subject or patient which may be at risk and/or predisposed to the disease but does not yet experience or display any or all of the pathology or symptomatology of the disease.

"Prodrug" means a compound that is convertible in vivo metabolically into an inhibitor according to the present invention. The prodrug itself may or may not also have activity with respect to a given target protein. For example, a compound comprising a hydroxy group may be administered as an ester that is converted by hydrolysis in vivo to the hydroxy compound. Non-limiting examples of suitable esters that may be converted in vivo into hydroxy compounds include acetates, citrates, lactates, phosphates, tartrates, malonates, oxalates, salicylates, propionates, succinates, fumarates, maleates, methylene-bis-β-hydroxynaphthoate, gentisates, isethionates, di-p-toluoyltartrates, methanesulfonates, ethanesulfonates, benzenesulfonates, p-toluenesulfonates, cyclohexylsulfamates, quinates, and esters of amino acids. Similarly, a compound comprising an amine group may be administered as an amide that is converted by hydrolysis in vivo to the amine compound.

A "stereoisomer" or "optical isomer" is an isomer of a given compound in which the same atoms are bonded to the same other atoms, but where the configuration of those atoms in three dimensions differs. "Enantiomers" are stereoisomers of a given compound that are mirror images of each other, like left and right hands. "Diastereomers" are stereoisomers of a given compound that are not enantiomers. Chiral molecules contain a chiral center, also referred to as a stereocenter or stereogenic center, which is any point, though not necessarily an atom, in a molecule bearing groups such that an interchanging of any two groups leads to a stereoisomer. In organic compounds, the chiral center is typically a carbon, phosphorus or sulfur atom, though it is also possible for other atoms to be stereocenters in organic and inorganic compounds. A molecule can have multiple stereocenters, giving it many stereoisomers. In compounds whose stereoisomerism is due to tetrahedral stereogenic centers (e.g., tetrahedral carbon), the total number of hypothetically possible stereoisomers will not exceed $2^n$, where n is the number of tetrahedral stereocenters. Molecules with symmetry frequently have fewer than the maximum possible number of stereoisomers. A 50:50 mixture of enantiomers is referred to as a racemic mixture. Alternatively, a mixture of enantiomers can be enantiomerically enriched so that one enantiomer is present in an amount greater than 50%. Typically, enantiomers and/or diastereomers can be resolved or separated using techniques known in the art. It is contemplated that that for any stereocenter or axis of chirality for which stereochemistry has not been defined, that stereocenter or axis of chirality can be present in its R form, S form, or as a mixture of the R and S forms, including racemic and non-racemic mixtures. As used herein, the phrase "substantially free from other stereoisomers" means that the composition contains ≤15%, more preferably ≤10%, even more preferably ≤5%, or most preferably ≤1% of another stereoisomer(s).

"Treatment" or "treating" includes (1) inhibiting a disease in a subject or patient experiencing or displaying the pathology or symptomatology of the disease (e.g., arresting further development of the pathology and/or symptomatology), (2) ameliorating a disease in a subject or patient that is experiencing or displaying the pathology or symptomatology of the disease (e.g., reversing the pathology and/or symptomatology), and/or (3) effecting any measurable decrease in a disease or symptom thereof in a subject or patient that is experiencing or displaying the pathology or symptomatology of the disease.

The term "unit dose" refers to a formulation of the compound or composition such that the formulation is prepared in a manner sufficient to provide a single therapeutically effective dose of the active ingredient to a patient in a single administration. Such unit dose formulations that may be used include but are not limited to a single tablet, capsule, or other oral formulations, or a single vial with a syringeable liquid or other injectable formulations.

The above definitions supersede any conflicting definition in any reference that is incorporated by reference herein. The fact that certain terms are defined, however, should not be considered as indicative that any term that is undefined is indefinite. Rather, all terms used are believed to describe the invention in terms such that one of ordinary skill can appreciate the scope and practice the present invention.

VI. Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Design and Validation of Mixed Pro-Drugs Based on HEX

Figures 7A, 7B:
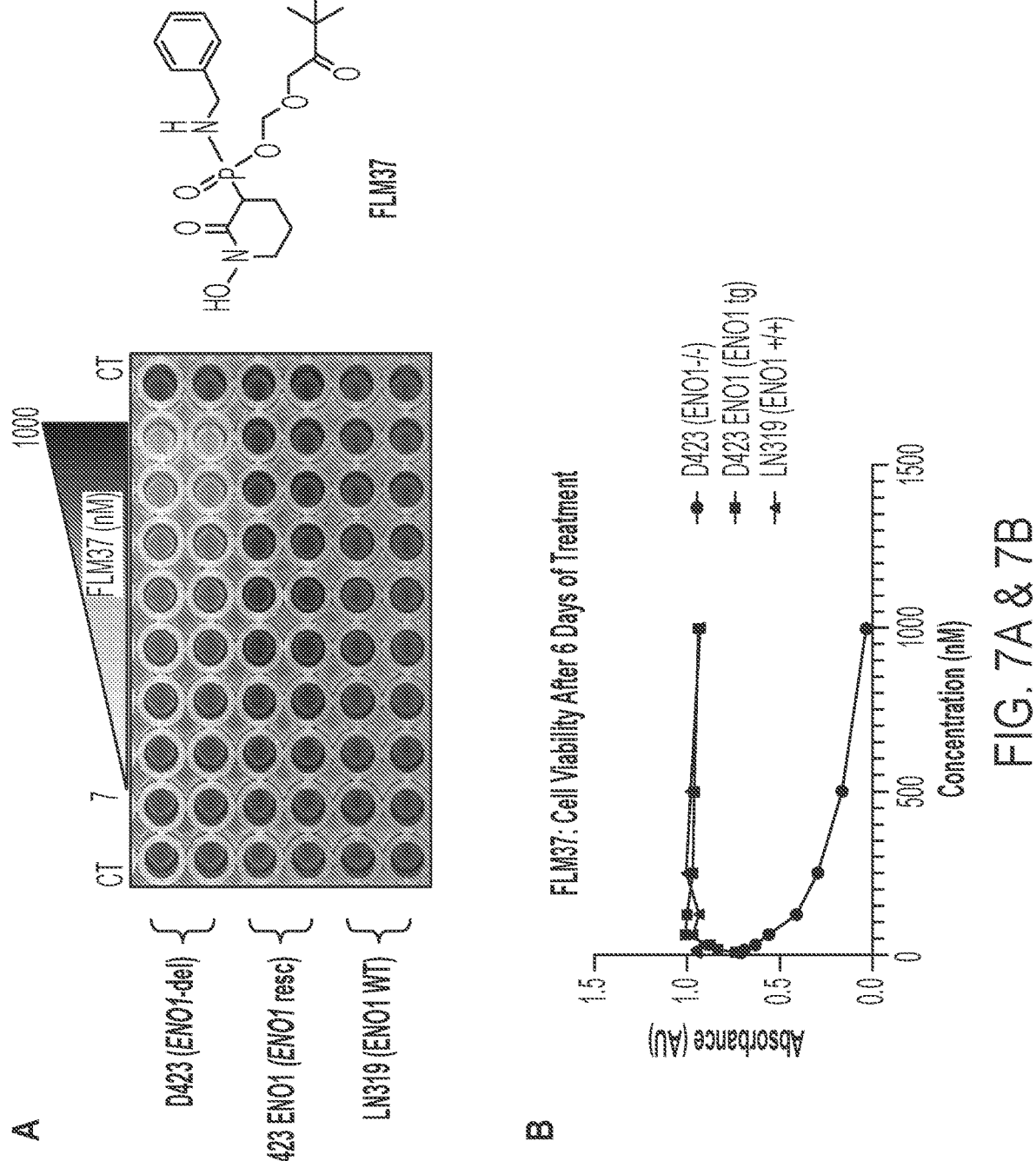
FIGS. 7A & 7B show the potency of FLM37 suggests the viability of using benzylamine as a second leave group. Cells were treated FLM37 at a starting concentration of 1 μM for 6 days then stained with crystal violet. Absorbance was measured at 590 nm, with high absorbance corresponding to high cell density.

Validation of benzylamine as a second leave group. The present disclosure illustrates the viability of benzylamine (and other benzylic or aliphatic amines) as enhanced pro-drug moiety to serve as the second leave group through cleavage by phosphoramidase (see also the detailed description). As an initial test for cleavage of benzylamine, FLM37 was synthesized (Scheme 1). It was found that FLM37 exhibited potent killing in vitro, suggesting that the benzylamine could in fact be cleaved in cells (FIG. 7).

Scheme 1. Synthetic route to FLM37.

-continued

FLM37

To assure that benzylamine-protected HEX (FLM38) was not inhibiting Enolase directly, an in vitro spectrophotometric assay was performed to examine Enolase catalytic activity through conversion of 2-phoshpoglycerate (2-PG) to phosphoenolpyruvate (PEP). Without wishing to be bound by theory, if FLM38 were to inhibit Enolase directly, a dose-dependent decrease in absorbance at 240 nm would be observed, corresponding to decreased production of PEP. Serial dilutions of FLM38, beginning at 100 PM, did not show a dose-dependent decrease in absorbance at 240 nm, supporting the conclusion that FLM38 does not inhibit Enolase directly. The possibility that the benzylamine moiety could undergo non-enzymatic hydrolysis in aqueous conditions was also examined. This study was performed by measuring the pH-dependence of compound degradation in phosphate buffered $D_2O$ via NMR over 3 days. It was found that FLM38 remained intact at pH 3, 7, and 8.82 throughout the duration of the experiment, which strongly supports the model of phosphoramidase cleavage.

Nitroheterocyclic phosphoramidates, thioester phosphoramidates, and cyanoethyl phosphoramidates are robust, non-carboxylesteraselabile first leave groups. The other free hydroxyl group on FLM38 was protected with a variety of pro-drug moieties from the nitroheterocycle and thioester classes. Extensive in vitro testing revealed that a pivalic thioester (VCY13), a nitrofuran (VCY15; FIG. 8), a nitrothiophene (VCY16), or a nitroimidazole (VCY 17, FIG. 11) moiety demonstrated significant enhancement. Given the high cellular carboxylesterase activity, initial observations upon testing these compounds in culture pointed to non-carboxylesterase mediated activation, as these compounds required more time for their potency to be observed. Structurally, VCY15, VCY16, and VCY17 do not resemble substrates for carboxylesterase. However, the thioester on VCY 13 may be a moiety available for carboxylesterase cleavage. The hypothetical possibility that the thioester could be cleaved by carboxylesterase could be overlooked, so long as it is not preferentially cleaved, which would result in POMHEX-like degradation in plasma and extracellular fluids (FIGS. 1-3).

Figure 9:
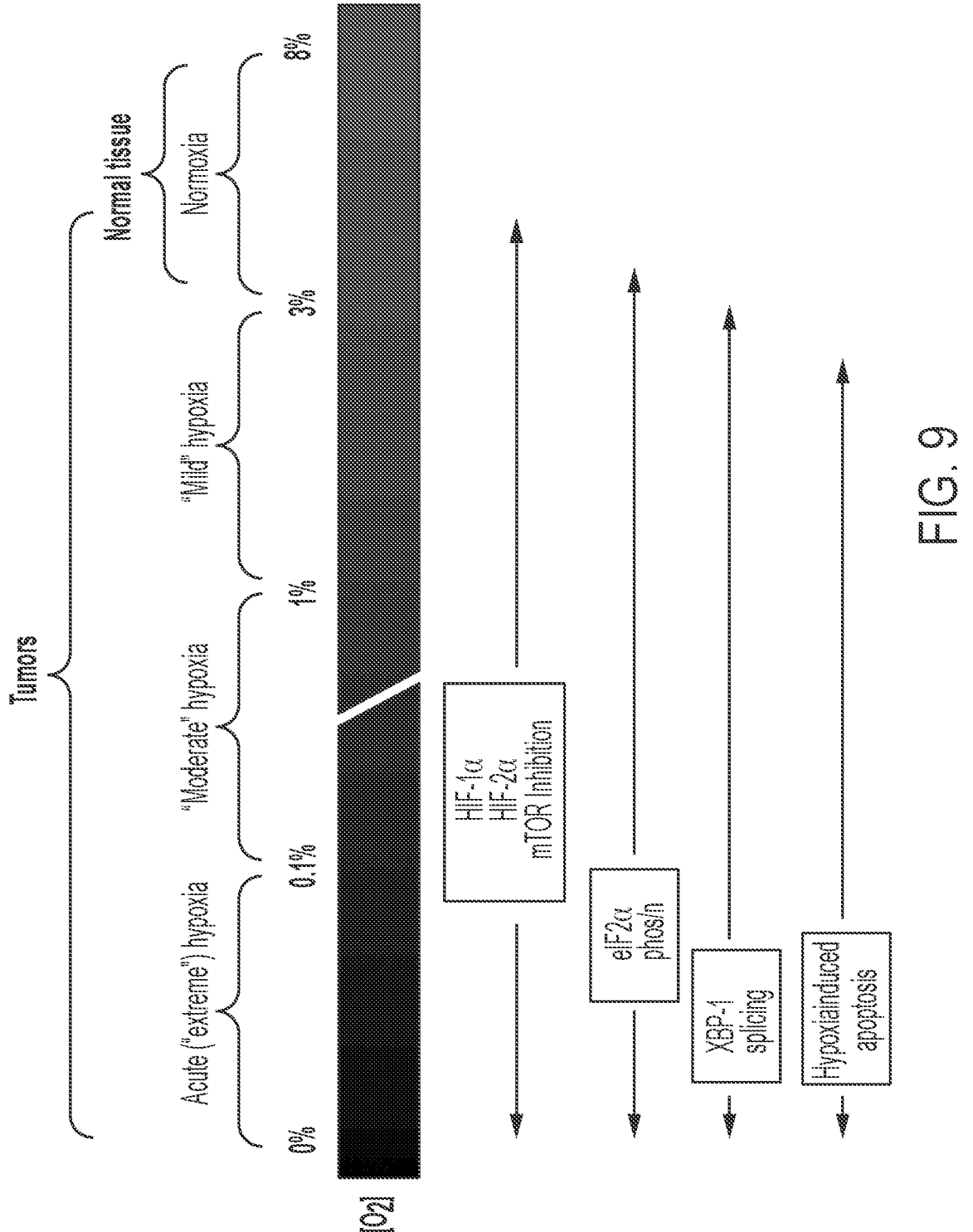
FIG. 9 shows oxygen tension gradients in tumors and normal tissues (adapted from Koumenis and Wouters, 2006).
Figure 10:
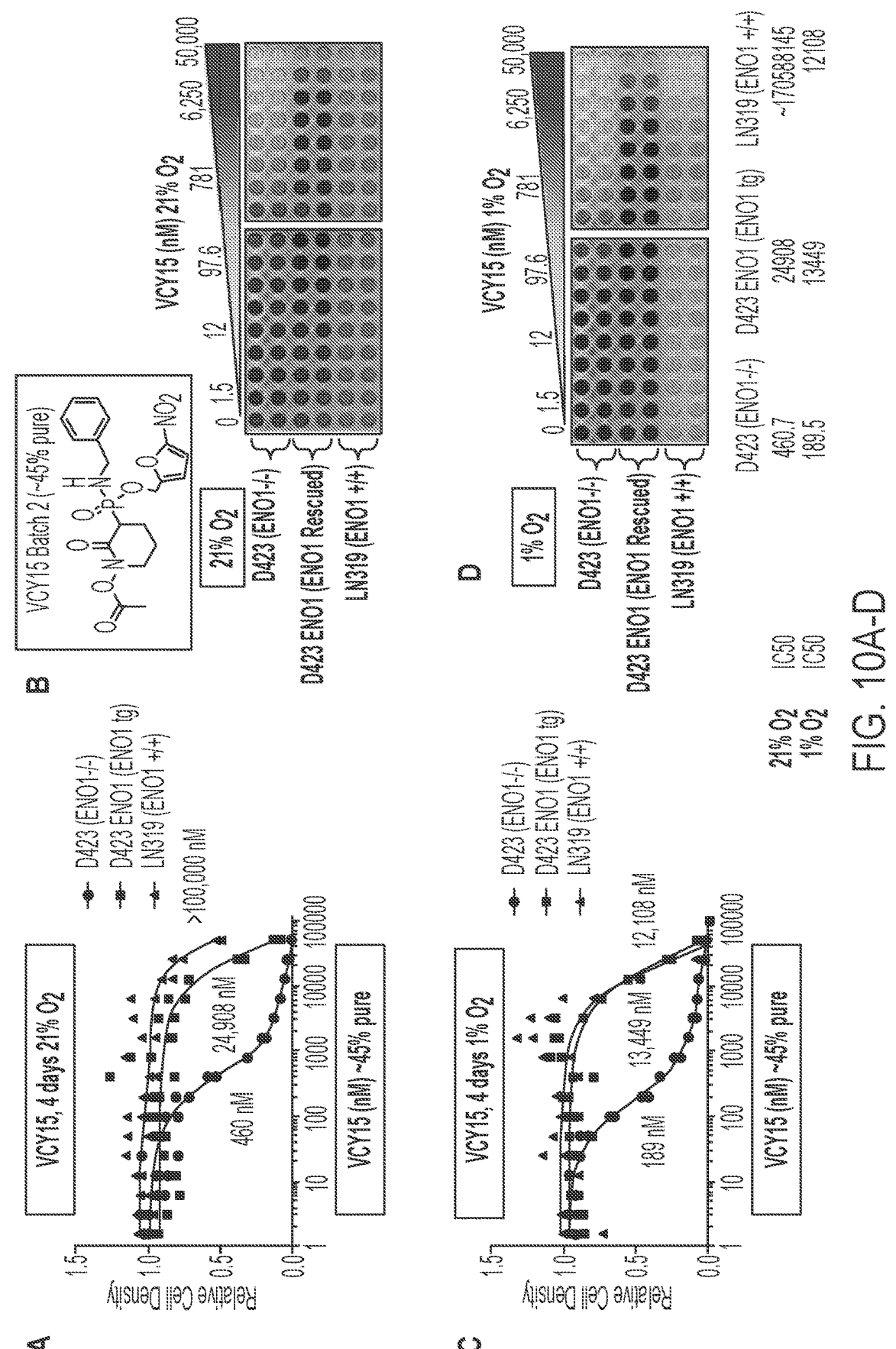
FIGS. 10A-10D show VCY15 exhibits greater potency against glioma cells under mild hypoxia. Glioma cells were treated with VCY15 for 4 days under normoxia (21% $O_2$) and hypoxia (1% $O_2$). Because the purity of VCY15 was ~45%, it is predicted that the actual potency of the compound is at least 2 times greater than the numbers displayed here; indeed, with HPLC pure VCY15, an $IC_{50}$ of 230 nM was obtained (see FIG. 8). Irrespective of this artifact, the purpose of this experiment was to examine the effect on $O_2$ tension on nitroreductase-labile pro-drug potency. In contrast to POMHEX, for which potency decreases ~2.5-fold under 1% $O_2$, the potency of VCY15 increases 2.5-fold. This is consistent with the hypothesis that bioactivation of nitrofuran-containing pro-drugs increases when $O_2$ tension is lowered, hastening its removal towards release of the active Enolase inhibitor HEX. Taking into account the HIF-1α/hypoxia-driven increase in ENO2 expression, the increased potency of VCY15 under hypoxia suggests a ~5-fold difference in bioactivation from 21% to 1% $O_2$.
Figure 11:
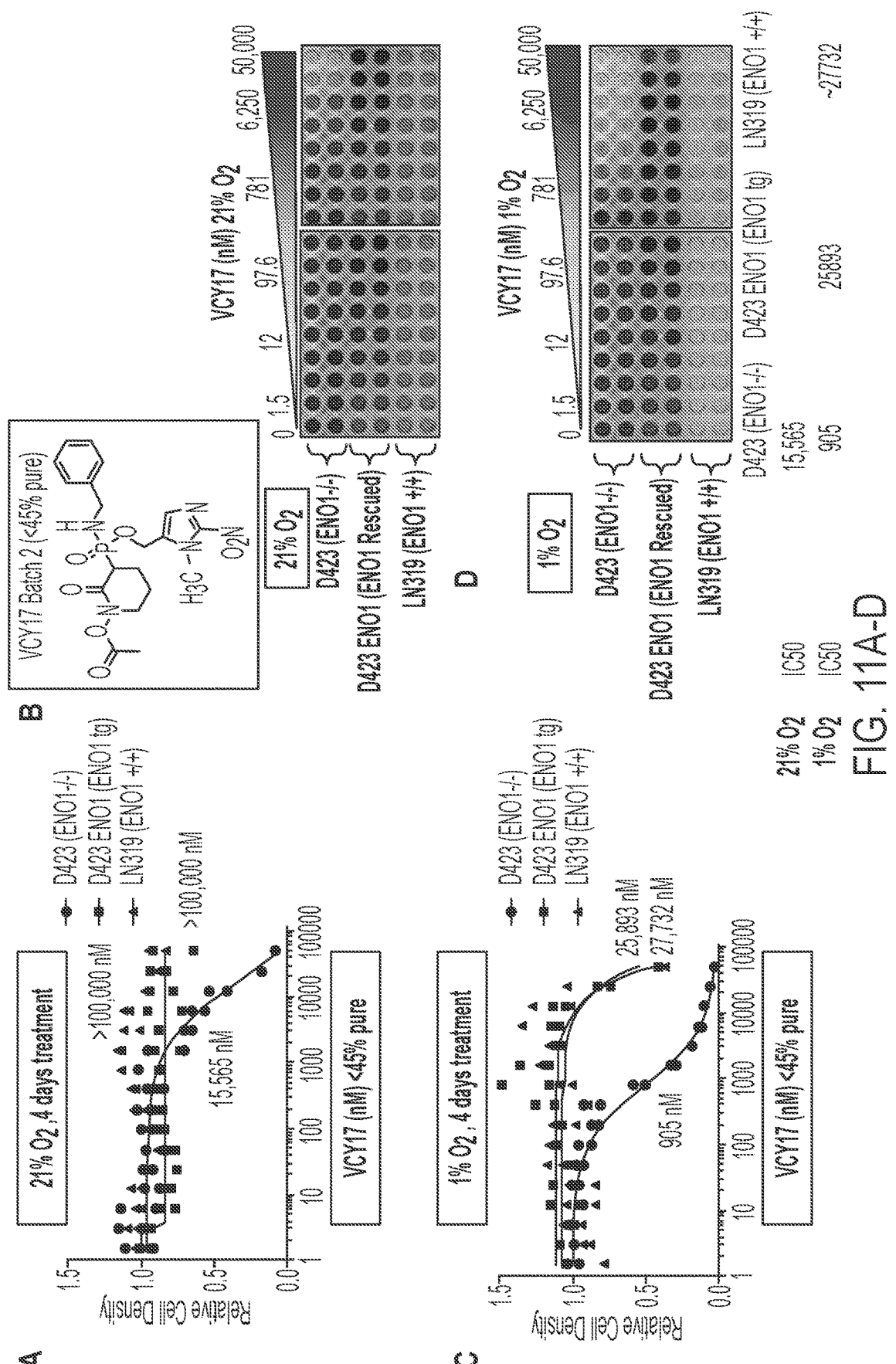
FIGS. 11A-11D show VCY17 is more potent under mild hypoxic conditions. Glioma cells were treated with VCY17 for 4 days under normoxia (21% $O_2$) and hypoxia (1% $O_2$). Again, because the purity of VCY17 was <45%, it is predicted that the actual potency of the compound is at least 2 times greater than the numbers displayed here. Irrespective of this artifact, the purpose of this experiment was to examine the effect on $O_2$ tension on nitroreductase-labile pro-drug potency. In contrast to POMHEX, for which potency decreases ~2.5-fold under 1% $O_2$, the potency of VCY15 increases >15-fold. This is consistent with the lower redox potential of the nitroimidazole in VCY17 (−390 mV) compared to the nitrofuran in VCY15 (−330 mV). If the HIF1α/hypoxia-driven increase in ENO2 expression is taken into account, the true increase in bioactivation of VCY17 from 21% to 1% $O_2$ there may be as much as a 50-fold difference in activation.
Figure 12:
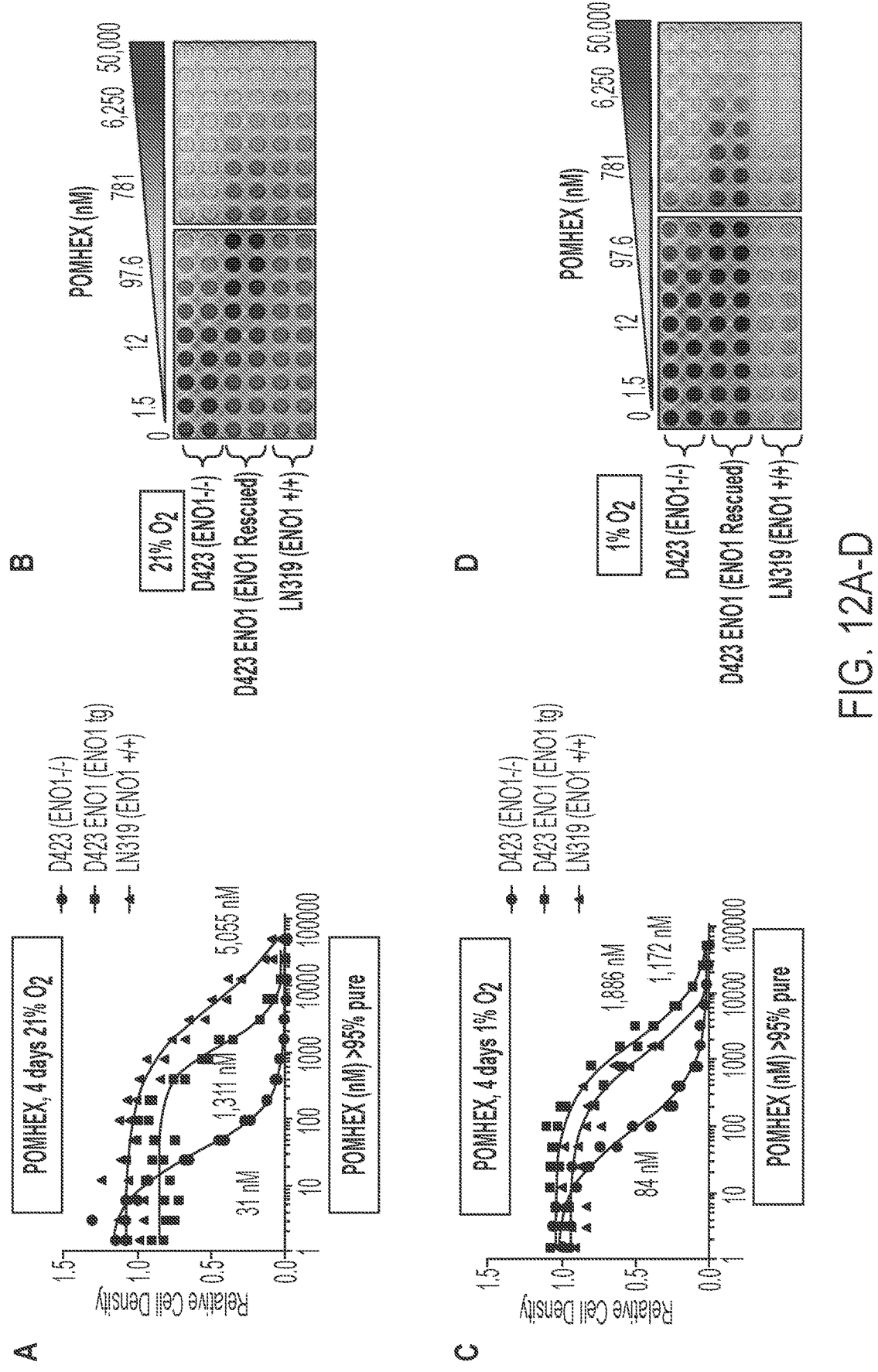
FIGS. 12A-12D show mild hypoxia reduces the sensitivity of ENO1-deleted glioma cells to the carboxylesterase-activated Enolase inhibitor pro-drug, POMHEX. Glioma cell lines were treated for 4 days with POMHEX purified by HPLC at the doses indicated either under normoxia (21% $O_2$) or mild hypoxia (1% $O_2$). Cell density was quantified by crystal violet. $IC_{50}$ values for ENO1-deleted (circles), ENO1-rescued (squares) and ENO1-intact (triangles) are pointed out (FIGS. 12A & 12C). The $IC_{50}$ of POMHEX for D423 ENO1-homozygously deleted glioma cells increased from 31 nM at normoxia to 84 nM under 1%02 hypoxia. Without wishing to be bound by any theory, the reason for this is that ENO2 is upregulated by HIF1α in a hypoxia dependent manner; the more ENO2 present in ENO1-homozygously deleted cells, the more Enolase inhibitor required to reach toxic threshold of glycolysis inhibition.
Figure 13:
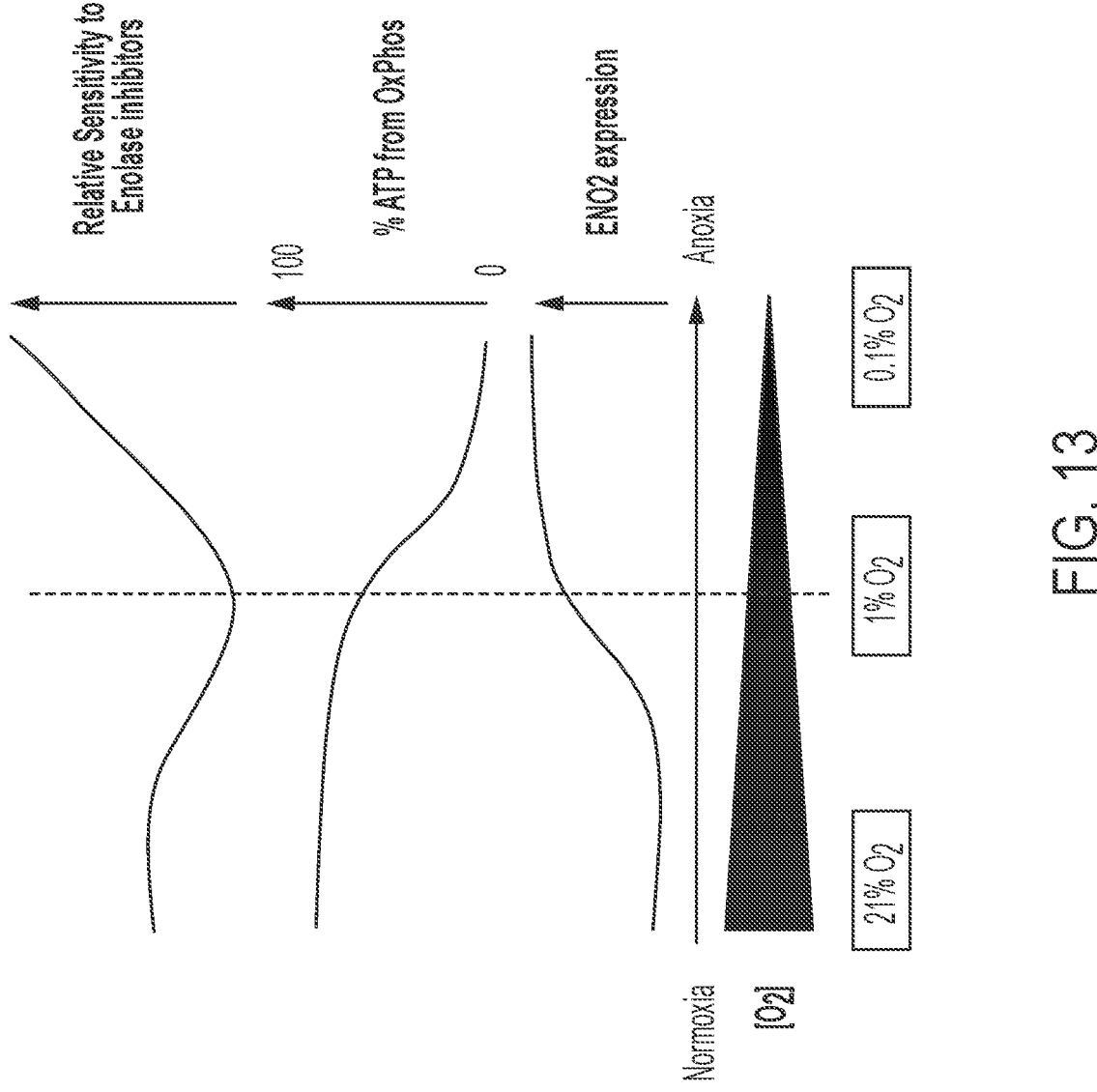
FIG. 13 shows sensitivity changes to Enolase inhibitors as a function of decreasing $O_2$ tension is a product of the opposing effects of ENO2-upregulation versus decreased ATP production by Oxidative Phosphorylation. As 02 tension decreases, the sensitivity to Enolase inhibitors increases due to a general shift in ATP production from oxidative phosphorylation (OxPhos) to glycolysis. In tandem, ENO2 activity is also upregulated due to its transcriptional dependence on HIF-1α, which is activated under mild hypoxia.
Figure 14:
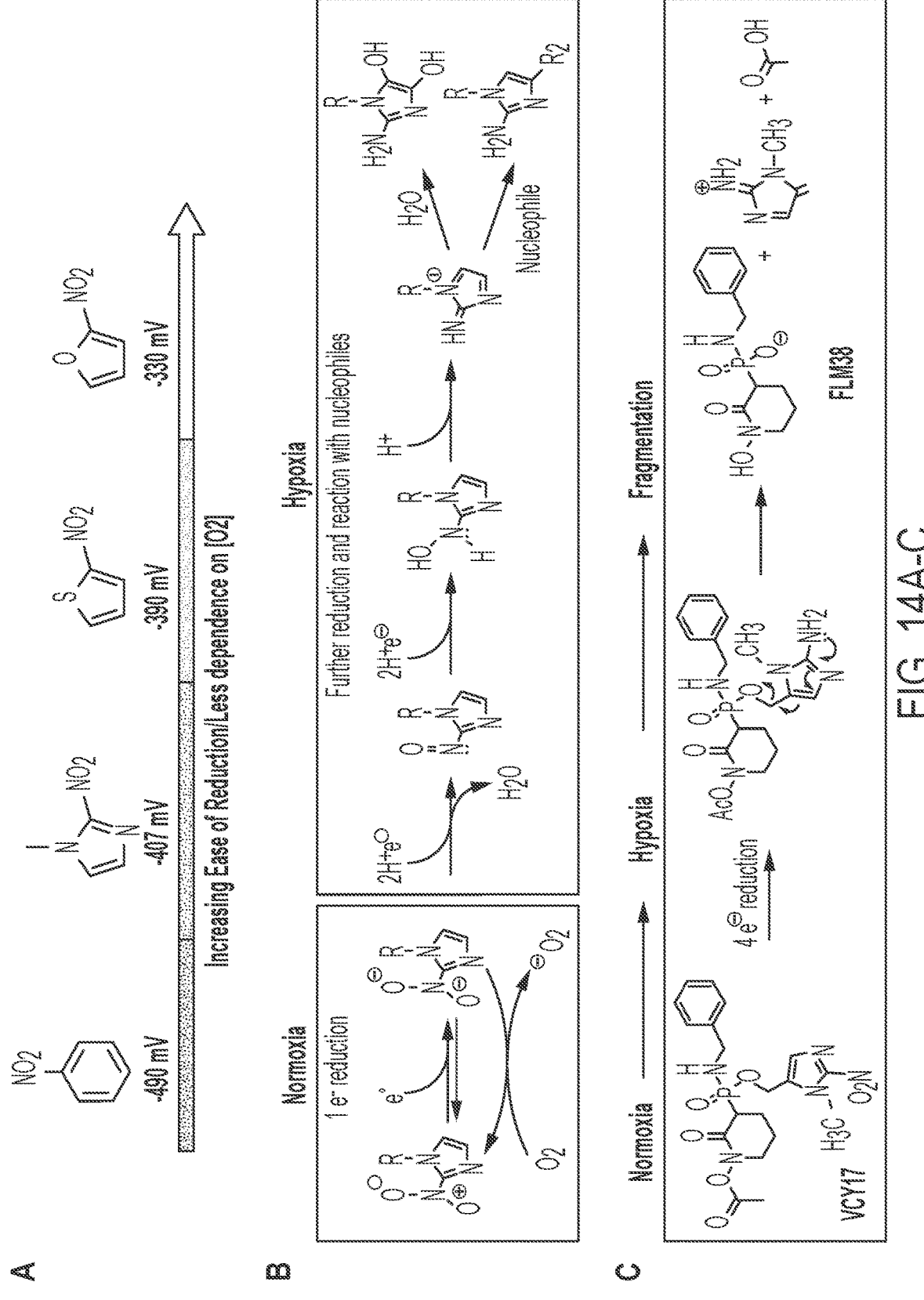
FIGS. 14A-14C show nitroheterocycles demonstrate a hypoxia-induced bioactivation mechanism.

In concurrence with the observation that tumors tend to be hypoxic (FIG. 9), comparison of the potencies of VCY15, VCY16, and VCY-17 under normoxic and hypoxic conditions was of interest (FIGS. 10 & 11). It was found that VCY-17 exhibited the most significant improvement under hypoxic (1% $O_2$) conditions. A greater than 15-fold enhancement of potency against ENO1-deleted glioma cells was observed under mild hypoxia compared to normoxia (FIG. 11). This sharply contrasts the results observed for the non-bioreducible substrates (POMHEX, FLM37, VCY13; FIG. 12), which can be explained by the HIF-1α dependency of ENO2 transcription (Olbryt et al., 2014). Under mild hypoxia ENO2 is upregulated, necessitating higher concentrations of drug for inhibition of glycolysis above the toxic threshold (FIG. 13). Consequently, the $IC_{50}$ for non-bioreducible pro-drugs increases. For instance, under normoxia, the $IC_{50}$ for POMHEX against D423 ENO1-homozygously deleted cells is ~40 nM. However, this value rises to ~90 nM under 1% $O_2$. For nitroreductase-containing pro-drugs, a general decrease in $IC_{50}$ is observed. The ease of nitroheterocycle bioactivation under these reducing conditions can overcome hypoxia-induced ENO2 upregulation, as epitomized by the stark differences in $IC_{50}$ for VCYl 7 under mild hypoxia. The lower $IC_{50}$ for VCY17 under hypoxic conditions can be explained by the lower redox potential of the nitroimidazole moiety relative to other nitroheterocycles (O'Connor et al., 2016; FIG. 14). These results support a nitroreductase-mediated mechanism of bioactivation and points to a significantly increased release of active compound in hypoxic and near-hypoxic tumors compared to normoxic normal tissues.

Figure 15:
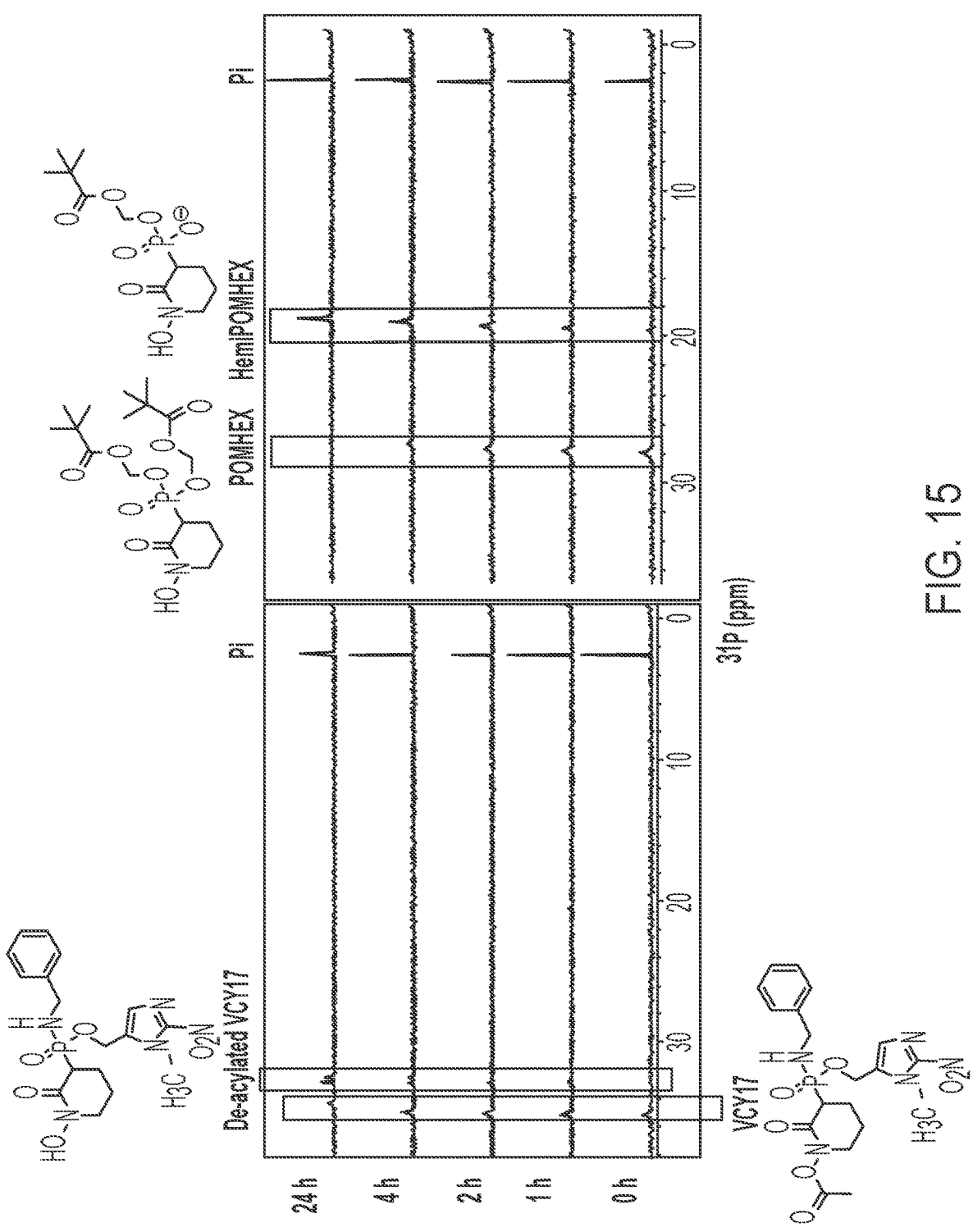
FIG. 15 shows non-carboxylesterase-labile pro-dugs such as VCY17 are stable in ex-vivo human plasma. VCY17 (left) and POMHEX (right) were prepared at 1.5 mM and added to human plasma in an NMR tube with 10% $D_2O$ for signal lock. VCY17 displays stability over the course of 24 h. As expected, emergence of the second peak after 1 h is due to hydrolysis of the acetyl-protected hydroxamate; the nitroimidazole moiety remains attached (mono-ester phosphonates always show $^{31}$P-chemical shifts <20 ppm); intact phosphoramidate mixed ester was verified by $^{31}$P-$^1$H HSQC showing resonance with protons at ~5 ppm (—$CH_2$—O—P) and 4 ppm (—$CH_2$—NH—P). Note that VCY17 and de-acetylated VCY17 can come out as doublets: this is because two chiral centers (Phosphorus and C1) yield cis/trans diasteromers. In contrast, carboxylesterase-labile POMHEX exhibits rapid hydrolysis to HemiPOMHEX in less than 1 h.
Figure 16:
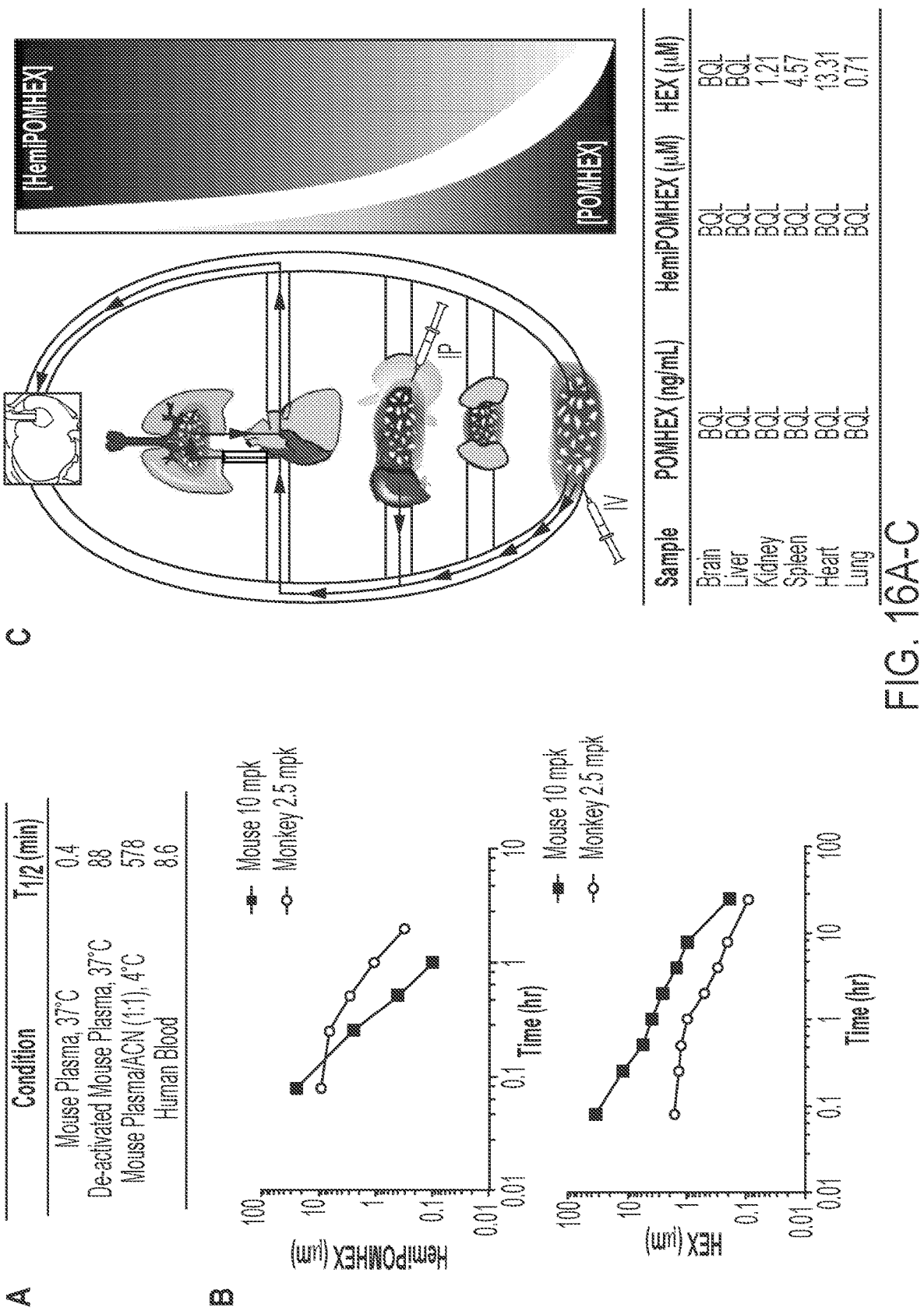
FIGS. 16A-16C show the ex-vivo half-life of POMHEX in biological fluids limits its clinical utility.

Finally, the robust plasma stability of these nitroreductase-containing pro-drugs potentiates a prolonged half-life in vivo. The requirement of NADH/NADPH, two molecules with an exclusively intracellular presence, obviates the possibility of any extracellular bioactivation. Congruent with this premise, it was found that VCY17 was stable in ex-vivo human plasma and PBS-containing culture media for more than 48 hours, which far exceeds the 2 h longevity of intact POMHEX (FIG. 15).

Aliphatic amines offer enhanced properties as second leave groups for cleavage via phosphoramidases. The hydrolytic activity of phosphoramidases is contingent upon the presence of a negative charge on the target substrate. Among the many benzylic amines that were tested for efficient hydrolysis, it was found that small, aliphatic amines serves as improved second pro-drug groups compared to the benzylic amines (see Table 2). For example, it was found that when cyclopropane methylamine is used as a second pro-drug group, the HEX pro-drug can exhibit 20-fold greater potency compared to the benzylamine protected molecule. It appears that there have been no reports that cyclopropane methylamine would exhibit enhanced properties as a pro-drug amine. The discovery that cyclopropane methylamine serves as an improved amine substrate for phosphoramidases in this context is thus unprecedented.

Figure 17:
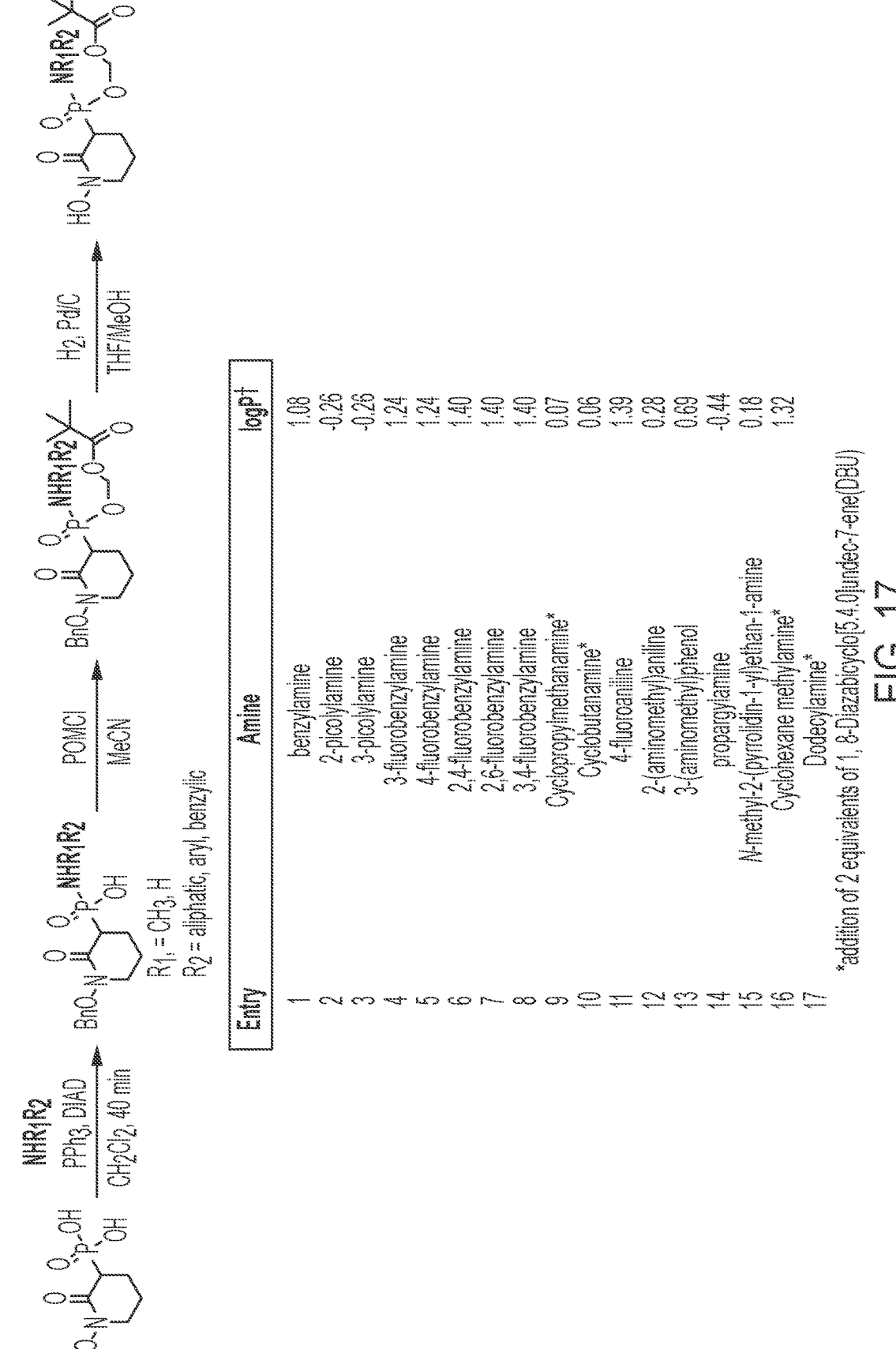
FIG. 17 shows structurally diverse amines screened as second pro-drug leave groups. Phosphonoamidate intermediates of BnHEX were generated under Mitsunobu conditions. To screen efficacy of the amine as a second pro-drug leave group, the BnHEX phosphonoamidate was first esterified with a known, esterase-labile pivaloyloxymethyl (POM) group and then de-benzylated to liberate the hydroxamate moiety.
Figures 18A, 18B:
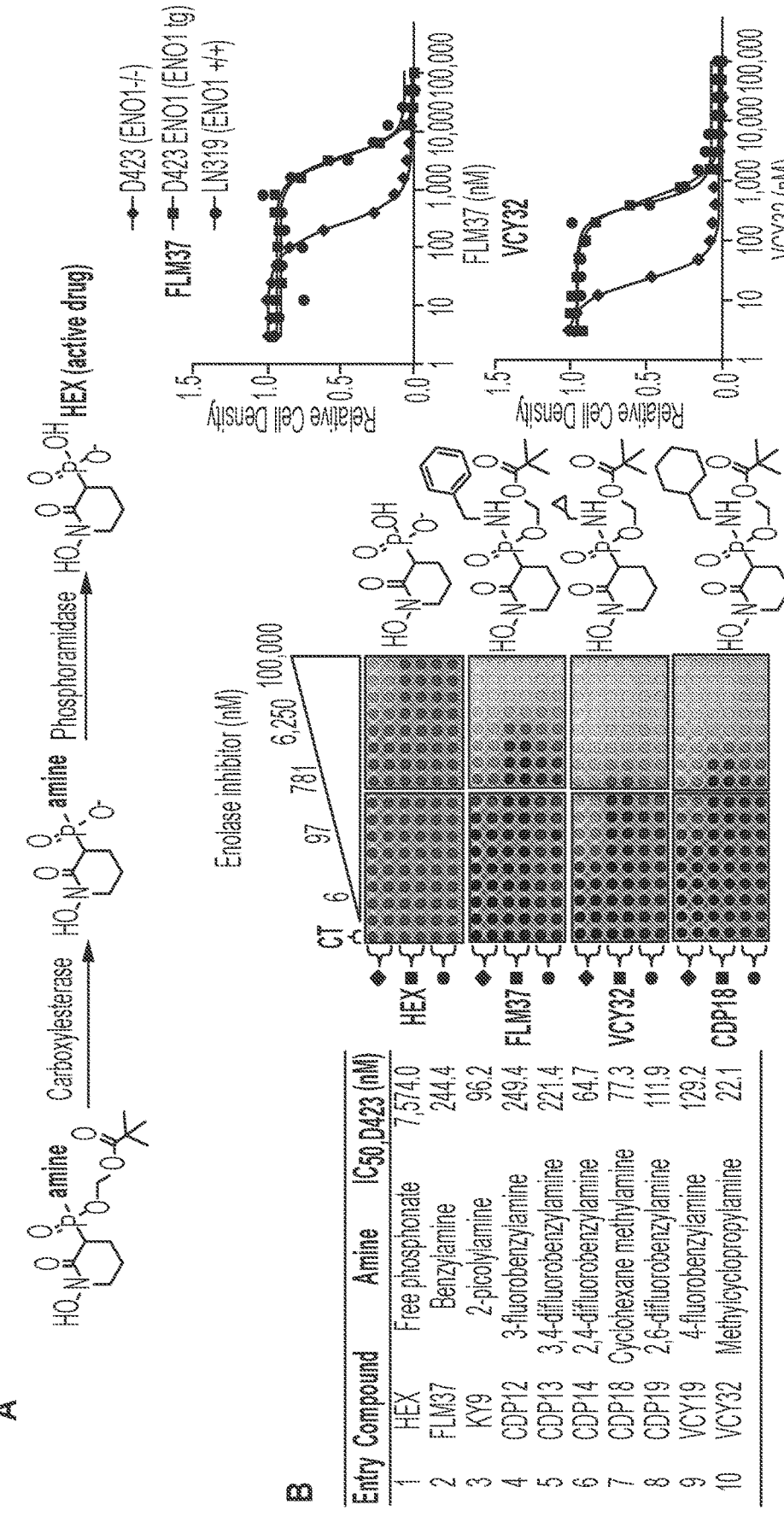
FIGS. 18A & 18B show aliphatic amines offer enhanced drug delivery in vitro.
Figures 19A, 19B:
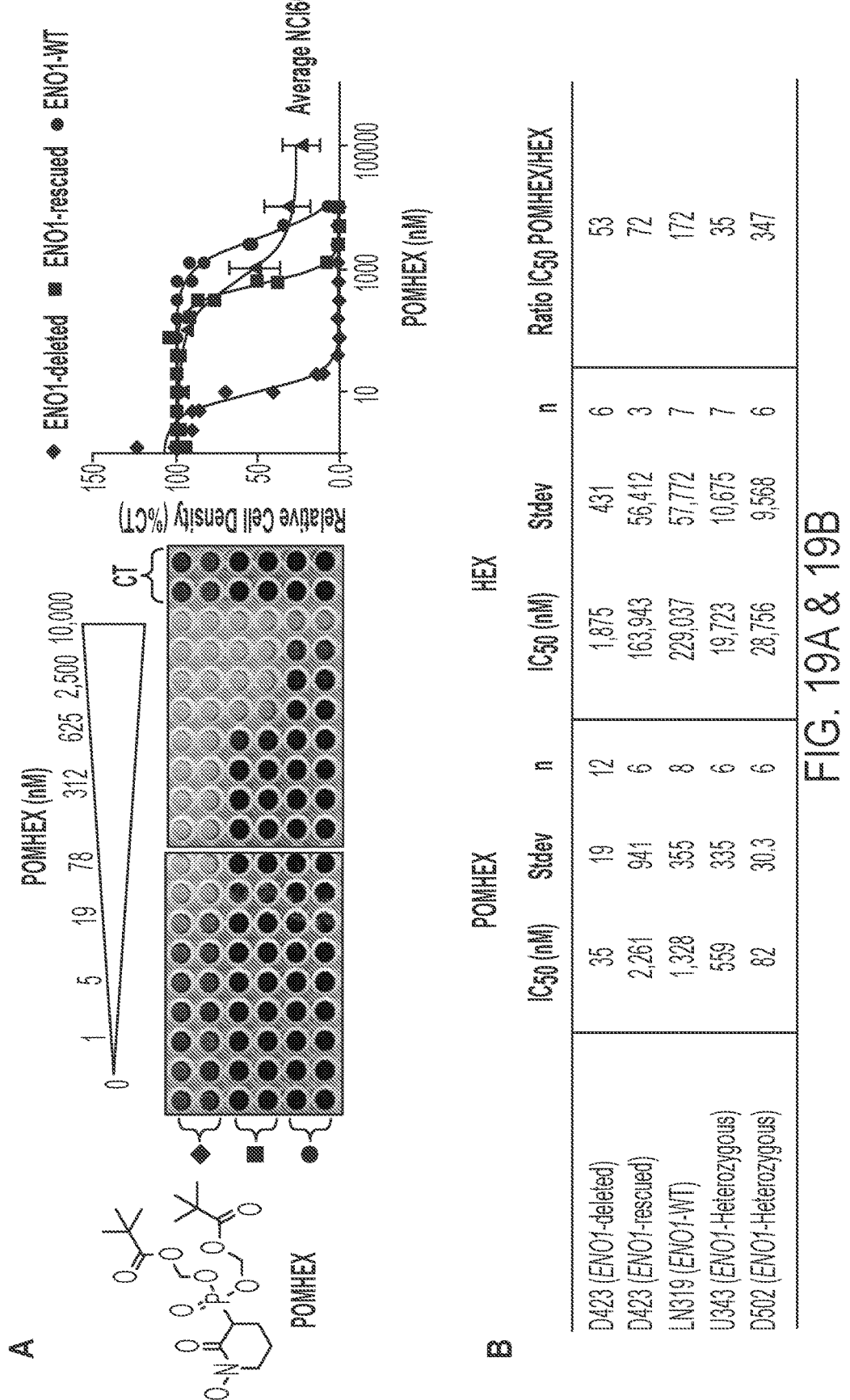
FIGS. 19A & 19B show ENO1-homozygous deleted cells are exceptionally sensitive and ENO1-heterozygous deleted cells are moderately sensitized to Enolase inhibition.
Figure 20A:
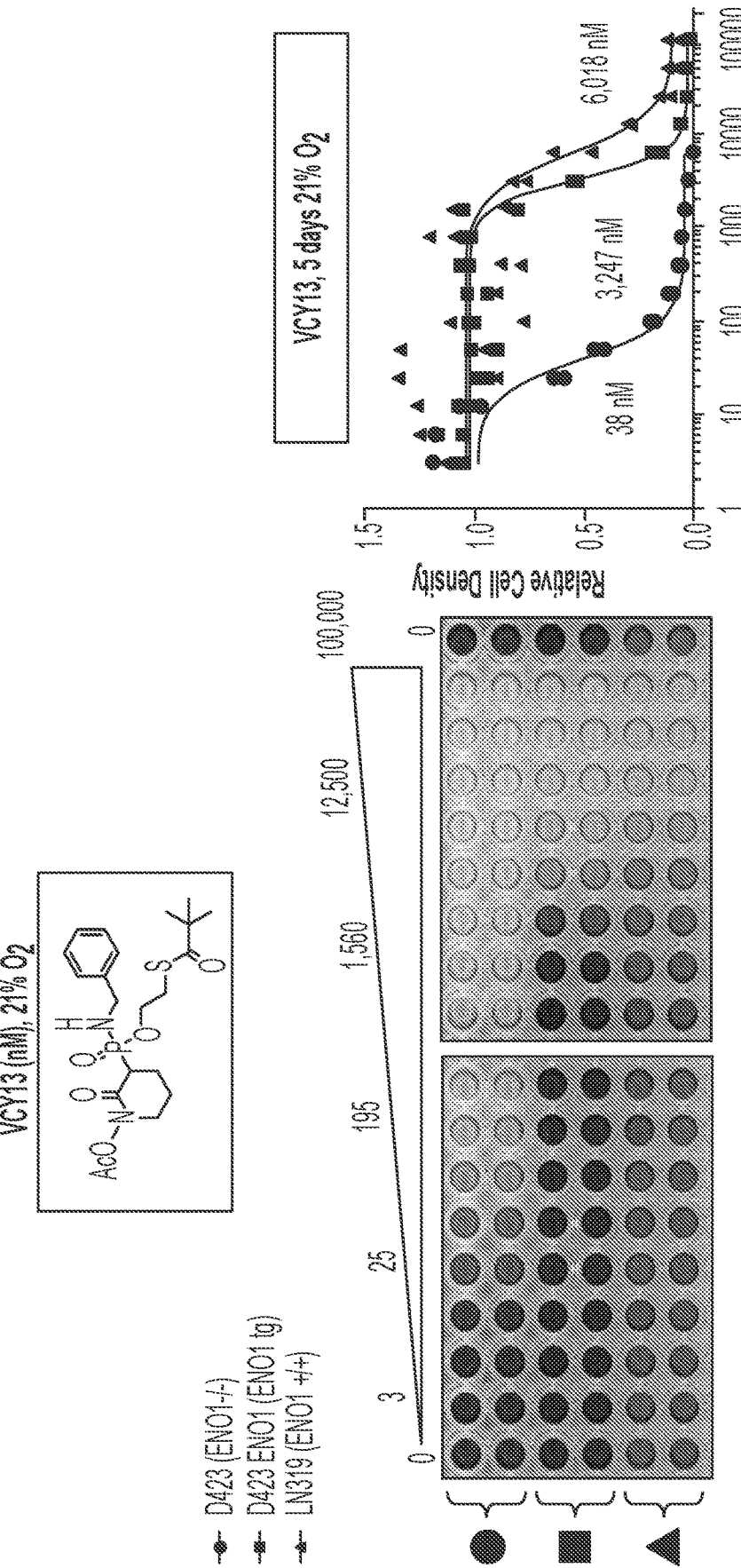
FIGS. 20A-20C show thioesterase-labile phosphonoamidates pro-drugs of HEX exhibit potent killing in cell-based systems and robust stability in human plasma. VCY13 (FIG. 20A) and VCY31 (FIG. 20B) are thioesterase-labile phosphonoamidates. ENO1-deleted (D423, red), ENO1-isogenically rescued (D423 ENO1, blue), and ENO1-WT (LN319, grey) cells were treated with either VCY13 or VCY31 for 5 days.
Figure 20B:
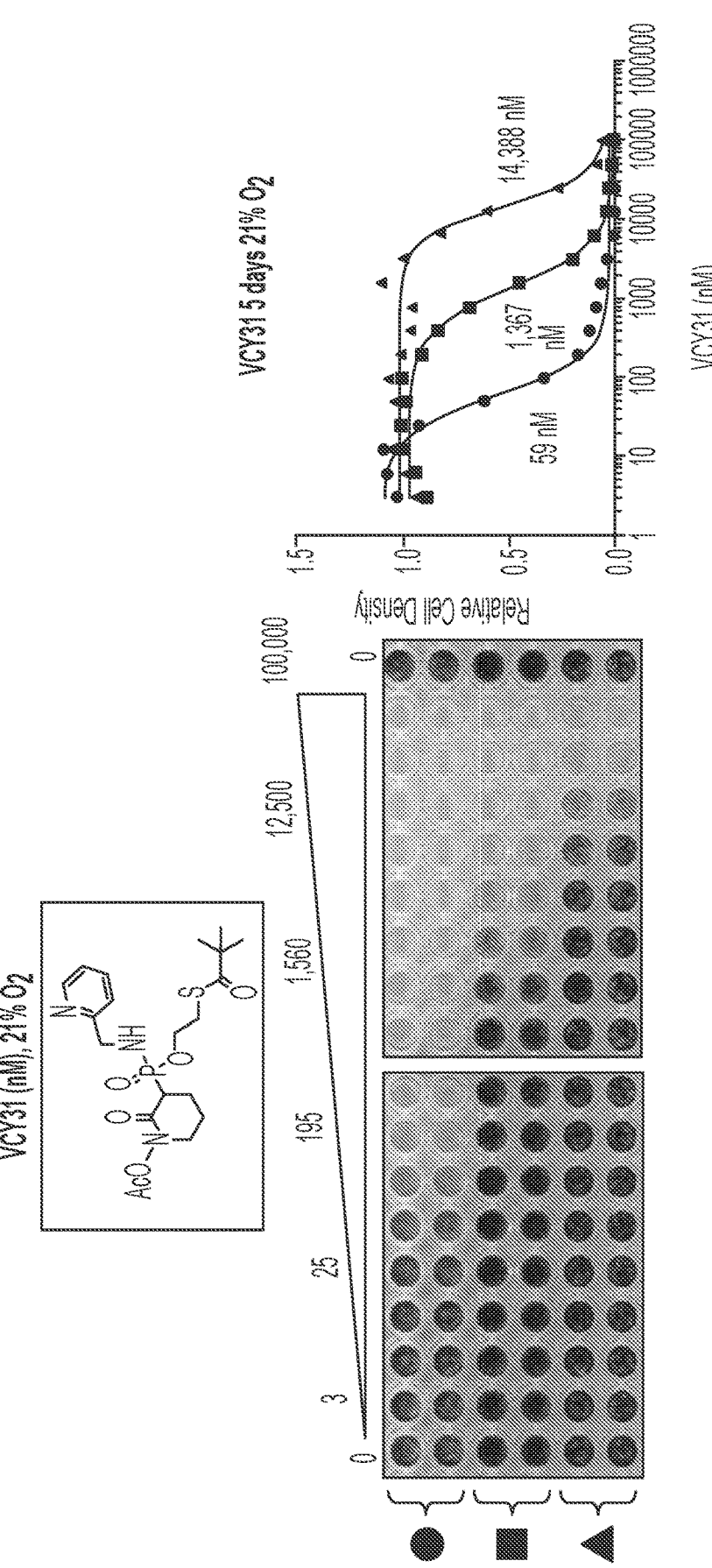
Figure 20C:
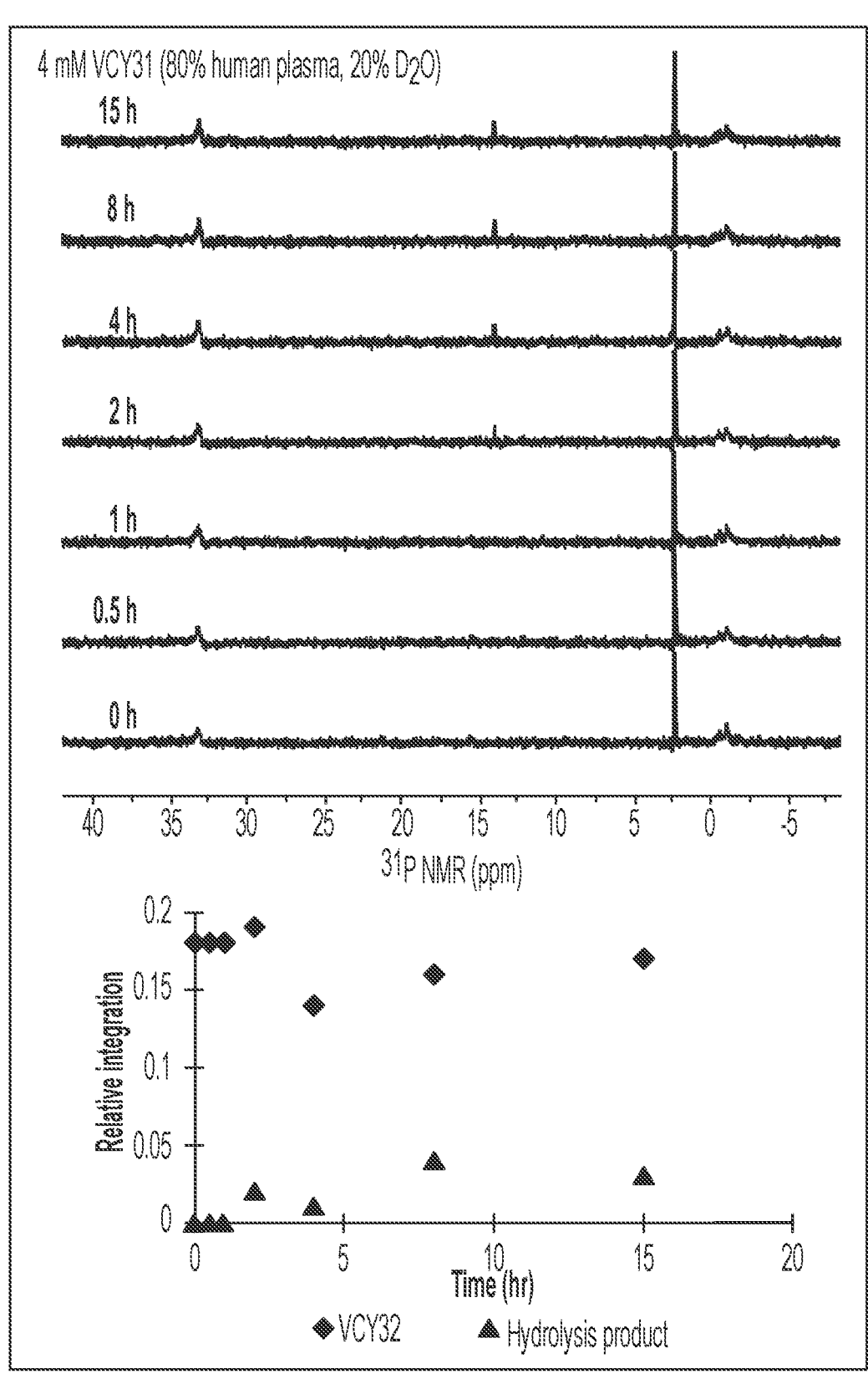
Figures 21A, 21B:
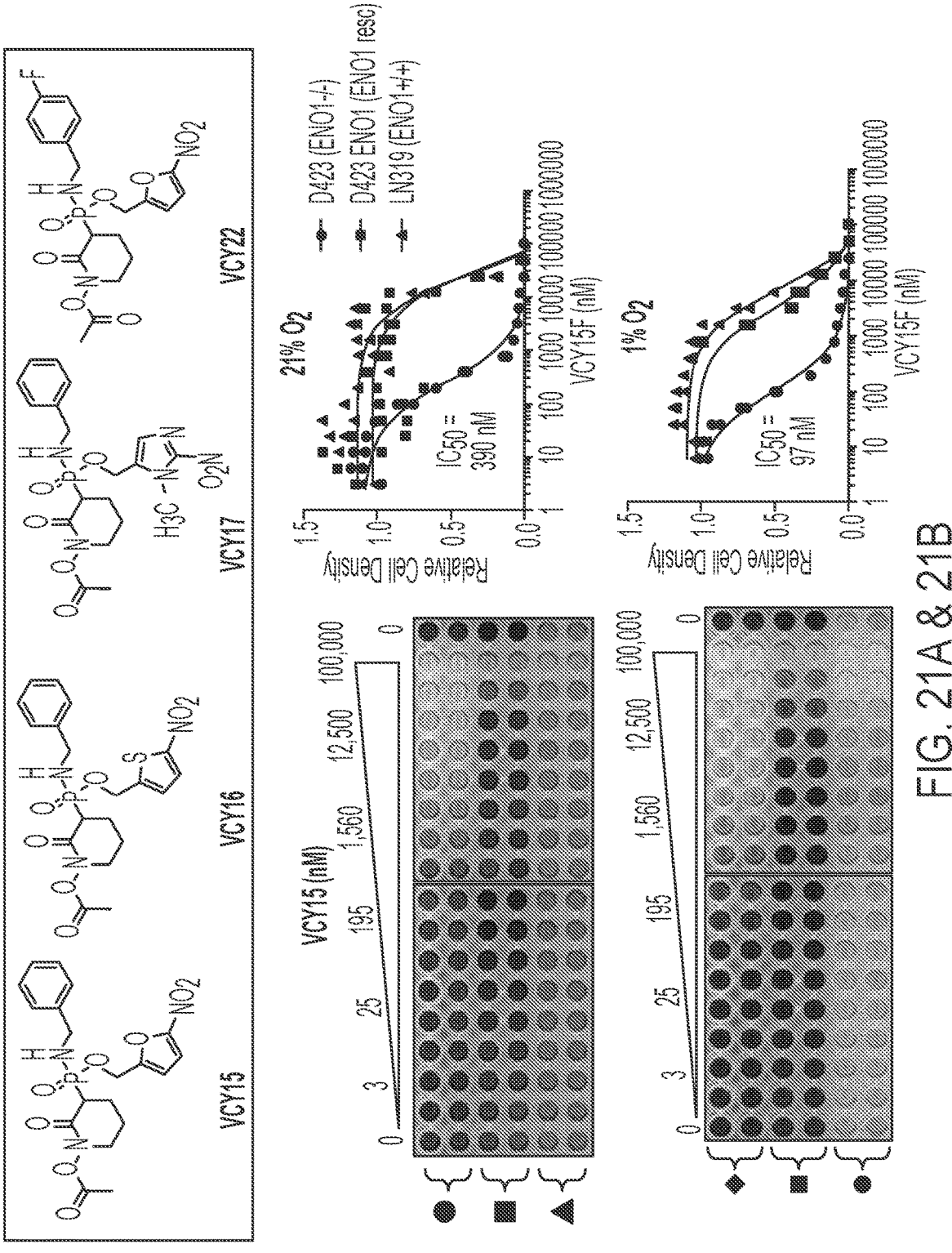
FIGS. 21A & 21B show nitroheterocycle phosphonoamidate pro-drugs of HEX are more potent under hypoxic conditions.
Figure 22:
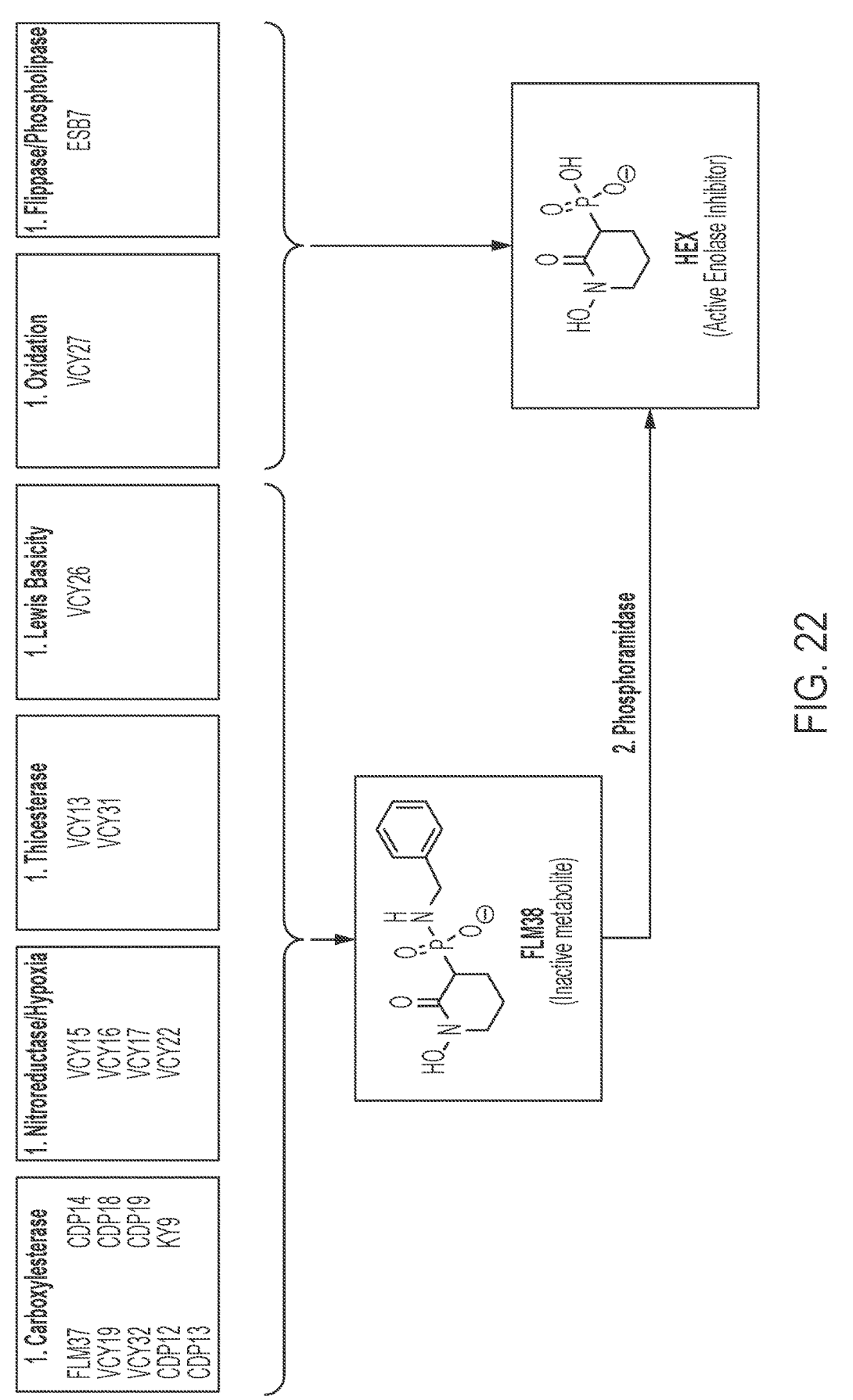
FIG. 22 shows bioactivation schemes for pro-drug inhibitors of the present disclosure.
Figure 24:
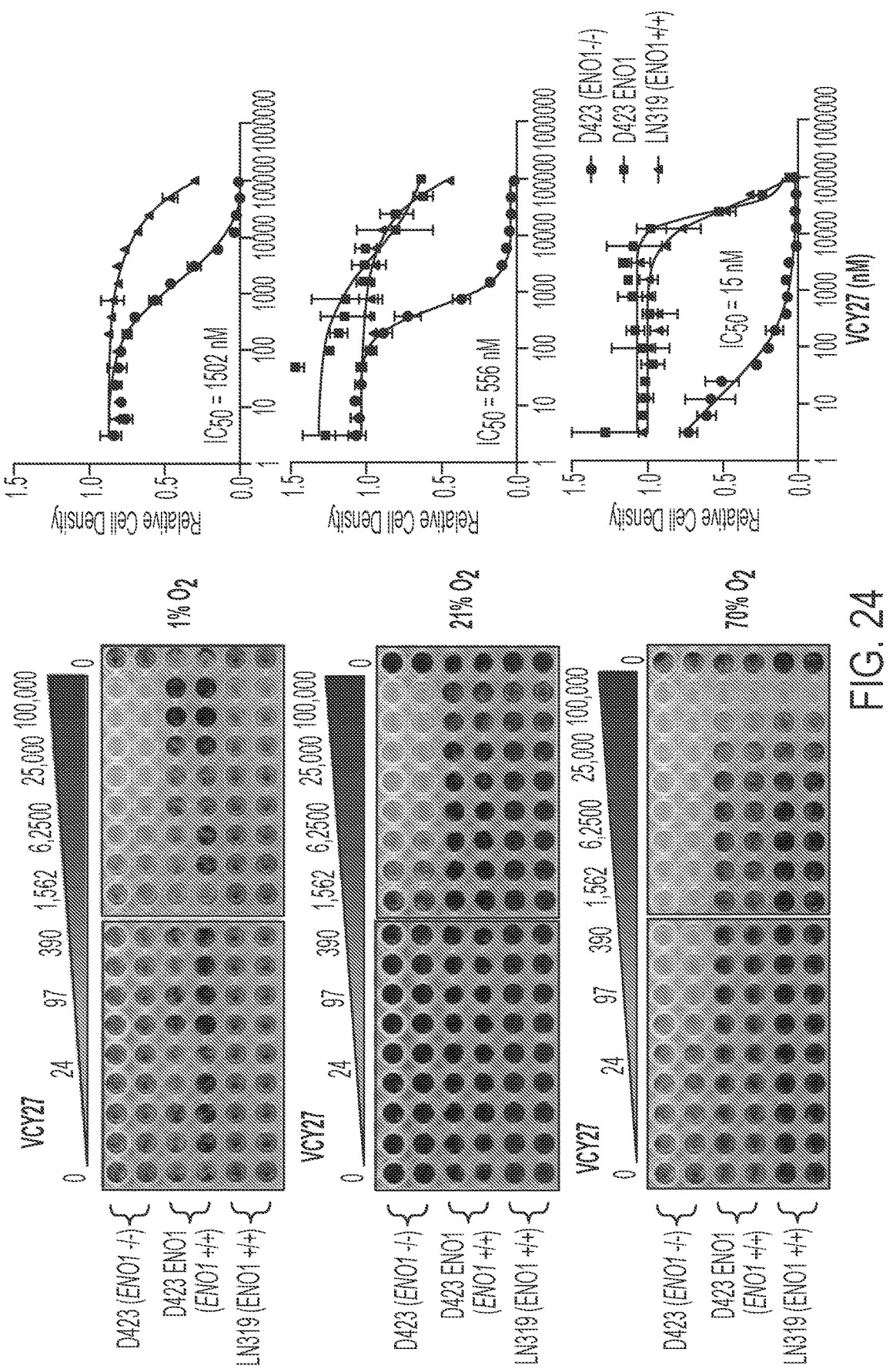
FIG. 24 shows VCY27 has an oxidative mechanism of bioactivation and acts as oxidative stress activated pro-drug. The potency of VCY27 is dependent on atmospheric oxygen tension, strongly hinting at an oxidative mechanism of bioactivation. Atmospheric oxygen tension is a strong determinant of reactive oxygen species production, and oxidative stress in general. The potency against D423 ENO1-deleted glioma cells decreases from 500 nM to 15 nM when the oxygen tension is raised from 21% to 70%02. Conversely, the potency of VCY27 is reduced when the oxygen tension is decreased to 1% $O_2$. This implies an oxidation step in the bioactivation mechanism.

A consistent trend was observed for increased pro-drug potency when aliphatic amines are used as second pro-drug groups compared to benzylic amines, as epitomized by the ~3-fold increase in potency when comparing benzylamine-protected HEX to its aliphatic counterpart, cyclohexane methylamine. In view of pharmacokinetic concerns, such as constraints imposed by BBB passage, the use of low molecular weight, aliphatic amines as second pro-drug groups is favored. At present, it is found that cyclopropane methylamine best balances the molecular weight constraints imposed by BBB passage with productive phosphoramidase cleavage. Incorporation of cyclopropane methylamine onto HEX thus serves as the "anchor" for subsequent protection of the other free —OH (FIG. 17). To the best of our knowledge, there are no reports in the literature highlighting the superior activity of aliphatic amines over their benzylic or aryl counterparts. This is perhaps captured by the inclusion of benzylamine, rather than an aliphatic amine, as a pro-drug moiety on IDX-184.

The novelty of our new Enolase inhibitors rests in the expansion of these pro-drugs beyond gastrointestinal targets, such as the liver and colon. Specifically, it was demonstrated that enzymatic cleavage of these chemical moieties is possible in glioma and non-liver cancer cells—a finding that was previously unknown. It was also found that small, aliphatic amines serve as enhanced second pro-drug leave groups compared to benzylic amines (FIG. 17), which has previously not been described in the literature. Apart from phosphonoamidate-based pro-drugs, it was also found that improved delivery of HEX under hyperoxic conditions may be achieved through attachment of 2-(hydroxymethyl)phenol ("cyclosal"). Indeed, while cyclosal-protected phosphates have previously been reported, there have been no reports of its improved delivery under high $O_2$ conditions.

As extensively articulated in this disclosure, our invention aims to improve upon the groundwork established by our findings with POMHEX. The worked described here provides a competitive advantage over POMHEX, as it forgoes carboxylesterase bioactivation for enhanced PK. Ultimately, the longer half-life of the fully protected molecule allows for greater BBB penetration and cell permeability, in addition to creating a therapeutic window suitable for treating ENO1-heterozygous deleted cancers. The latter point is particularly pertinent in expanding the number of patients who would benefit from collateral lethality as a therapeutic strategy. In some cases, the pro-drug moieties are applied to drugs specific to the liver and colon, respectively.

The use of benzylamine as a second pro-drug group has already been described in the literature (2). We thus sought to examine the delivery potential of aliphatic amines. We synthesized a series of aliphatic phosphonoamidates (FIG. 4, entries 9, 10, 16), which were then esterified to generate the test compounds evaluated in vitro (FIG. 5b, entries 7, 10). To our surprise, we found that aliphatic amines were consistently more effective at selectively killing ENO1-homozygous deleted (D423) cells in culture (FIG. 5b). Head-to-head comparison of benzylamine (FLM37) with its aliphatic counterpart, cyclohexane methylamine (CDP18), epitomized this more efficacious delivery, with the latter being ~3-fold more potent than the former (IC50,D423=244 versus 77 nM). Most strikingly, we found that small, aliphatic amines, such as cyclopropane methylamine (VCY32), demonstrated far superior killing of ENO1-deleted cells (FIG. 5b, entry 10). With an IC50,D423 ranging from 9-22 nM, VCY32 displays at least 10-fold greater potency compared to benzylamine (FLM37, FIG. 5b, entry 2 versus 10). VCY32 is the most potent Enolase inhibitor that our lab has synthesized. Our discovery that cyclopropane methylamine is a superior amine for phosphoramidase cleavage is especially advantageous because it reduces the overall molecular weight and total polar surface area (TPSA) of the pro-drug, which will likely enhance BBB passage.

Example 2—Synthesis of Enolase Inhibitors with Enhanced Pharmacokinetic Properties Synthesis of BnFLM38 (N-benzyl-P-(1-(benzyloxy)-2-oxopiperidin-3-yl)phosphonamidic acid). The synthesis of FLM38 follows a previously described route up to the intermediate BnHEX (1-(benzyloxy)-2-oxopiperidin-3-yl) phosphonic acid (Lin et. al., 2018). (1-(benzyloxy)-2-oxopiperidin-3-yl)phosphonic acid (125.0 mg, 438 mmol) was dissolved in 150 mL acetone. To this solution, benzylamine (2.21 g, 2.25 mL, 21 mmol) and 1-ethyl-3-(3-dimethylaminopropyl)carbodiimide (600 mg, 5.6 mmol, dissolved in a mixture of 2.5 mL acetone and 7.5 mL $CHCl_3$) were added over the course of 4 h. Double-distilled $H_2O$ (dd$H_2O$) was added periodically, up to a total volume of 14 mL, to keep reagents in solution. The reaction was continuously stirred for an additional 20 h until completion (progress followed by $^{31}P$ NMR and UPLC-MS). Then, the reaction was extracted with 1 equivalent of ddH$_2$O and then 1 M HCL. Next, the reaction was neutralized with 0.01 volumes of saturated NaHCO$_3$. The organic layer was kept, dried over NaSO$_4$, and rotavapped down to 10 mL. This was then diluted with three volumes of hexanes, and the resultant mixture was extracted with one volume of ddH$_2$O. The aqueous layer was kept and lyophilized for 2 days to afford an amber oil. Analysis by ESI+ (Expected [M+H]$^+$=375.38. Observed [M+H]$^+$=375.35).

$^1$H NMR (500 MHz, D$_2$O) δ 7.20-7.48 (m, 1OH), 4.79-4.92 (m, 2H), 3.92-4.03 (t, J=7.75 Hz, 2H)), 3.39-3.50 (m, 2H), 2.71-2.81 (dt, J=21.52 Hz, J=6.13 Hz, 1H), 1.95-2.08 (m, 1H), 1.82-1.91 (m, 2H), 1.64-1.73 (m, 1H). $^{13}$C NMR (125.7 MHz, D$_2$O) δ 167.97 (d, J=4.72 Hz, 1C), 141.25 (d, J=7.36 Hz, 1C), 134.52 (s, 1C), 129.92 (s, 2C), 129.15 (s, 1C), 128.73 (s, 2C), 128.60 (s, 2C), 127.59 (s, 1C), 127.00 (s, 1C), 75.54 (s, 1C), 50.11 (s, 1C), 45.28 (s, 1C), 43.64 (d, J=111.12 Hz, 1C), 22.33 (d, J=3.65 Hz, 1C), 21.65 (d, J=7.23 Hz, 1C). $^{31}$P NMR (202 MHz, D$_2$O) δ 20.92.

Synthesis of FLM38 (N-benzyl-P-(1-hydroxy-2-oxopiperidin-3-yl)phosphonamidic acid). A solution of 10% Pd/C (200 mg) in anhydrous THF/MeOH (2:3) was stirred at 25° C. A balloon of H$_2$ was added and the solution vented for 10 minutes. A second balloon of H$_2$ was then added, and the solution stirred for 1 h. Then, this slurry was transferred to a vial containing BnFLM38 (250 mg, 668 mmol) and was allowed to stir for 1 h. The reaction was filtered and concentrated to a yellow oil. Analysis by ESI+ (Expected [M+H]$^+$=285.25. Observed [M+H]$^+$=285.23).

$^1$H NMR (500, D$_2$O) δ 7.22-7.38 (m, SH), 4.35 (s, 1H), 3.92 (t, J=8.12 Hz, 2H), 3.15 (t, J=6.94 Hz, 2H), 2.98 (dt, J=7.33 Hz, J=34.53 Hz, 1H), 1.86 (m, 1H), 1.75 (m, 2H), 1.07 (t, J=7.21 Hz, 1H). $^{13}$C NMR (125.72 MHz, D$_2$O) δ 166.92 (s, 1C), 141.27 (s, 1C), 129.08 (s, 1C), 128.566 (s, 1C), 128.00 (s, 1C), 127.51 (s, 1C), 126.86 (s, 1C), 55.27 (s, 1C), 51.47 (s, 1C), 45.08 (s, 1C), 21.46 (d, J=7.22 Hz, 1C), 22.40 (d, J=3.28 Hz, 1C). $^1$H NMR $^{31}$P decoupled (500 MHz, D$_2$O) δ 7.22-7.38 (m, SH), 4.35 (s, 1H), 3.92 (ABq, J=13.58 Hz, 2H), 3.15 (t, J=6.94 Hz, 2H), 2.98 (t, J=7.33 Hz, 1H), 1.86 (m, 1H), 1.75 (m, 2H), 1.07 (t, J=7.21 Hz, 1H). $^{31}$P $^1$H decoupled NMR (202.404 MHz, CDCl$_3$) δ 21.32 (s, 1P).

Synthesis of BnFLM37 (N-benzyl-P-(1-(benzyloxy)-2-oxopiperidin-3-yl)phosphonamidic acid). A mixture of BnFLM38 (118 mg, 315 mmol), triethylamine (120 μL, 0.901 mmol), and chloromethyl pivalate (336 μL, 3.14 mmol) in acetonitrile (60 mL) was stirred vigorously for 24 h at 60° C. This was then concentrated to yield a yellow oil. Next, the product was diluted in 118 mL of CHCl$_3$ and washed with 1 volume of 1 M HCl and then ddH$_2$O. The organic layer was removed and concentrated and lyophilized for 5 h to a yellow crystalline solid. Analysis by ESI+ (Expected [M+H]$^+$=489.52. Observed [M+H]$^+$=489.42).

$^1$H NMR (500 MHz, CDCl$_3$) δ 7.25-7.37 (m, 10H), 5.53-5.61 (dd, J=15.74 Hz, 2H), 5.49-5.57 (dd, J=13.29 Hz, 2H), 4.84 (s, 1H), 4.02-4.36 (dd, J=28.11 Hz, 2H), 3.23-3.32 (m, 2H), 2.95-3.10 (dt, J=24.04 Hz, 1H), 2.79-2.95 (dt, J=23.19 Hz, 1H), 1.89-2.18 (m, 2H), 1.57-1.89 (m, 2H), 1.13 (s, 9H), 1.12 (s, 9H). $^{13}$C NMR (125.7 MHz, CDCl$_3$) δ 177.12 (s, 1C), 176.95 (s, 1C), 163.37-163.45 (d, J=3.36 Hz, 1C), 163.07-163.20 (d, J=5.01 Hz, 1C), 139.59-139.77 (d, 1C), 139.22-139.34 (d, 1C), 134.85 (s, 1C), 134.82 (s, 1C), 127.32-129.77 (m, 10C), 81.46-81.63 (d, J=6.17 Hz, 1C), 80.91-81.10 (d, J=7.71 Hz, 1C), 76.09 (s, 1C), 75.93 (s, 1C), 44.31 (s, 1C), 42.27-44.67 (d, J=127.92 Hz, 1C), 42.12-44.11 (d, J=115.57 Hz, 1C), 38.74 (s, 1C), 38.71 (s, 1C), 26.83 (s, 3C), 22.32-22.58 (d, J=12.63 Hz, 1C), 22.09-22.28

(d, J=10.42 Hz, 1C), 21.60-21.74 (d, J=4.5 Hz, 1C), 21.25-21.38 (d, J=4.41 Hz, 1C). $^{31}$P NMR (121 MHz, CDCl$_3$) δ 29.63, 28.76.

Synthesis of FLM37 (N-benzyl-P-(1-hydroxy-2-oxopiperidin-3-yl)phosphonamidic acid). A solution of 10% Pd/C (150 mg) in anhydrous THF/MeOH (2:3) was stirred at 25° C. A balloon of H$_2$ was added and the solution vented for 10 minutes. A second balloon of H$_2$ was then added, and the solution stirred for 1 h. Then, this slurry was transferred to a vial containing BnFLM37 (150 mg, 307 mmol) and was allowed to stir for 1 h. The reaction was filtered and concentrated to an orange solid. Analysis by ESI+ (Expected [M+H]$^+$=399.40. Observed [M+H]$^+$=399.35).

$^1$H NMR (500 MHz, CDCl$_3$) δ 7.22-7.39 (m, 5H), 5.59-5.66 (dd, J=12.32 Hz, 2H), 5.54-5.59 (ds, J=12.66 Hz, 2H), 4.29-4.36 (t, J=11.71 Hz, 2H), 4.25-4.32 (t, J=11.29 Hz, 2H), 3.01-3.10 (dt, J=22.99 Hz, 1H), 2.86-2.95 (dt, J=22.79 Hz, 1H), 2.08-2.13 (m, 2H), 1.83-2.08 (m, 2H), 1.20 (s, 9H), 1.19 (s, 9H). $^{13}$C NMR (125.7 MHz, CDCl$_3$) δ 177.26 (s, 1C), 177.23 (s, 1C), 160.33-160.43 (d, 1.29 Hz, 1C), 160.17-160.31 (d, J=2.96 Hz, 1C), 139.94 (d, J=2.72 Hz, 1C), 139.4-139.52 (d, 2.53 Hz, 1C), 127.27-1128.70 (m, 5C), 81.26-81.45 (d, J=3.11 Hz, 1C), 80.87-81.05 (d, J=3.60 Hz, 1C), 48.67 (s, 1C), 40.89-41.21 (d, J=31.86 Hz, 1C), 26.81-26.90 (s, 3C), 21.43-21.85 (m, 2C). $^{31}$P NMR (202 MHz, CDCl$_3$) δ 28.76 (s, 1P), 29.63 (s, 1P) (isomers).

Synthesis of AcFLM38 P-(1-acetoxy-2-oxopiperidin-3-yl)-N-benzylphosphonamidic acid. To a solution FLM38 (65 mg, 229 μmol) in anhydrous MeCN (500 μL), Ac$_2$O (65 μL, 668 μmol) were added. The reaction stirred for 3 h at 25° C. Then, the reaction was concentrated and lyophilized for 2 days. Analysis by ESI+ (Expected [M+H]$^+$=327.29. Observed [M+H]$^+$=327.32).

$^1$H NMR (600 MHz, CDCl$_3$) δ 7.29-7.17 (m, 5H), 3.74 (d, J=12.85 Hz, 2H), 3.50 (m, 2H), 2.89 (dt, J=11.88 Hz, J=30.07 Hz, 1H), 2.16 (s, 3H), 1.99-1.94 (m, 2H), 1.87-1.85 (m, 2H). $^{13}$C NMR (150.903 MHz, CDCl$_3$) δ 169.51 (s, 1C), 167.99, 143.87 (d, J=6.49 Hz, 1C), 130.51 (s, 1C), 130.19 (s, 1C), 129.59 (s, 2C), 129.07 (s, 1C), 56.82 (d, J=147.75 Hz, 1C), 46.68 (s, 1C), 44.98 (d, J=67.91 Hz, 1C), 20.32 (s, 1C), 17.53 (s, 1C), 10.62 (s, 1C). $^1$H NMR $^{31}$P DEC (600 MHz, CDCl$_3$) δ 7.29-7.17 (m, 5H), 3.74 (s, 2H), 3.50 (m, 2H), 2.89 (t, J=11.88 Hz, 1H), 2.16 (s, 3H), 1.99-1.94 (m, 2H), 1.87-1.85 (m, 2H). $^{31}$P NMR (242.94 MHz, CDCl$_3$) δ 17.50 (s, 1P).

Synthesis of VCY13, 3-((benzylamino)(2-(pivaloylthio)ethoxy)phosphoryl)-2-oxopiperidin-1-yl acetate. To a solution of AcFLM38 (15 mg, 46 mmol) in anhydrous CHCl$_3$, S-(2-hydroxyethyl)-2,2-dimethylpropanethioate (11.19 μL, 69 mmol) was added, followed by triphenylphosphine (18 mg, 69 mmol). Then, DIAD (13.54 μL, 69 mmol) was added. The reaction was allowed to stir at 25° C. for 20 h. The solvent was removed and the crude product was purified via reverse-phase HPLC. This was then lyophilized to a yellow solid. Analysis by ESI+ (Expected [M+H]$^+$=471.52. Observed [M+H]$^+$=471.38, 471.42 (cis/trans isomers)). $^{31}$P NMR (121 MHz, CDCl$_3$) δ 28.87 (d, 1P).

Synthesis of VCY15, 3-((benzylamino)((S-nitrofuran-2-yl)methoxy)phosphoryl)-2-oxopiperidin-1-yl acetate. To a solution of AcFLM38 (73 mg, 224 mmol) in anhydrous acetonitrile, 2-(bromomethyl)-5-nitrofuran (138.26 mg, 671 mmol) was added. The reaction was allowed to stir at 50° C. for 20 h. The solvent was then removed and the reaction was purified via reverse-phase HPLC. This was then lyophilized to a yellow solid. Analysis by ESI+ (Expected [M+H]$^+$=452.37. Observed [M+H]$^+$=452.32).

$^1$H NMR (300 MHz, CDCl$_3$) δ 7.26-7.23 (m, 6H), 7.17-7.12 (d, J=3.82 Hz, 1H), 6.49 (d, J=7.12 Hz, 2H), 4.89 (m, 2H), 4.36 (d, J=3.22 Hz, 2H), 4.22 (d, J=5.92 Hz, 2H), 3.62 (m, 2H), 3.04 (dt, J=23.40, 7.58 Hz, 1H), 2.13 (s, 3H), 1.96 (s, 2H), 1.18 (s, 2H) $^{13}$C NMR (75 MHz, CDCl$_3$) δ 170.19 (s, 1C), 167.26 (d, J=15.44 Hz, 1C), 153.35 (d, J=9.55 Hz, 1C), 152.60 (s, 1C), 140.09 (d, J=2.07 Hz, 1C), 128.83-127.24 (m, 5C), 112.62-111.99 (m, 2C), 57.39 (s, 1C), 51.37 (s, 1C), 44.46 (s, 1C), 43.61 (d, J=62.07 Hz, 1C), 22.52 (d, J=6.32 Hz, 1C), 20.67 (d, J=2.58 Hz, 1C), 18.2 (s, 1C). $^{31}$P NMR (121 MHz, CDCl$_3$) δ 29.49 (s, 1P).

Synthesis of VCY16, 3-((benzylamino)((5-nitrothiophen-2-yl)methoxy)phosphoryl)-2-oxopiperidin-1-yl acetate. To a solution of AcFLM38 (6 mg, 19 mmol) in anhydrous CHCl$_3$, (5-nitrothiophen-2-yl)methanol (4.39 mg, 28 mmol) was added, followed by triphenylphosphine (7.2 mg, 28 mmol). Then, DIAD (5.4 µL, 28 mmol) was added. The reaction was allowed to stir at 25° C. for 20 h. The solvent was removed and the crude product was purified via reverse-phase HPLC. This was then lyophilized to an orange solid. Analysis by ESI+ (Expected [M+H]$^+$=468.43. Observed [M+H]$^+$=468.32).

Synthesis of VCY17, 3-((benzylamino)((1-methyl-2-nitro-1H-imidazol-5-yl)methoxy)phosphoryl)-2-oxopiperidin-1-yl acetate. To a solution of AcFLM38 (46 mg, 141 mmol) in anhydrous CHCl$_3$, (1-methyl-2-nitro-1H-imidazol-5-yl)methanol (33 mg, 211 mmol) was added, followed by triphenylphosphine (55 mg, 211 mmol). Then, DIAD (42 µL, 211 mmol) was added. The reaction was allowed to stir at 25° C. for 20 h. The solvent was removed and the crude product was purified via reverse-phase HPLC. This was then lyophilized to a yellow solid. Analysis by ESI+ (Expected [M+H]$^+$=466.40. Observed [M+H]$^+$=466.34).

$^1$H NMR (500 MHz, CDCl$_3$) δ 7.46 (s, 1H), 7.32 (m, 5H), 4.85 (d, J=18.92 Hz, 2H), 4.26 (ABq, J=7.55 Hz, 2H), 3.60 (m, 2H), 3.17 (dt, J=13.12 Hz, J=87.86 Hz, 1H), 2.17 (s, 3H), 2.14 (m, 1H), 2.04-1.92 (m, 2H), 1.63 (m, 1H). $^{13}$C NMR (125.72 MHz, CDCl$_3$) δ 170.14 (s, 1C), 167.03 (s, 1C), 146.32 (m, 1C), 139.94 (m, 1C), 128.73 (s, 1C), 128.53 (s, 2C), 127.47 (m, 3C), 54.83 (s, 1C), 51.17 (s, 1C), 44.62 (s, 1C), 43.64 (d, J=128.67 Hz, 1C), 21.99 (s, 1C), 20.56 (s, 1C), 18.01 (s, 1C). $^1$H NMR $^{31}$P decoupled (500 MHz, CDCl$_3$) δ 7.46 (s, 1H), 7.32 (m, SH), 4.86 (s, 2H), 4.27 (s, 2H), 3.60 (m, 2H), 3.15 (t, J=13.99 Hz, 1H), 2.17 (s, 3H), 2.14 (m, 1H), 2.04-1.92 (m, 2H), 1.63 (m, 1H). $^{31}$P NMR (202.4 MHz, CDCl$_3$) δ 29.53 (s, 1P, major isomer), 29.23 (s, 1P, minor isomer).

General Synthetic Procedures:

STEP 1—Synthesis of phosphonoamidates from BnHEX. All coupling reactions described for BnHEX (1) follow the same general procedure. Betaine formation: DIAD (2 equiv.) and triphenyl phosphine (2 equiv.) were combined in anhydrous DCM at 0° C. and allowed to stir to mom temperature for 30 minutes. Separately. BnHEX (1 equiv.) and the indicated amine (2 equiv.) were dissolved in anhydrous DCM and then added dropwise to the betaine solution. The reaction was allowed to stir for 30 minutes. The crude reaction mixture was then transferred to a 50 mL Falcon tube, where 1 volume of water was added. The reaction was vortexed and centrifuged (4000 rpm, 4° C.) for 2 minutes. The aqueous layer was then isolated and lyophilized to a white powder, unless otherwise specified.

For thioester and nitroheterocycle pro-drugs—STEP 2. A mixture of palladium on carbon (10 wt. %, 1 equiv. by mass) in THF/MeOH (2:3 ratio) was flushed with two Hz-containing balloons for 1 h. Separately, the compound obtained from STEP 1 was dissolved in MeOH and added to the palladium-containing slurry and allowed to react at room temperature for 12 h. The reaction was then filtered and concentrated under reduced pressure to a yellow oil. The product was used without further purification.

For pivaloyloxymethyl (POM) pro-drugs—STEP 2 To a solution of compound in STEP 1 in MeCN, POMCl (1.5 equiv.) and DIPEA (0.1 equiv.) were added. The reaction was allowed to stir for 15 h at 60° C. Then, the crude mixture was concentrated to a yellow oil and lyophilized for 15 h to a yellow oil. The crude product was used without further purification.

For thioester and nitroheterocycle pro-drug—STEP 3. To a solution of compound in STEP 2 in anhydrous MeCN, acetic anhydride (1.5 equiv.) and DIPEA (0.1 equiv.) were added. The reaction was stirred at 50° C. for 1 h. The crude mixture was then concentrated to a yellow oil and used without further purification.

For pivaloyloxymethyl (POM) pro-drugs-STEP 3. A mixture of palladium on carbon (10 wt. %, 1 equiv. by mass) in THF/MeOH (2:3 ratio) was flushed with two H$_2$-containing balloons for 1 h. Separately, the compound obtained from STEP 2 was dissolved in MeOH and added to the palladium-containing slurry and allowed to react at room temperature for 12 h. The reaction was then filtered and concentrated under reduced pressure to a yellow oil. Then, the crude product was purified via reverse-phase HPLC (Aligent G1361A 1260 Infinity) using a stepwise gradient (5-90% Buffer B over 10 minutes, 90-100% Buffer B over 7 minutes, 100% Buffer B over 8 minutes, 100-5% Buffer B over 5 minutes; Buffer A: dH$_2$O with 0.1% TFA, Buffer B: CH$_3$CN+0.1% TFA). Product-containing fractions were combined and lyophilized to a pale-yellow oil.

For thioester and nitroimidazole pro-drugs-STEP 4. To a solution of compound in STEP 3 in anhydrous DCM, S-(2-hydroxyethyl) 2,2-dimethylpropanethioate, OR (1-methyl-2-nitro-1H-imidazol-5-yl)methanol (2 equiv.), and DIAD (2 equiv.) were added sequentially. The reaction was allowed to react with end-over-end rotation for 15 h. Next, the crude reaction mixture was concentrated to a yellow-orange oil. Then, the crude product was purified via reverse-phase HPLC (Aligent G1361A 1260 Infinity) using a stepwise gradient (5-90% Buffer B over 10 minutes, 90-100% Buffer B over 7 minutes, 100% Buffer B over 8 minutes, 100-5% Buffer B over 5 minutes; Buffer A: dH$_2$O with 0.1% TFA. Buffer B: CH$_3$CN+0.1% TFA). Product-containing fractions were combined and lyophilized to a pale-yellow powder.

For nitroheterocycle pro-drugs—STEP 4. To a solution of compound in STEP 3 in anhydrous MeCN, 2-(bromomethyl)-5-nitrofuran, OR 2-(bromomethyl)-5-nitrothiophene (1.5 equiv.), followed by TEA (0.2 equiv.) were added. The reaction was allowed to stir at 50° C. for 12 h. The reaction was then concentrated under reduced pressure and purified via reverse-phase HPLC (Aligent G1361A 1260 Infinity) using a stepwise gradient (5-90% Buffer B over 10 minutes, 90-100% Buffer B over 7 minutes, 100% Buffer B over 8 minutes, 100-5% Buffer B over 5 minutes; Buffer A: dH$_2$O with 0.1% TFA, Buffer B: CH$_3$CN+0.1% TFA). Product-containing fractions were combined and lyophilized to an orange oil.

For VCY26—STEP 1. N-benzyl-P-(1-(benzyloxy)-2-oxopiperidin-3-yl)phosphonamidic acid (25 mg, 87.65 µmol) was dissolved in neat phosphorous oxychloride (100 µL) and allowed to react with end-over-end rotation for 40 minutes. Then, the crude reaction mix was dissolved in chloroform (5 mL) and the reaction was washed first with 1 volume of water, followed by 1 volume of saturated sodium bicarbonate, 1 volume of water, 1 volume of brine, and then 1 volume of water. The organic layer was dried over sodium sulfate and concentrated under reduced pressure to a pale-yellow oil.

For VCY26—STEP 2. To a solution of compound obtained in STEP 1 (16.10 mg, 40.99 μmol) in anhydrous DCM (5 mL) stirring at −78° C. under argon, anhydrous DIPEA (5 L), was added dropwise. Separately, 3-hydroxy-propionitrile (4.59 mg, 40.99 μmol) was dissolved anhydrous DCM (500 μL) with dry DIPEA (1 μL, 6.15 μmol); this solution was then added dropwise to solution containing (2). The reaction was allowed to stir at −78° C. to ambient temperature over 2 hours. The reaction was then concentrated to a translucent oil, which was then purified via reverse-phase HPLC (Aligent G1361A 1260 Infinity) using a stepwise gradient (5-90% Buffer B over 10 minutes, 90-100% Buffer B over 7 minutes, 100% Buffer B over 8 minutes, 100-5% Buffer B over 5 minutes; Buffer A: dH$_2$O with 0.1% TFA, Buffer B: CH$_3$CN+0.1% TFA). Fractions containing the desired product were combined and lyophilized to a white powder.

For VCY2Z6—STEP 3. A mixture of palladium on carbon (10 wt. %, 1 equiv. by mass) in THF/MeOH (2:3 ratio) was flushed with two H$_2$-containing balloons for 1 h. Separately, the compound obtained from STEP 2 was dissolved in MeOH and added to the palladium-containing slurry and allowed to react at room temperature for 12 h. The reaction was then filtered and concentrated under reduced pressure to a yellow oil. Then, the crude product was purified via reverse-phase HPLC (Aligent G1361A 1260 Infinity) using a stepwise gradient (5-90% Buffer B over 10 minutes, 90-100% Buffer B over 7 minutes, 100% Buffer B over 8 minutes, 100-5% Buffer B over 5 minutes; Buffer A: dH$_2$O with 0.1% TFA, Buffer B: CH$_3$CN+0.1% TFA). Product-containing fractions were combined and lyophilized to a pale-yellow oil.

For VCY27—STEP 1. Hydrogen (1-(benzyloxy)-2-oxopiperidin-3-yl)phosphonate (100 mg, 360.59 μmol) was combined with thionyl chloride (500 μL, 6.89 mmol) with catalytic DMF and was reacted with end-over-end rotation at room temperature for 15 hours. The crude mixture was then concentrated under reduced pressure to afford a yellow oil, which was used immediately without further purification (112 mg, 100% yield).

For VCY27—STEP 2. To a solution of compound from STEP 1 (112 mg, 347.69 μmol) in anhydrous DCM (5 mL) flushed with argon and stirring at −78° C., anhydrous diisopropyl ethylamine (500 μmL, 2.87 mol) was added until the pH of the solution was ~7.5. Separately, 2-(hydroxymethyl)phenol (86.32 mg, 695.35 μmol) was dissolved in anhydrous DCM (2 mL) with anhydrous diisopropyl ethylamine (50 μmL, 287.05 mmol) and added dropwise to the solution containing (2). The reaction stirred from −78° C. to room temperature over 2 hours. Next, the reaction was concentrated to an orange oil under reduced pressure. Then, the crude product was purified via reverse-phase HPLC (Aligent G1361A 1260 Infinity) using a stepwise gradient (5-90% Buffer B over 10 minutes, 90-100% Buffer B over 7 minutes, 100% Buffer B over 8 minutes, 100-5% Buffer B over 5 minutes; Buffer A: dH$_2$O with 0.1% TFA, Buffer B: CH$_3$CN+0.1% TFA). Product-containing fractions were combined and lyophilized to a pale-yellow powder. Analysis by ESI+ (Expected [M+H]$^+$=374.34. Observed [M+H]$^+$= 374.37).

For VCY27—STEP 3. Palladium on carbon (10 wt. %, 100 mg) was mixed with THF (2 mL) and MeOH (3 mL) with stirring. Hydrogen in a balloon was then allowed to flow through the reaction for 1 minute with venting. Then, a second balloon with hydrogen was added to the reaction and the mixture was allowed to stir and saturate with hydrogen for 1 hour. Next, to a separate vial, (3) was dissolved in MeOH (2 mL) and injected into the hydrogen-charged flask. The reaction stirred at room temperature for 1 hour. Then, the palladium was filtered, and the reaction was concentrated under reduced pressure to a yellow oil. The crude product was purified via reverse-phase HPLC (Aligent G1361A 1260 Infinity) using a stepwise gradient (1-60% Buffer B over 25 minutes, 60-100% Buffer B over 10 minutes, 100% Buffer B over 5 minutes, 100-0% Buffer B over 1 minutes; Buffer A: dH$_2$O with 0.1% TFA, Buffer B: CH$_3$CN+0.1% TFA. Product-containing fractions were combined and lyophilized to a pale-yellow powder. Analysis by ESI+ (Expected [M+H]$^+$=374.34. Observed [M+H]$^+$= 374.37).

((((1-hydroxy-2-oxopiperidin-3-yl)((pyridin-2-ylmethyl) amino)phosphoryl)oxy)methyl pivalate (KY9). Analysis by ESI+ (Expected [M+H]$^+$=400.38. Observed [M+H]$^+$= 400.48). $^1$H NMR (300 MHz, CDCl$_3$) δ 8.74 (d, J=4.48 Hz, 1H), 8.17-8.22 (t, J=7.93, 8.37 Hz, 1H), 7.83-7.85 (d, J=1H), 7.62-7.67 (t, J=6.53, 6.94 Hz, 1H), 5.62-5.64 (d, J=7.04 Hz, 2H), 4.61-4.71 (m, 2H), 3.64 (s, 2H), 3.14-3.27 (dt, J=25.08 Hz, 1H), 1.99-2.19 (m, 2H), 1.78-1.91 (m, 2H), 1.18 (s, 9H). $^{13}$C NMR (75 MHz, CDCl$_3$) δ 160.89 (d, J=4.03 Hz, 1C), 123.50 (d, J=3.68 Hz, 1C), 81.67 (d, J=7.61 Hz, 1C), 40.96 (s, 1C), 26.84 (s, 1C), 22.07 (d, J=5.68 Hz, 1C), 21.67 (d, J=7.44 Hz, 1C). $^{31}$P NMR (121 MHz, CDCl$_3$) δ 26.16 (s, 1P), 26.59 (s, IP) (cis/trans isomers).

(((((3-fluorobenzyl)amino)(1-hydroxy-2-oxopiperidin-3-yl)phosphoryl)oxy)methyl pivalate (CDP12). Analysis by ESI+ (Expected [M+H]$^+$=400.38. Observed [M+H]$^+$= 400.44). $^1$H NMR (300 MHz, D$_2$O) 7.20-7.27 (m, 1H), 7.05-7.11 (m, 2H), 6.95-6.85 (t, J=8.29, 8.90 Hz, 1H), 5.56 (m, 2H), 4.09-4.16 (t, J=10.08, 10.08 Hz, 2H), 3.49-3.53 (t, J=5.76, 5.78 Hz, 2H), 3.02-3.16 (dt, J=25.13 Hz, 1H), 1.99-2.11 (m, 2H), 1.86-1.97 (m, 1H), 1.73-1.84 (m, 1H), 1.10 (s, 9H). $^{13}$C NMR (75 MHz, D$_2$O) $^{31}$P NMR (121 MHz, D$_2$O) δ 31.18 (s, 1P), 30.91 (s, 1P)(isomers). $^{19}$F NMR (282 MHz, D$_2$O) δ −114.08 (s, 1F), −114.19 (s, 1F) (isomers).

(((((3,4-difluorobenzyl)amino)(1-hydroxy-2-oxopiperidin-3-yl)phosphoryl)oxy)methyl pivalate (CDP13). Analysis by ESI+ (Expected [M+H]$^+$=400.38. Observed [M+H]$^+$= 400.44). $^1$H NMR (300 MHz, CDCl$_3$) 7.21 (m, 1H), 7.11 (m, 2H), 6.63 (bs, 1H), 5.60 (m, 2H), 4.28 (m, 2H), 3.61-3.64 (t, J=3.14, 4.17 Hz, 2H), 2.97-3.09 (dt, J=23.84 Hz, 1H), 2.19-2.28 (m, 1H), 1.99-2.12 (m, 2H), 1.80-1.92 (m, 1H), 1.18 (s, 9H). $^{13}$C NMR (75 MHz, CDCl$_3$) $^{31}$P NMR (121 MHz, CDCl$_3$) δ 29.95 (s, 1P), 28.79 (s, 1P) (isomers). $^{19}$F NMR (282 MHz, CDCl$_3$) δ −137.78 (d, J=20.79 Hz, 1F), −137.83 (d, J=21.62 Hz, 1F), −140.40 (d, J=21.17 Hz, 1F), 140.43 (d, J=21.33 Hz, 1F) (isomers).

(((((2,4-difluorobenzyl)amino)(1-hydroxy-2-oxopiperidin-3-yl)phosphoryl)oxy)methyl pivalate (CDP14). Analysis by ESI+(Expected [M+H]$^+$=400.38. Observed [M+H]$^+$ =400.44). $^1$H NMR (300 MHz, CDCl$_3$) 7.42 (m, 1H), 6.86 (m, 2H), 6.12 (bs, 1H), 5.56-5.60 (dd, J=12.77 Hz, 2H), 4.33 (m, 2H), 3.63 (m, 2H), 2.96-3.09 (dt, J=22.80 Hz, 1H), 2.17-2.26 (m, 1H), 1.98-2.10 (m, 2H), 1.79-1.90 (m, 1H), 1.17 (s, 91-). $^{13}$C NMR (75 MHz, CDCl$_3$) $^{31}$P NMR (121 MHz, CDCl$_3$) δ 29.94 (s, 1P), 28.79 (s, 1P) (isomers). $^{19}$F NMR (282 MHz, CDCl$_3$) δ −111.55 (d, J=7.29 Hz, 1F), −111.66 (d, J=7.41 Hz, 1F), −115.2 (d, J=7.74 Hz, 1F), −115.18 (d, J=7.77 Hz, 1F) (isomers).

(((((Cyclohexylmethyl)amino)(1-hydroxy-2-oxopiperidin-3-yl)phosphoryl)oxy)methyl pivalate (CDP18). Analysis by ESI+(Expected [M+H]$^+$=400.38. Observed [M+H]$^+$=400.44). $^1$H NMR (300 MHz, CDCl$_3$) δ 5.54-5.64 (m, 2H), 3.61-3.65 (m, 2H), (m, 1H), 2.15-2.25 (m, 1H), 1.97-2.12 (m, 2H), 1.83-1.93 (m, 1H), 1.62-1.74 (m, 6H), 1.32-1.44 (m, 1H), 1.19 (s, 9H), 0.79-0.94 (m, 3H). $^{13}$C NMR (75 MHz, CDCl$_3$) 177.18 (s, 1C), 160.29 (d, J=1.19 Hz, 1C), 92.29 (s, 1C), 81.35-81.44 (d, J=7.52, 1C), 40.62-42.34 (d, J=130.41 Hz, 1C), 30.67 (d, J=1.28 Hz, 1C) 27.00 (s, 3C), 26.00 (s, 2C), 25.98 (s, 1C), 25.96 (s, 1C), 21.85-21.89 (d, J=2.72 Hz, 1C), 21.67-21.73 (d, J=5.09 Hz, 1C). $^{31}$P NMR (121 MHz, CDCl$_3$) δ 30.65 (1P), 29.94 (1P) (isomers).

((((2,6-difluorobenzyl)amino)(1-hydroxy-2-oxopiperidin-3-yl)phosphoryl)oxy)methyl pivalate (CDP19). Analysis by ESI+ (Expected [M+H]$^+$=400.38. Observed [M+H]$^+$=400.44). $^1$H NMR (300 MHz, CDCl$_3$) δ 7.23 (m, 2H), 6.85-6.90 (t, J=7.51, 8.09 Hz, 1H), 5.51-5.57 (dd, J=13.24 Hz, 2H), 4.40 (m, 2H), 3.63 (m, 2H), 2.99-3.10 (dt, J=23.86 Hz, 1H), 2.17-2.26 (m, 1H), 1.97-2.11 (m, 2H), 1.80-1.90 (m, 1H), 1.17 (s, 9H). $^{13}$C NMR (75 MHz, CDCl$_3$) δ 176.98 (s, 1C), 159.61 (d, J=1.92 Hz, 1C), 129.58 (s, 1C), 111.65 (s, 2C), 81.04 (d, J=6.44 Hz, 1C), 48.43 (s, 1C), 38.76-40.54 (d, J=134.60 Hz, 1C), 32.15-32.25 (t, J=3.75, 4.04 Hz, 1C), 26.78 (s, 3C), 21.71 (d, J=12.00 Hz, 1C), 21.40 (d, J=4.56 Hz, 1C). Note: some quatenary carbons not observed. $^{31}$P NMR (121 MHz, CDCl$_3$) δ 29.28 (s, 1P), 28.61 (s, 1P) (isomers). $^{19}$F NMR (282 MHz, CDCl$_3$)

((((4-fluorobenzyl)amino)(1-hydroxy-2-oxopiperidin-3-yl)phosphoryl)oxy)methyl pivalate (VCY19). Analysis by ESI+(Expected [M+H]$^+$=417.39. Observed [M+H]$^+$=417.44). $^1$H NMR (300 MHz, CDCl$_3$) 6.95-7.02 (m, 4H), 5.52 (s, 2H), 4.19-4.27 (m, 2H), 3.58-3.63 (m, 2H), 2.84-3.08 (m, 1H), 1.95-2.25 (m, 3H), 1.78-1.89 (m, 1H), 1.16 (s, 9H). $^{13}$C NMR (75 MHz, CDCl$_3$) 177.40 (s, 1C), 163.91 (d, J=1.43 Hz, 1C), 135.96 (dd, J=3.21, 3.21, 5.14 Hz, 1C), 129.22-129.32 (d, J=8.16 Hz, 2C), 115.52 (d, J=3.14, 2C), 81.50 (d, J=5.96 Hz, 1C), 49.53 (s, 1C), 43.91 (s, 1C), 41.03-42.72 (d, J=128.22 Hz, 1C), 27.03 (s, 3C), 21.51-22.15 (m, 2C). $^{31}$P NMR (121 MHz, CDCl$_3$) δ 27.23, 26.08 (isomers). $^{19}$F NMR (282 MHz, CDCl$_3$) −116.33 (s, 1F), −116.27 (s, 1F) (isomers).

(((((Cyclopropylmethyl)amino)(1-hydroxy-2-oxopiperidin-3-yl)phosphoryl)oxy)methyl pivalate (VCY32). Analysis by ESI+(Expected [M+H]$^+$=363.36. Observed [M+H]$^+$=363.39). $^1$H NMR (300 MHz, CDCl$_3$) δ 5.54-5.59 (m, 2H), 3.59 (m, 2H), 2.92-2.98 (dt, J=18.06 Hz, 1H), 2.78-2.82 (q, J=6.81, 7.07, 7.07 MHz, 1H), 2.14-2.20 (m, 1H), 2.07-2.13 (m, 2H), 1.77-1.85 (m, 1H), 1.16 (s, 9H), 0.44 (m, 1H), 0.17 (m, 1H). $^{13}$C NMR (75 MHz, CDCl$_3$) δ 177.12 (s, 1C), 160.77 (d, J=5.46 Hz, 1C), 81.23 (d, J=2.76 Hz, 1C), 49.98 (s, 1C), 45.87 (d, J=0.95 Hz, 1C), 42.36-41.35 (d, =127.79 Hz, 1C), 38.87 (s, 1C), 27.03 (s, 3C), 22.03 (d, J=4.83 Hz, 1C), 21.64 (d, J=4.83 Hz, 1C), 13.38 (d, J=6.46 Hz, 1C), 3.62 (s, 1C), 3.60 (s, 1C). $^{31}$P NMR (121 MHz, CDCl$_3$) δ 30.15 (s, 1P), 28.65 (s, 1P) (isomers).

((((Cyclobutylamino)(1-hydroxy-2-oxopiperidin-3-yl) phosphoryl)oxy)methyl pivalate (VCY34). Analysis by ESI+(Expected [M+H]$^+$=363.36. Observed [M+H]$^+$=363.98). $^1$H NMR (300 MHz, CDCl$_3$) δ 5.55-5.57 (d, J=5.32 Hz, 2H), 3.78-3.91 (m, 1H), 3.57 (t, J=4.76, 6.89 Hz, 2H), 2.90-2.98 (dt, J=14.04 Hz, 1H), 2.26 (m, 2H), 2.10 (m, 2H), 1.99 (m, 2H), 1.89 (m, 2H), 1.60 (m, 2H), 1.15 (s, 9H). $^{13}$C NMR (75 MHz, CDCl$_3$) δ 179.81 (s, 1C), 177.09-177.19 (d, J=7.21 Hz, 1C), 81.20-81.30 (d, J=7.85 Hz, 1C), 50.15 (s, 1C), 46.56 (d, J=3.64 Hz, 1C), 41.19-41.88 (d, J=128.81 Hz, 1C), 38.79 (s, 2C), 26.92 (s, 1C), 22.02 (s, 1C), 21.94 (d, J=4.50 Hz, 1C), 21.69 (d, J=5.22 Hz, 1C). $^{31}$P NMR (121 MHz, CDCl$_3$) δ 28.31, 27.47 (isomers).

1-hydroxy-3-((S)-2-oxido-4H-benzo[d][1,3,2]dioxaphosphinin-2-yl)piperidin-2-one (VCY27). Analysis by ESI+ (Expected [M+H]$^+$=283.22. Observed [M+H]$^+$=284.88). $^{31}$P NMR (121 MHz, CDCl$_3$) δ 16.80 (s, 1P), 16.40 (s, 1P) (isomers).

2-oxo-3-((2-(pivaloylthio)ethoxy)((pyridin-2-ylmethyl) amino)phosphoryl) piperidin-1-yl acetate (VCY31). Analysis by ESI+ (Expected [M+H]$^+$=472.51. Observed [M+H]$^+$=472.44). $^1$H NMR (500 MHz, CDCl$_3$) δ 8.75 (d, J=5.29 Hz, 1H), 8.16-8.19 (t, J=77.4, 8.51 HZ, 1H), 7.85-7.87 (d, J=8.01 Hz, 1H), 7.60-7.63 (t, J=6.63, 6.63 Hz, 1H), 5.34 (s, 1H), 4.94-4.99 (q, J=7.80, 7.80, 9.45 Hz, 2H), 4.63-4.65 (d, J=11.65 Hz, 2H), 3.17-3.24 (dt, J=23.88 Hz, 11H), 2.21-2.31 (m, 2H), 2.17 (s, 3H), 1.94-1.99 (m, 2H), 1.20 (s, 9H). $^{31}$P NMR (202 MHz, CDCl$_3$) δ 28.28 (d, J=24.70 Hz, 1P).

3-(((4-fluorobenzyl)amino)((5-nitrofuran-2-yl)methoxy) phosphoryl)-2-oxopiperidin-1-yl acetate (VCY22). $^1$H NMR (500 MHz, CDCl$_3$) 7.25 (m, 2H), 7.20 (d, J=3.81 Hz, 1H), 6.96 (t, J=5.92, 8.53 Hz, 2H), 6.55 (d, J=3.68, 1H), 4.94 (dd, J=13.81 Hz, 2H), 4.20 (m, 2H), 3.72 (dt, J=20.32, 1H), 3.13 (dt, J=24.39 Hz, 1H), 2.28 (m, 2H), 2.16 (s, 3H), 1.93 (m, 4H). $^{31}$P NMR (121 MHz, CDCl$_3$) 29.48 (d, J=17.25 Hz, 1P) $^{19}$F NMR (470 MHz, CDCl$_3$) −115.25 (m, 1F)

3-(hexadecyloxy)propyl hydrogen (1-hydroxy-2-oxopiperidin-3-yl)phosphonate (ESB7). $^1$H NMR (500 MHz, CDCl$_3$) δ 3.85 (dt, J=27.31 Hz, J=5.79 Hz, 2H), 3.59 (m, 2H), 3.42 (t, J=6.09 Hz, 2H), 3.31 (t, J=6.72 Hz, 2H), 2.85 (dt, J=24.49 Hz, J=6.25 Hz, 1H) 2.11 (m, 1H), 1.83-2.02 (m, 3H), 1.79 (q, J=6.36 Hz, 2H), 1.47 (q, J=7.70 Hz, 2H), 1.11-1.27 (m, 26H), 0.81 (t, J=6.21 Hz, 3H). $^{13}$C NMR (125 MHz, CDCl$_3$) δ 165.56 (s, 1C), 71.16 (s, 1C), 67.25 (s, 1C), 61.89 (s, 1C), 51.83 (s, 1C), 42.42 (d, J=123.85 Hz, 1C), 31.89 (s, 1C), 31.15 (d, J=4.04 Hz, 1C), 29.78 (s, 1C), 29.74 (s, 9C), 29.61 (s, 1C), 29.38 (s, 1C) 23.11 (s, 1C), 22.7 (s, 1C) 21.97 (d, J=5.65 Hz, 1C), 14.05 (s, 1C). $^{31}$P NMR (202 MHz, CDCl$_3$) δ 18.02 (s, 1P).

Example 3—Biological Data

Enolase enzymatic activity assay. The enzyme activity assay was performed according to a previously described procedure (Muller et al., 2012, which is incorporated by reference herein). Native lysates of human cell lines were prepared using 20 mM Tris-HCl, 1 mM EDTA, and 1 mM β-mercaptocthanol at pH 7.4 and sonicated ten times for a period of 30 s followed by cooling period of 30 s, after which the lysates were cleared by centrifugation at 20,000 g for 10 min. The spectrophotometric assay was conducted by using 50 mM imidazole-HCl (pH 6.8), 2.0 mM MgSO$_4$ and 400 mM KCl buffer as previously reported (Jung et al., 2013). Three reactions were performed.

In the first, the lysates were treated with the serial dilutions of FLM38 (starting at 100 µM) and the reaction initiated by adding 2.5 mM 2-PG and optical density (OD) was measured at 240 nm using Omegastar Plate reader (BMG Labtech) over the course of 3 h.

In the second experiment, the lysates were pre-incubated in 96-well plates with serial dilutions of FLM38 (starting at 100 M) at 37° C. for 20 h. The reaction was initiated by adding 2.5 mM 2-PG and OD was measured at 240 nm.

The third experiment followed the same reaction conditions as those described in the first experiment, but the reaction was initiated with 0.5 mM 2-PG.

pH degradation assay. Solutions of 50 mM phosphate buffered D$_2$O were prepared at pH 3, 7, and 8.82. For each condition, FLM38 (5 mg, 18 mmol) was dissolved in 500 L of phosphate buffered D$_2$O and placed in NMR tubes.

Hydrolysis was monitored by $^{31}P$ NMR and was evidenced by the degradation of the compound peak at ~20 ppm and the emergence of the hydrolyzed product at ~18 ppm. Scans were collected every 12 h on a Bruker 500 MHz NMR.

Serum containing Cell Culture Media stability assay. POMHEX and VCY17 (1 mM) were added to DMEM-containing 10% Fetal Bovine Serum cell culture media in an NMR tube with 10% $D_2O$ for signal lock) and incubated at 37° C. $^{31}P$ NMR measurements ($^{31}P$ CPD, 1000 transients) were conducted every 24 hours, for 4 days.

Human plasma stability assay. POMHEX and VCY17 (1.5 mM) were added to human plasma (Sigma #P9523) in an NMR tube with 10% $D_2O$ for signal lock. $^{31}P$ NMR measurements (31P CPD, 1000 transients) were conducted every 30 minutes on the first day and every 24 hours, for 4 days afterwards.

Cell culture experiments. Cell culture experiments were conducted using the D423-MG cell line. 1p36 homozygous deletion in D423 includes the genes from CAMTAJ to SLC25A33; this includes ENO1. Isogenic ENO1 ectopically rescued lines were described previously (pCMV ENO1 5X) (Muller et al., 2012, which is incorporated by reference herein). An ENO1-intact cell line (LN319) was used as a control for sensitivity to Enolase inhibitors. Cells were routinely cultured in Dulbecco's modified Eagle's medium supplemented with 10% fetal bovine serum.

Cell proliferation assay. Cell Proliferation was determined by crystal violet staining, as previously described (Leonard et al., 2016 and Satani et al., 2016). The cell lines used were D423 (ENO1-deleted), D423 ENO1 (overexpressing ENO1) and LN319 (control). Glioma cells were seeded in 96-well plates and treated with varying concentrations of the inhibitors described above for 7 days. Cells were then washed with PBS, fixed with 10% formalin and stained with 0.05% crystal violet. Washed and dried plates were dye-extracted using 10% acetic acid, and absorbance was measured at 595 nm using Omegastar Plate Reader (BMG Labtech). To test the efficacy of the synthesized under hypoxic conditions, $1 \times 10^4$ cells were plated in 96-well plates, treated with VCY13, VCY15, VCY16, or VCY17 and incubated for 3 days in a hypoxia station (Don Whitley Scientific, Shipley, UK) set at 1% $O_2$ and 5% $CO_2$. Crystal violet staining was then performed as described above.

Additional Biological Data. Pro-drug inhibitor structures and corresponding $IC_{50}$ values against ENO1-deleted cells are shown below in Table 2. The name and corresponding structures of all synthesized inhibitors are given in left and middle columns of each table. Pro-drug moieties in blue represent a second pro-drug leave group while those in red represent a first pro-drug leave group. Some inhibitors also contain an acetyl-protected hydroxamate, which is also a biologically labile moiety. ENO1-deleted (D423), ENO1-isogenically rescued (D423 ENO1), and ENO1-WT (LN319) cells were treated with either pro-drug inhibitor for 5 days at 21% $O_2$, unless otherwise specified. All pro-drug inhibitors displayed dose-dependent killing against ENO1-deleted cells. $IC_{50,D423}$ values at 21% $O_2$ are given in the right columns of each table. Experiments conducted at 1% $O_2$ (hypoxic) or 70% $O_2$ (hyperoxic) conditions are noted, where appropriate.

TABLE 2

| IC$_{50}$ values against ENO1-deleted cells. | |
| --- | --- |
| Compound ID | $IC_{50,D423}$ (nM) |
| FLM37 | 150 |
| VCY13 | 38 |

TABLE 2-continued

| IC$_{50}$ values against ENO1-deleted cells. | |
| --- | --- |
| Compound ID | $IC_{50,D423}$ (nM) |
| VCY15 | 390 |
| | (1% $O_2$ = 97 nM) |
| VCY16 | 234 |
| | (1% $O_2$ = 40 nM) |
| VCY17 | 12732* |
| | (1% $O_2$ = 975 nm) |
| VCY22 | 933 |
| | (1% $O_2$ = 540 nm) |
| VCY26 | 5000 |
| VCY27 | 500 |
| | (70% $O_2$ = 15 nm) |
| VCY31 | 59 |
| VCY32 | 9 |
| VCY19 | 129 |
| CDP9 | 36000 |
| CDP12 | 249 |
| CDP13 | 221 |
| CDP14 | 65 |
| CDP18 | 77 |
| CDP19 | 112 |
| KY9 | 96 |
| ESB7 | 202 |

All of the compounds, compositions and methods disclosed and claimed herein can be made and executed without undue experimentation in light of the present disclosure. While the disclosure may have only been described in terms of certain embodiments, it will be apparent to those of skill in the art that variations may be applied to the compounds, compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Anderson, *Practical Process Research & Development A Guide for Organic Chemists*, $2^{nd}$ ed., Academic Press, New York, 2012.

*Handbook of Pharmaceutical Salts: Properties, and Use*, Stahl and Wermuth Eds., Verlag Helvetica Chimica Acta, 2002.

Reagan-Shaw et al., *FASEB J.*, 22(3):659-661, 2008.

Smith, *March's Advanced Organic Chemistry: Reactions, Mechanisms, and Structure*, $7^{th}$ Ed., Wiley, 2013.

Wuts, *Greene's Protecting Groups in Organic Synthesis*, $5^{th}$ Ed., Wiley-Interscience, 2014

US 2018-0147219

Borch et al., *J. Med. Chem.*, 43:2258-2265, 2000.

Jung et al., *ACS Chem. Biol.* 8:1271-1282, 2013.

Koumenis and Wouters, *Mol. Cancer Res.*, 2006.

Leonard et al., *Nat. Chem. Biol.*, 12:1053-1058, 2016.

Lin et al., *bioRxiv*, Preprint, doi: 10.1101/331538, 2018.

Muller et al., doi: *Protoc. Exch.* 10.1038/protex.2012.040, 2012.

Muller et al., *Nature,* 488:337-343, 2012.
O'Connor et al., *Nat. Protoc.* 11:781-794, 2016.
Olbryt et al., *PLoS One,* 9:e105104, 2014.
Satani et al., *PLoS One,* 11:e0168739, 2016.
Zhou et al., *Antimicrob. Agents Chemother.,* 55:76-81, 2011.

The invention claimed is:

1. A compound of the formula:

, or a pharmaceutically acceptable salt thereof.

2. A pharmaceutical composition comprising:

(a) a compound of claim 1; and (b) an excipient.

3. A method of treating cancer in a patient in need thereof comprising administering to the patient a therapeutically effective amount of a compound or composition of claim 1.

*   *   *   *   *